(12) United States Patent
Muthler et al.

(10) Patent No.: US 12,475,631 B2
(45) Date of Patent: Nov. 18, 2025

(54) ACCELERATING TRIANGLE VISIBILITY TESTS FOR REAL-TIME RAY TRACING

(71) Applicant: NVIDIA CORPORATION, Santa Clara, CA (US)

(72) Inventors: Gregory Muthler, Chapel Hill, NC (US); John Burgess, Austin, TX (US); Henry Packard Moreton, Woodside, CA (US); Yury Uralsky, Los Gatos, CA (US); Levi Oliver, Webster, NY (US); Magnus Andersson, Lund (SE); Johannes Deligiannis, Stockholm (SE)

(73) Assignee: NVIDIA Corporation, Santa Clara, CA (US)

( * ) Notice: Subject to any disclaimer, the term of this patent is extended or adjusted under 35 U.S.C. 154(b) by 235 days.

(21) Appl. No.: 17/946,221

(22) Filed: Sep. 16, 2022

(65) Prior Publication Data

US 2023/0084570 A1 Mar. 16, 2023

Related U.S. Application Data

(60) Provisional application No. 63/245,155, filed on Sep. 16, 2021.

(51) Int. Cl.
*G06T 15/06* (2011.01)
*G06T 1/60* (2006.01)
(Continued)

(52) U.S. Cl.
CPC ............. *G06T 15/06* (2013.01); *G06T 1/60* (2013.01); *G06T 9/001* (2013.01); *G06T 15/005* (2013.01); *G06T 15/40* (2013.01); *G06T 15/50* (2013.01); *G06T 17/10* (2013.01); *G06T 17/20* (2013.01); *G06T 17/205* (2013.01); *G06T 19/20* (2013.01); *G06T 2210/08* (2013.01); *G06T 2210/12* (2013.01); *G06T 2210/21* (2013.01); *G06T 2210/36* (2013.01); *G06T 2219/2016* (2013.01)

(58) Field of Classification Search
CPC .......... G06T 15/06; G06T 1/60; G06T 9/001; G06T 15/40; G06T 17/10; G06T 17/20; G06T 17/205; G06T 19/20; G06T 2210/08; G06T 2210/21; G06T 2210/36; G06T 2219/2016
USPC ...................................................... 345/426
See application file for complete search history.

(56) References Cited

U.S. PATENT DOCUMENTS 9,569,559 B2  2/2017  Karras
9,582,607 B2  2/2017  Laine
(Continued)

OTHER PUBLICATIONS

XP002808193 dated Jul. 16, 2021 retrieved from internet: https://developer.nvidia.com/rtx/ray-t racing.
(Continued)

*Primary Examiner* — Jin Ge
(74) *Attorney, Agent, or Firm* — Nixon & Vanderhye P.C.

(57) ABSTRACT

Techniques applicable to a ray tracing hardware accelerator for traversing a hierarchical acceleration structure with reduced round-trip communications with a processor are disclosed. The reduction of round-trip communications with a processor during traversal is achieved by having a visibility mask that defines visibility states for regions within a geometric primitive available to be accessed in the ray tracing hardware accelerator when a ray intersection is detected for the geometric primitive.

20 Claims, 36 Drawing Sheets

(51) Int. Cl.
*G06T 9/00* (2006.01)
*G06T 15/00* (2011.01)
*G06T 15/40* (2011.01)
*G06T 15/50* (2011.01)
*G06T 17/10* (2006.01)
*G06T 17/20* (2006.01)
*G06T 19/20* (2011.01)

(56) References Cited

U.S. PATENT DOCUMENTS

| | | |
|---|---|---|
| 10,025,879 B2 | 7/2018 | Karras |
| 11,087,522 B1 | 8/2021 | Surti |
| 2016/0070820 A1 | 3/2016 | Laine |
| 2021/0012552 A1 | 1/2021 | Laine |
| 2021/0090319 A1 | 3/2021 | Muthler |
| 2022/0051467 A1* | 2/2022 | Woop ............... G06T 15/06 |
| 2022/0130097 A1* | 4/2022 | Surti ............... G06F 3/0673 |
| 2023/0109412 A1* | 4/2023 | Gruen ............... G06T 15/506 |
| | | 345/426 |

OTHER PUBLICATIONS

XP093005806 dated Aug. 22, 2022 retrieved from internet: https://registry.khronos.org/vulkan/specs/1.3-extensions/man/html.

XP093005814 dated Jul. 28, 2022 retrieved from internet: https://github.com/khronosGroup/GLSL/blob/master/extensions/ext.

XP093005812 dated Jul. 28, 2022 retrieved from internet: https://htmlpreview.github.io/?https://github.com/khronosgroup/SPIRV-Registry/blob/master/extensions/EXT/SPV_EXT/opacity_micromap.html.

Thrane et al "A Comparison of Acceleration Structures For GPU Assisted Ray Tracing" dated Aug. 1, 2005.

PCT Written Opinion of the International Searching Authority for Application No. PCT/US2022/043835 dated Sep. 16, 2022.

* cited by examiner

```c
// Interleave even bits from x with odd bits from y
static uint32_t interleaveBits(uint32_t x, uint32_t y)
{
    x = (x | (x << 8)) & 0x00ff00ff;
    x = (x | (x << 4)) & 0x0f0f0f0f;
    x = (x | (x << 2)) & 0x33333333;
    x = (x | (x << 1)) & 0x55555555;
    y = (y | (y << 8)) & 0x00ff00ff;
    y = (y | (y << 4)) & 0x0f0f0f0f;
    y = (y | (y << 2)) & 0x33333333;
    y = (y | (y << 1)) & 0x55555555;
    return x | (y << 1);
}

// Calculate exclusive prefix or (log(n) XOR's and SHF's)
static uint32_t prefixEor(uint32_t x)
{
    x ^= x >> 1;
    x ^= x >> 2;
    x ^= x >> 4;
    x ^= x >> 8;
    return x;
}

// Quantize Barycentrics from float to uint32_t
static void quantizeBary(float u, float v, uint32_t level, uint32_t &iu, uint32_t &iv, uint32_t &iw)
{
    float fiu, fiv;
    float uf = modff(u * (1 << level), &fiu); // Split into fractional (uf) and integr (fiu)
    float vf = modff(v * (1 << level), &fiv);

iu = (uint32_t)fiu;
    iv = (uint32_t)fiv;
    iw = ~(iu + iv);
    bool onVertex = ~iw & (1 << level); // true if hit vertex of "flipped" tri (only single bit tested)

float ufvf = (1 << level) * (u + v) - ~iw;
    if (ufvf > 1.0f) --iw; // need strict comparison to ensure hits on "upright" tri edges don't go out of bounds if (onVertex) {
        if (iu != 0) --iu;
        if (iv != 0) --iv;
        iw = 0;
    }
} static void quantizeBaryClamp(float u, float v, uint32_t level, uint32_t &iu, uint32_t &iv, uint32_t &iw)
    float fiu, fiv;
    modff(u * (1 << level), &fiu);
    modff(v * (1 << level), &fiv);
```

FIG. 9B

```
    iu = (uint32_t)fiu;
    iv = (uint32_t)fiv;

if (iu >= (1u << level)) iu = (1u << level) - 1; // Clamp if beyond edge
    if (iv >= (1u << level)) iv = (1u << level) - 1; // Clamp if beyond edge uint32_t iuv = iu + iv;
    if (iuv >= (1u << level))
        iu -= (iuv) - (1u << level) + 1;

iw = ~(iu + iv);

float ufvf = (1 << level) * (u + v) - ~iw;
    if (ufvf > 1.0f && iuv < ((1u << level) - 1)) --iw;
}

// Convert discrete barycentrics to index along the curve
static uint32_t bary2index(float u, float v, uint32_t level)
{
    uint32_t iu, iv, iw;
    quantizeBary(u, v, level, iu, iv, iw); // or quantizeBaryClamp uint32_t b0 = ~(iu ^ iw);
    b0 &= ((1<<level) - 1);

uint32_t t = (iu ^ iv) & b0;
    uint32_t f = prefixEor(t);
    uint32_t b1 = ((f ^ iu) & ~b0) | t;

return interleaveBits(b0, b1);
}
```

FIG. 9B (cont.)

Example Ray Tracing Shading Pipeline

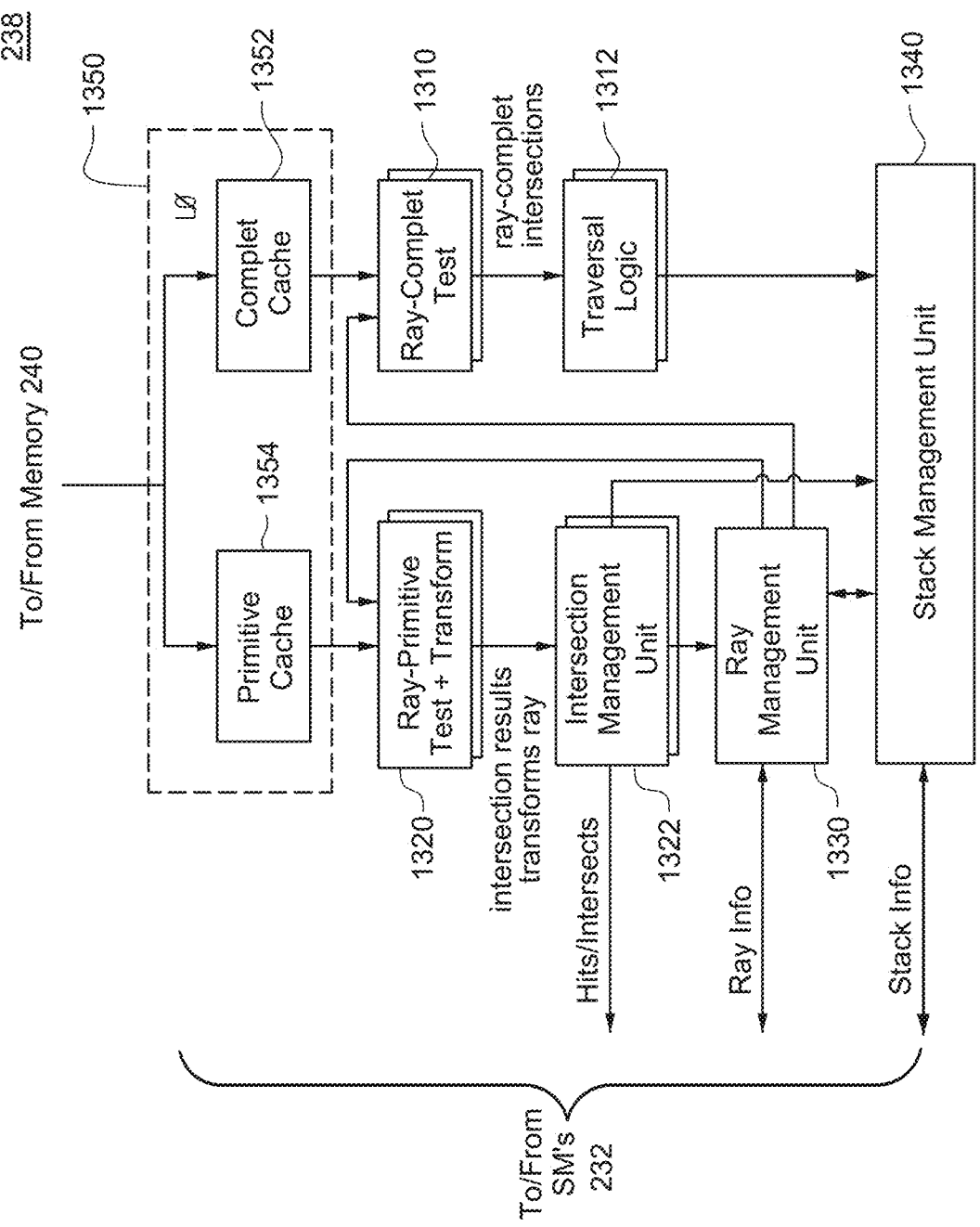
FIG. 13 TRAVERSAL COPROCESSOR

Visibility Mask Layout

Uncompressed Visibility Block 1402 1400

| byte | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 128 1-bit 2-state visibility states, 64 2-bit 4-state visibility states, or a mix of both types |||||||||||||||||
| 16 | 128 1-bit 2-state visibility states, 64 2-bit 4-state visibility states, or a mix of both types |||||||||||||||||
| 32 | 128 1-bit 2-state visibility states, 64 2-bit 4-state visibility states, or a mix of both types |||||||||||||||||
| 48 | 128 1-bit 2-state visibility states, 64 2-bit 4-state visibility states, or a mix of both types |||||||||||||||||
| 64 | 128 1-bit 2-state visibility states, 64 2-bit 4-state visibility states, or a mix of both types |||||||||||||||||
| 80 | 128 1-bit 2-state visibility states, 64 2-bit 4-state visibility states, or a mix of both types |||||||||||||||||
| 96 | 128 1-bit 2-state visibility states, 64 2-bit 4-state visibility states, or a mix of both types |||||||||||||||||
| 112 | 128 1-bit 2-state visibility states, 64 2-bit 4-state visibility states, or a mix of both types |||||||||||||||||

FIG. 14

Compressed Triangle + Visibility Mask 1500

| byte | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | VertexBase.X |||| VertexBase.Y |||| VertexBase.Z |||| VertexPositions ||||
| 16 | ... |||| ... |||| ... |||| ... ||||
| 32 | ... |||| ... |||| ... |||| ... ||||
| 48 | ... |||| ... |||| ... |||| VisibilityMasks ||||
| 64 | ... |||| ... |||| ... |||| TriangleIDs ||||
| 80 | ... |||| ... |||| ... |||| ||||
| 96 | ... |||| ... |||| ... |||| VertexIDs ||||
| 112 | ... | VMOffset.Base |||||| VMInfo | TriangleID.Base ||| C.T.Header ||||

1502  1504

VMInfo (7 bits) 1504

| bits | 6 | 5 | 4 | 3 | 2 | 1 | 0 |
|---|---|---|---|---|---|---|---|
| | P.VMO |||||| vmAlign |

1506  1508

**Visibility Masks Array (M*6 + (M-1)*P.VMO)** 1510

| bits | 4 | 1 | 1 | 4 | 1 | 1 | P.VMO | 4 | → 0 |
|---|---|---|---|---|---|---|---|---|---|
| | 0.vmLevel | 0.vmType | 0.vmAp | 1.vmLevel | 1.vmType | 1.vmAp | 1.vmOffset | 2.vmLevel | ... |

Visibility Mask Buffer Memory Space

| Aperture | BLAS | Inst | Masks | | |
|---|---|---|---|---|---|
| Global | | | | | Visibility masks accessible by all BLAS |
| | BLAS0 | | | | Visibility masks accessible by all instances of BLAS0 |
| | BLAS1 | | | | Visibility masks accessible by all instances of BLAS1 |
| | BLAS2 | | | | Visibility masks accessible by all instances of BLAS2 |
| Local | BLAS0 | Inst0 | | ← Visibility Mask Base Pointer for BLAS0 / Inst0 | Visibility masks accessible by a single instance of BLAS0 |
| | | Inst1 | | ← Visibility Mask Base Pointer for BLAS0 / Inst1 | Each has identical layout, but different content |
| | | Inst2 | | ← Visibility Mask Base Pointer for BLAS0 / Inst2 | |
| | BLAS1 | Inst0 | | ← Visibility Mask Base Pointer for BLAS1 / Inst0 | |
| | | Inst1 | | ← Visibility Mask Base Pointer for BLAS1 / Inst1 | |
| | | Inst2 | | ← Visibility Mask Base Pointer for BLAS1 / Inst2 | Layout here can be different that layout for BLAS0 |
| | | Inst3 | | ← Visibility Mask Base Pointer for BLAS1 / Inst3 | |
| | | Inst4 | | ← Visibility Mask Base Pointer for BLAS1 / Inst4 | |
| | BLAS2 | Inst0 | | ← Visibility Mask Base Pointer for BLAS2 / Inst0 | |
| | | Inst1 | | ← Visibility Mask Base Pointer for BLAS2 / Inst1 | |

FIG. 16

| VM Potential Hit RAM ||| 
| --- | --- | --- |
| Group | Field | Description |
| Meta / control (1b) | isVM | If set, the hit stored comes from a VM triangle. If clear, the hit stored comes from an alpha triangle. |
| Hit Information (179) | hitUserTriangleId | User-provided triangle ID of the intersected triangle |
| | hitT | t-value of the intersection |
| | hitU | First barycentric coordinate of the intersection |
| | hitV | Second barycentric coordinate of the intersection |
| | hitIsAlphaOriginal | Indicates whether triangle's alpha bit was set (independent of mode) |
| | hitIsBackFacing | Indicates whether triangle is back-facing according to ray's front-face winding mode |
| | hitAddr | Bits [48:7] of the 49-bit address of the first triangle block in the triangle range containing the hit |
| | hitTriIdx | Triangle index of hit within triangle block |
| | hwInst | This is set to true if the ray that hit the triangle is using instancing |
| | terminateOnAnyHit | After the visibility test, if this triangle evaluates to opaque and is written to the Primary Intersection Status, then the triangle range must not be replayed |
| Ray flags and culling info (6b) | modeOpaque | Used after visibility test. If the ray op passed, the value of ray flag modeOpaquePass, else modeOpaqueFail |
| | modeAlpha | Used after visibility test. Indicates that the visibility test should force Unknown results to 2-state results |
| | cullAlpha | Used after visibility test. After ray flags applied, if cullAlpha=1 and the result is alpha, the triangle is culled |

| Field | Description |
| --- | --- |
| valid | If set, the RAM holds valid data |
| hitLineIdx | Triangle block (cache line) index of hit within triangle range |

FIG. 20

| Level / Order | VM Resolution | Micro-triangles | 1-bit / Two-state VM | | 2-bit / Four-state VM | |
|---|---|---|---|---|---|---|
| | | | Cache lines | Memory | Cache lines | Memory |
| 0 | 1 x 1 | 1 | <1 | 1 b | <1 | 2 b |
| 1 | 2 x 2 | 4 | <1 | 4 b | <1 | 4 b |
| 2 | 4 x 4 | 16 | <1 | 16 b | <1 | 32 b |
| 3 | 8 x 8 | 64 | <1 | 64 b | <1 | 128 b |
| 4 | 16 x 16 | 256 | <1 | 256 b | <1 | 512 b |
| 5 | 32 x 32 | 1,024 | 1 | 128 B | 2 | 256 B |
| 6 | 64 x 64 | 4,096 | 4 | 512 B | 8 | 1 kB |
| 7 | 128 x 128 | 16,384 | 16 | 2 kB | 32 | 4 kB |
| 8 | 256 x 256 | 65,536 | 64 | 8 kB | 128 | 16 kB |
| 9 | 512 x 512 | 262,144 | 256 | 32 kB | 512 | 64 kB |
| 10 | 1024 x 1024 | 1,048,576 | 1,024 | 128 kB | 2,048 | 256 kB |
| 11 | 2048 x 2048 | 4,194,304 | 4,096 | 512 kB | 8,192 | 1 MB |
| 12 | 4096 x 4096 | 16,777,216 | 16,384 | 2 MB | 32,768 | 4 MB |
| 13 | 8192 x 8192 | 67,108,864 | 65,536 | 8 MB | 131,072 | 16 MB |

FIG. 23

Example General Processing Cluster

ACCELERATING TRIANGLE VISIBILITY TESTS FOR REAL-TIME RAY TRACING

CROSS-REFERENCE TO RELATED PATENTS AND APPLICATIONS

The application claims priority to U.S. Provisional Patent Application No. 63/245,155 filed Sep. 16, 2021, the entire content of which is herein incorporated by reference. Additionally, the entire contents of each of the concurrently filed U.S. application Ser. No. 17/946,235 "Micro-Meshes, A Structured Geometry For Computer Graphics", U.S. application Ser. No. 17/946,515 "Displaced Micro-meshes for Ray and Path Tracing", and U.S. application Ser. No. 17/946,563 "Displaced MicroMesh Compression" are herein incorporated by reference.

FIELD

The present technology relates to computer graphics, and more particularly to ray tracers. More particularly, the technology relates to hardware acceleration of computer graphics processing including ray tracing. The example non-limiting technology herein also relates to efficient ray intersection tests for visibility.

BACKGROUND & SUMMARY

Ray tracing refers to casting a ray into a scene and determining whether and where that ray intersects the scene's geometry. This basic ray tracing visibility test is the fundamental primitive underlying a variety of rendering algorithms and techniques in computer graphics. Generally, ray tracing is a rendering method in which rays are used to determine the visibility of various elements in the scene. Ray tracing is used in a variety of rendering algorithms including for example path tracing and Metropolis light transport. In an example algorithm, ray tracing simulates the physics of light by modeling light transport through the scene to compute all global effects (including for example reflections from shiny surfaces) using ray optics. In such uses of ray tracing, an attempt may be made to trace each of many hundreds or thousands of light rays as they travel through the three-dimensional scene from potentially multiple light sources to the viewpoint. Often, such rays are traced relative to the eye through the scene and tested against a database of all geometry in the scene. The rays can be traced forward from lights to the eye, or backwards from the eye to the lights, or they can be traced to see if paths starting from the virtual camera and starting at the eye have a clear line of sight. The testing determines either the nearest intersection (in order to determine what is visible from the eye) or traces rays from the surface of an object toward a light source to determine if there is anything intervening that would block the transmission of light to that point in space. Because the rays are similar to the rays of light in reality, they make available a number of realistic effects that are not possible using many of the other 3D graphics technologies. Because each illuminating ray from each light source within the scene is evaluated as it passes through each object in the scene, the resulting images can appear as if they were photographed in reality. Accordingly, these ray tracing methods have long been used in professional graphics applications such as design and film, where they have come to dominate over raster-based rendering.

Ray tracing can be used to determine if anything is visible along a ray (for example, testing for occluders between a shaded point on a geometric primitive and a point on a light source) and can also be used to evaluate reflections (which may for example involve performing a traversal to determine the nearest visible surface along a line of sight so that software running on a streaming processor can evaluate a material shading function corresponding to what was hit—which in turn can launch one or more additional rays into the scene according to the material properties of the object that was intersected) to determine the light returning along the ray back toward the eye. In classical Whitted-style ray tracing, rays are shot from the viewpoint through the pixel grid into the scene, but other path traversals are possible. Typically, for each ray, the closest object is found. This intersection point can then be determined to be illuminated or in shadow by shooting a ray from it to each light source in the scene and finding if any objects are in between. Opaque objects block the light, whereas transparent objects attenuate it. Other rays can be spawned from an intersection point. For example, if the intersecting surface is shiny or specular, rays are generated in the reflection direction. The ray may accept the color of the first object intersected, which in turn has its intersection point tested for shadows. This reflection process is recursively repeated until a recursion limit is reached or the potential contribution of subsequent bounces falls below a threshold. Rays can also be generated in the direction of refraction for transparent solid objects, and again recursively evaluated. Ray tracing technology thus allows a graphics system to develop physically correct reflections and shadows that are not subject to the limitations and artifacts of scan conversion techniques.

The main challenge with ray tracing has generally been speed. Ray tracing requires the graphics system to compute and analyze, for each frame, each of many millions of light rays impinging on (and potentially reflected by) each surface making up the scene.

One reason modern GPU 3D graphics pipelines are so fast at rendering shaded, texture-mapped surfaces is that they use coherence efficiently. In conventional scan conversion, everything is assumed to be viewed through a common window in a common image plane and projected down to a single vantage point. Each triangle or other primitive is sent through the graphics pipeline and covers some number of pixels. All related computations can be shared for all pixels rendered from that triangle. Rectangular tiles of pixels corresponding to coherent lines of sight passing through the window may thus correspond to groups of threads running in lock-step in the same streaming processor. All the pixels falling between the edges of the triangle are assumed to be the same material running the same shader and fetching adjacent groups of texels from the same textures. In ray tracing, in contrast, rays may start or end at a common point (a light source, or a virtual camera lens) but as they propagate through the scene and interact with different materials, they quickly diverge. For example, each ray performs a search to find the closest object. Some caching and sharing of results can be performed, but because each ray potentially can hit different objects, the kind of coherence that GPU's have traditionally taken advantage of in connection with texture mapped, shaded triangles is not present (e.g., a common vantage point, window and image plane are not there for ray tracing). This makes ray tracing much more computationally challenging than other graphics approaches—and therefore much more difficult to perform on an interactive basis.

In 2010, NVIDIA took advantage of the high degree of parallelism of NVIDIA GPUs and other highly parallel architectures to develop the OptiX™ ray tracing engine. See Parker et al., "OptiX: A General Purpose Ray Tracing Engine" (ACM Transactions on Graphics, Vol. 29, No. 4, Article 66, July 2010). In addition to improvements in API's (application programming interfaces), one of the advances provided by OptiX™ was improving the acceleration data structures used for finding an intersection between a ray and the scene geometry. Such acceleration data structures are usually spatial or object hierarchies used by the ray tracing traversal algorithm to efficiently search for primitives that potentially intersect a given ray. OptiX™ provides a number of different acceleration structure types that the application can choose from. Each acceleration structure in the node graph can be a different type, allowing combinations of high-quality static structures with dynamically updated ones.

The OptiX™ programmable ray tracing pipeline provided significant advances, but was still generally unable by itself to provide real time interactive response to user input on relatively inexpensive computing platforms for complex 3D scenes. Since then, NVIDIA has been developing hardware acceleration capabilities for ray tracing. See e.g., U.S. Pat. Nos. 9,582,607; 9,569,559; US 20160070820; US 20160070767; and the other US patents and patent applications cited above.

A basic task for most ray tracers is to test a ray against all primitives (commonly triangles in one embodiment) in the scene and report either the closest hit (according to distance measured along the ray) or simply the first (not necessarily closest) hit encountered, depending upon use case. The naïve algorithm would be an O(n) brute-force search. However, due to the large number of primitives in a 3D scene of arbitrary complexity, it usually is not efficient or feasible for a ray tracer to test every geometric primitive in the scene for an intersection with a given ray.

By pre-processing the scene geometry and building a suitable acceleration data structure in advance, however, it is possible to reduce the average-case complexity to O(log n). Acceleration data structures, such as a bounding volume hierarchy or BVH, allow for quick determination as to which bounding volumes can be ignored, which bounding volumes may contain intersected geometric primitives, and which intersected geometric primitives matter for visualization and which do not. Using simple volumes such as boxes to contain more complex objects provides computational and memory efficiencies that help enable ray tracing to proceed in real time.

FIGS. 1A-1C illustrate ray tracing intersection testing in the context of a bounding volume 110 including geometric mesh 120. FIG. 1A shows a ray 102 in a virtual space including bounding volumes 110 and 115. To determine whether the ray 102 intersects geometry in the mesh 120, each geometric primitive (e.g., triangle) could be directly tested against the ray 102. But to accelerate the process (since the object could contain many thousands of geometric primitives), the ray 102 is first tested against the bounding volumes 110 and 115. If the ray 102 does not intersect a bounding volume, then it does not intersect any geometry inside of the bounding volume and all geometry inside the bounding volume can be ignored for purposes of that ray. Because in FIG. 1A the ray 102 misses bounding volume 110, any geometry of mesh 120 within that bounding volume need not be tested for intersection. While bounding volume 115 is intersected by the ray 102, bounding volume 115 does not contain any geometry and so no further testing is required.

On the other hand, if a ray such as ray 104 shown in FIG. 1B intersects a bounding volume 110 that contains geometry, then the ray may or may not intersect the geometry inside of the bounding volume so further tests need to be performed on the geometry itself to find possible intersections. Because the rays 104, 106 in FIGS. 1B and 1C intersect a bounding volume 110 that contains geometry, further tests need to be performed to determine whether any (and which) of the primitives inside of the bounding volume are intersected. In FIG. 1B, further testing of the intersections with the primitives would indicate that even though the ray 104 passes through the bounding volume 110, it does not intersect any of the geometry the bounding volume encloses (alternatively, as mentioned above, bounding volume 110 could be further volumetrically subdivided so that a bounding volume intersection test could be used to reveal that the ray does not intersect any geometry or more specifically which geometric primitives the ray may intersect).

FIG. 1C shows a situation in which the ray intersects bounding volume 110 and contains geometry that ray 106 intersects. To perform real time ray tracing, an intersection tester tests each geometric primitive within the intersected bounding volume 110 to determine whether the ray intersects that geometric primitive.

An acceleration data structure or acceleration structure ("AS") commonly used by modern ray tracers is a bounding volume hierarchy (BVH) comprising nested axis-aligned bounding boxes. The leaf nodes of the BVH contain the primitives (e.g., triangles) to be tested for intersection. The BVH is most often represented by a graph or tree structure data representation.

The BVH AS represents and/or references the 3D model of an object or a scene in a manner that will help assist in quickly deciding which portion of the object or scene each particular ray is likely to intersect and quickly rejecting large portions of the scene the rays will not intersect. The BVH data structure represents a scene or object with a bounding volume and subdivides the bounding volume into smaller and smaller bounding volumes terminating in leaf nodes containing geometric primitives. The bounding volumes are hierarchical, meaning that the topmost level encloses the level below it, that level encloses the next level below it, and so on. In one embodiment, leaf nodes can potentially overlap other leaf nodes in the bounding volume hierarchy. In ray tracing, the search for finding the closest (or for shadows, any) intersection for a ray is typically order O(log n) for n objects when such an AS is used. For example, bounding volume hierarchies (BVHs) of the type commonly used for modern ray tracing acceleration data structures typically have an O(log n) search behavior.

NVIDIA's RTX platform includes a ray tracing technology that brings real-time, cinematic-quality rendering to content creators and game developers. See https://developer.nvidia.com/rtx/raytracing. In many or most implementations including NVIDIA RT Cores, the bounding volumes of an AS such as shown in FIG. 1A-1C use axis-aligned bounding boxes ("AABBs"), which can be compactly stored (they can be specified using only six values) and efficiently tested for ray intersection. As the ray tracer traverses down the BVH tree, it eliminates non-intersecting bounding boxes from the search and subdivides intersecting bounding boxes into smaller and smaller volumes until it encounters a leaf node bounding box that encloses geometry. Ray-bounding volume intersection tests against AABB bounding boxes tend to be inexpensive. If a ray intersects the leaf node bounding box, then the underlying geometry the intersecting leaf node bounding box encloses is then tested using a ray-geometry intersection test. If a ray does not intersect the leaf node bounding volume, then the underlying geometry within the leaf node bounding volume need to be tested against the ray. As FIGS. 1A-1C show, a hierarchy of AABB's increases the culling effect of a single AABB bounding box test. This allows for efficient traversal and a quick reduction to the geometry of interest.

Even with the advances already made in making ray tracing faster and more efficient, it is still desired to make further improvements in the speed with which ray tracing can be performed.

BRIEF DESCRIPTION OF THE DRAWINGS

FIG. 9B illustrates example code segments for calculating an index within a visibility mask based on barycentric coordinates, according to some embodiments.

FIG. 13 shows a simplified example non-limiting traversal co-processor comprising a tree traversal unit (TTU), according to some embodiments.

FIG. 14 illustrates a format for visibility mask blocks according to some embodiments.

FIG. 15 illustrates a format for triangle blocks according to some embodiments.

FIG. 16 illustrates a memory layout for global and local addressing according to some embodiments.

FIG. 20 illustrates example contents of a visibility mask potential hit RAM according to some embodiments.

FIG. 23 is a table showing example visibility mask resolutions and encodings according to some embodiments.

DETAILED DESCRIPTION OF NON-LIMITING EMBODIMENTS

The already highly efficient ray tracing capabilities of the Nvidia RTX technology, which provides hardware-accelerated testing of rays against the hierarchically-arranged bounding boxes that encompass object geometries in a scene and also the underlying object geometries as well, can be improved even more by improving the efficiency of visibility status determinations for intersection points of ray-primitive intersections that occur during the traversal of an acceleration structure (AS).

Certain example embodiments of this disclosure provide a ray tracing coprocessor hardware device that enables hardware-accelerated ray tracing with more efficient visibility status determinations for pixels at hit points obtained for ray-primitive intersections (e.g., ray-triangle intersections). Example embodiments provide a visibility mask (VM) that provides for an intersection point's (also referred to as "hit point") visibility status to be more often determined without requiring the ray tracing hardware coprocessor device to rely on the processor (e.g., streaming multiprocessor).

The embodiments provide for performing, for a geometric primitive, an inline visibility test in the coprocessor hardware device using an indirectly referenced visibility mask that is indexed based on a sub-region (e.g., micro-triangle in a mesh of micro-triangles overlaid on a triangle geometric primitive) containing the barycentric hit point from a ray-primitive intersection. It reduces or eliminates the need for AHS calls.

Example System Block Diagram

Figure 2:
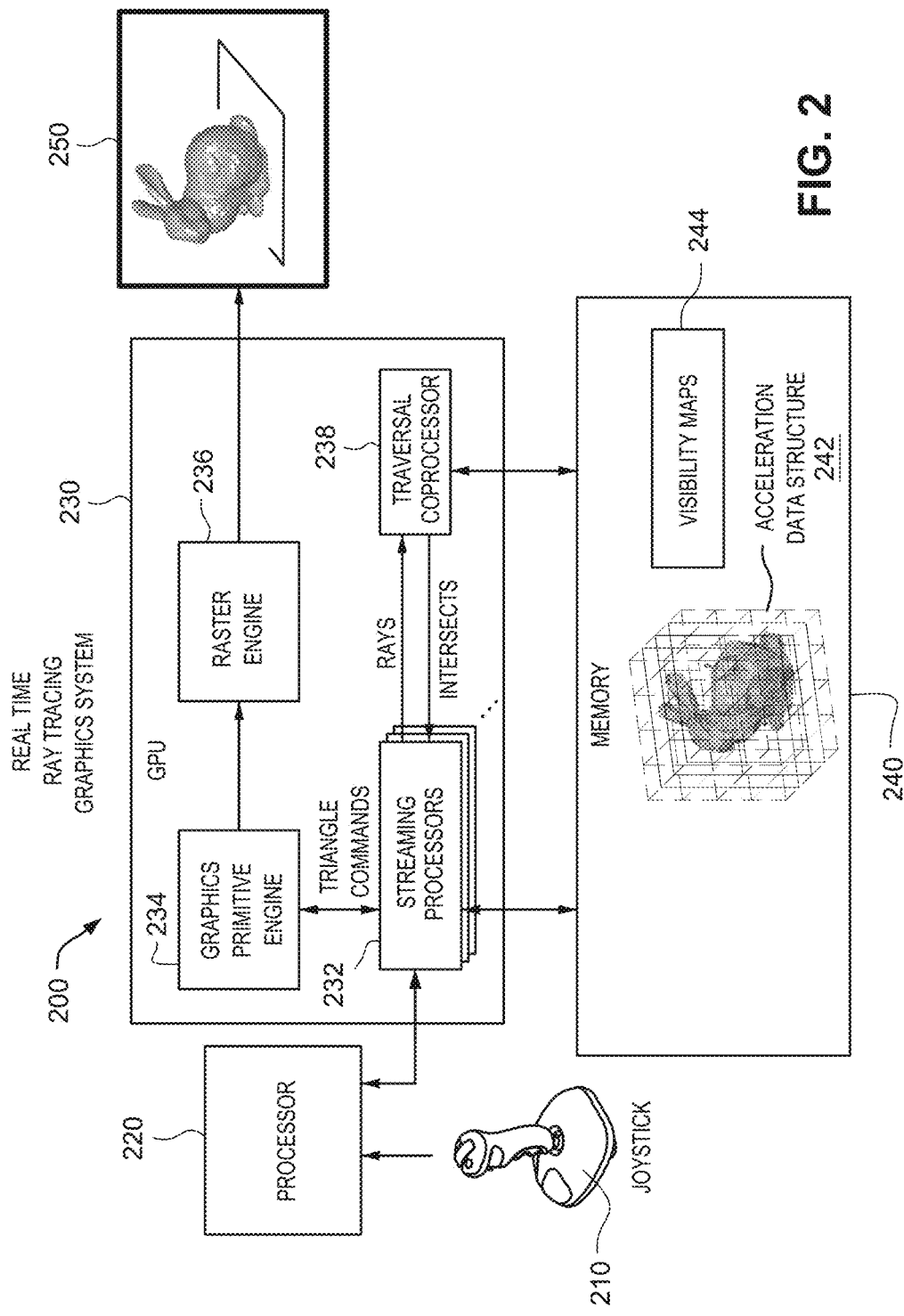
FIG. 2 illustrates an example non-limiting ray tracing graphics system with hardware acceleration, according to some embodiments.

FIG. 2 illustrates an example real time ray interactive tracing graphics system 200 for generating images using three dimensional (3D) data of a scene or object(s) including the acceleration data structure constructed as described below.

System 200 includes an input device 210, a processor(s) 220, a graphics processing unit(s) (GPU(s)) 230, memory 240, and a display(s) 250. The system shown in FIG. 2 can take on any form factor including but not limited to a personal computer, a smart phone or other smart device, a video game system, a wearable virtual or augmented reality system, a cloud-based computing system, a vehicle-mounted graphics system, a system-on-a-chip (SoC), etc.

The processor 220 may be a multicore central processing unit (CPU) operable to execute an application in real time interactive response to input device 210, the output of which includes images for display on display 250. Display 250 may be any kind of display such as a stationary display, a head mounted display such as display glasses or goggles, other types of wearable displays, a handheld display, a vehicle mounted display, etc. For example, the processor 220 may execute an application based on inputs received from the input device 210 (e.g., a joystick, an inertial sensor, an ambient light sensor, etc.) and instruct the GPU 230 to generate images showing application progress for display on the display 250.

Based on execution of the application on processor 220, the processor may issue instructions for the GPU 230 to generate images using 3D data stored in memory 240. The GPU 230 includes specialized hardware for accelerating the generation of images in real time. For example, the GPU 230 is able to process information for thousands or millions of graphics primitives (polygons) in real time due to the GPU's ability to perform repetitive and highly-parallel specialized computing tasks such as polygon scan conversion much faster than conventional software-driven CPUs. For example, unlike the processor 220, which may have multiple cores with lots of cache memory that can handle a few software threads at a time, the GPU 230 may include hundreds or thousands of processing cores or "streaming multiprocessors" (SMs) 232 running in parallel.

In one example embodiment, the GPU 230 includes a plurality of programmable high performance processors that can be referred to as "streaming multiprocessors" ("SMs") 232, and a hardware-based graphics pipeline including a graphics primitive engine 234 and a raster engine 236. These components of the GPU 230 are configured to perform real-time image rendering using a technique called "scan conversion rasterization" to display three-dimensional scenes on a two-dimensional display 250. In rasterization, geometric building blocks (e.g., points, lines, triangles, quads, meshes, etc.) of a 3D scene are mapped to pixels of the display (often via a frame buffer memory).

The GPU 230 converts the geometric building blocks (i.e., polygon primitives such as triangles) of the 3D model into pixels of the 2D image and assigns an initial color value for each pixel. The graphics pipeline may apply shading, transparency, texture and/or color effects to portions of the image by defining or adjusting the color values of the pixels. The final pixel values may be anti-aliased, filtered and provided to the display 250 for display. Many software and hardware advances over the years have improved subjective image quality using rasterization techniques at frame rates needed for real-time graphics (i.e., 30 to 60 frames per second) at high display resolutions such as 4096×2160 pixels or more on one or multiple displays 250.

To enable the GPU 230 to perform ray tracing in real time in an efficient manner, the GPU provides one or more "TTUs" 238 coupled to one or more SMs 232. The TTU 738 includes hardware components configured to perform (or accelerate) operations commonly utilized in ray tracing algorithms A goal of the TTU 238 is to accelerate operations used in ray tracing to such an extent that it brings the power of ray tracing to real-time graphics application (e.g., games), enabling high-quality shadows, reflections, and global illumination. Results produced by the TTU 238 may be used together with or as an alternative to other graphics related operations performed in the GPU 230.

More specifically, SMs 232 and the TTU 238 may cooperate to cast rays into a 3D model and determine whether and where that ray intersects the model's geometry. Ray tracing directly simulates light traveling through a virtual environment or scene. The results of the ray intersections together with surface texture, viewing direction, and/or lighting conditions are used to determine pixel color values. Ray tracing performed by SMs 232 working with TTU 238 allows for computer-generated images to capture shadows, reflections, and refractions in ways that can be indistinguishable from photographs or video of the real world. Since ray tracing techniques are even more computationally intensive than rasterization due in part to the large number of rays that need to be traced, the TTU 238 is capable of accelerating in hardware certain of the more computationally-intensive aspects of that process.

Given a BVH 242, the TTU 238 performs a tree search where each node in the tree visited by the ray has a bounding volume for each descendent branch or leaf, and the ray only visits the descendent branches or leaves whose corresponding bound volume it intersects. In this way, TTU 238 explicitly tests only a small number of primitives for intersection, namely those that reside in leaf nodes intersected by the ray. In the example non-limiting embodiments, the TTU 238 accelerates both tree traversal (including the ray-volume tests) and ray-primitive tests. As part of traversal, it can also handle at least one level of instance transforms, transforming a ray from world-space coordinates into the coordinate system of an instanced mesh. In the example non-limiting embodiments, the TTU 238 does all of this in MIMD fashion, meaning that rays are handled independently once inside the TTU.

In the example non-limiting embodiments, the TTU 238 operates as a servant (coprocessor) to the SMs (streaming multiprocessors) 232. In other words, the TTU 238 in example non-limiting embodiments does not operate independently, but instead follows the commands of the SMs 232 to perform certain computationally-intensive ray tracing related tasks much more efficiently than the SMs 232 could perform themselves. In other embodiments or architectures, the TTU 238 could have more or less autonomy.

In the examples shown, the TTU 238 receives commands via SM 232 instructions and writes results back to an SM register file. For many use cases, the TTU 238 can service the ray tracing query without further interaction with the SM 232. More complicated queries (e.g., involving alpha-tested triangles, primitives other than triangles, or more than a predetermined number of levels of instancing) may require multiple round trips (although the technology herein reduces the need for such "round trips" for certain kinds of geometry by providing the TTU 238 with enhanced capabilities to autonomously perform ray-bounding-volume intersection testing without the need to ask the calling SM for help). In addition to tracing rays, the TTU 238 is capable of performing more general spatial queries where an AABB or the extruded volume between two AABBs takes the place of the ray. Thus, while the TTU 238 is especially adapted to accelerate ray tracing related tasks, it can also be used to perform tasks other than ray tracing.

The TTU 238 thus autonomously performs a test of each ray against a wide range of bounding volumes, and can cull any bounding volumes that don't intersect with that ray. Starting at a root node that bounds everything in the scene, the traversal co-processor tests each ray against smaller (potentially overlapping) child bounding volumes which in turn bound the descendent branches of the BVH. The ray follows the child pointers for the bounding volumes the ray hits to other nodes until the leaves or terminal nodes (volumes) of the BVH are reached.

Once the TTU 238 traverses the acceleration data structure to reach a terminal or "leaf" node (which may be represented by one or multiple bounding volumes) that intersects the ray and contains a geometric primitive, it performs an accelerated ray-primitive intersection test to determine whether the ray intersects that primitive (and thus the object surface that primitive defines). The ray-primitive test can provide additional information about primitives the ray intersects that can be used to determine the material properties of the surface required for shading and visualization. Recursive traversal through the acceleration data structure enables the traversal co-processor to discover all object primitives the ray intersects, or the closest (from the perspective of the viewpoint) primitive the ray intersects (which in some cases is the only primitive that is visible from the viewpoint along the ray). See e.g., Lefrancois et al, NVIDIA Vulkan Ray Tracing Tutorial, December 2019, https://developer.nvidia.com/rtx/raytracing/vkray As described above, one way by which the TTU 238 accelerates traversal is by implementing a ray-triangle intersection test that can determine visibility of geometry primitives without SM or shader intervention. But when geometry uses transparency or translucency within a primitive, the determination of whether a ray intersects that geometry cannot be made by a ray-triangle test alone.

Figure 3:
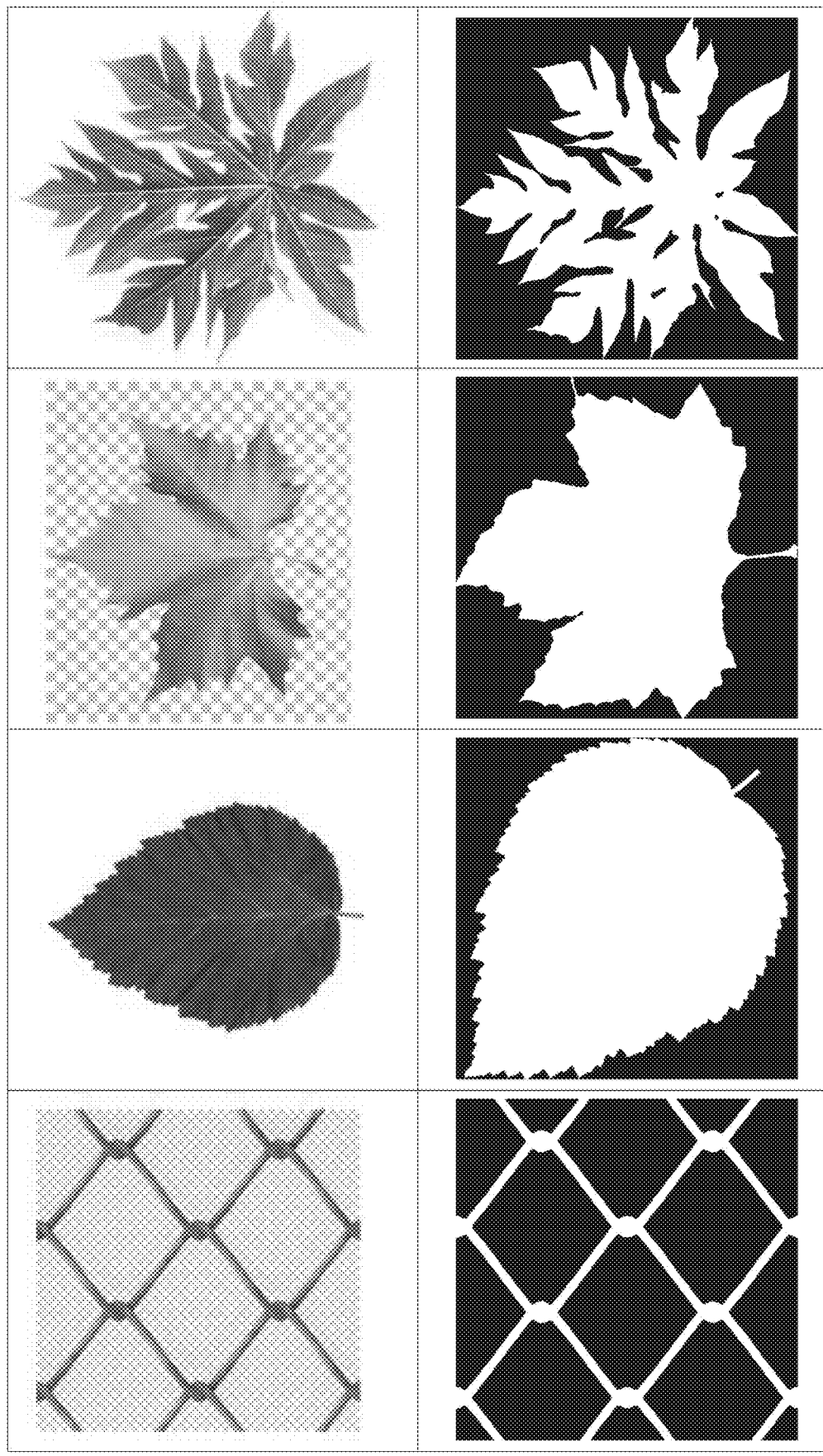
FIG. 3 illustrates example images and corresponding visibility masks that can be used in some embodiments.

A classic example of transparency is using a single triangle as the geometric primitive to represent a leaf whose actual shape is captured by some image or some texture mapped image. The single triangle can represent that leaf significantly more compactly than by using many triangles to explicitly describe the shape of the leaf. But when that triangle is intersected, in systems prior to embodiments of the present disclosure, a shader must be called to determine whether that hit is opaque or transparent. FIG. 3, in its top row, shows example leaves and chain link fence portion that, when represented as respective geometric primitives, would each include both opaque regions and transparent regions and thus force the TTU in systems prior to embodiments of the present disclosure to return to the SM to determine the visibility status for a hit on the primitive.

In the Microsoft DXR specification, potentially transparent geometry is directed to any hit shader (AHS). An AHS reads intersection attributes and performs calculations, including optionally a texture lookup, so that it can eventually indicate whether a hit should be ignored or accepted. An AHS can also be used for opaque geometry. The type of shader used, however, is not limited to AHS.

When the TTU in systems prior to embodiments of the present disclosure intersects geometry that is marked as alpha, in reference to traditional alpha channel testing and pixel culling, or needing an AHS, it stopped traversal for that ray and returned the hit information to the SM for processing in the AHS (except in some instances when the intersection could be ignored based on corresponding ray flags and/or information stored in the Intersection Management Unit (IMU) from earlier traversal).

The execution of the AHS can be costly. The stopping of the ray's traversal on the TTU and performing a round-trip to the SM and back is also costly for latency reasons and also because it can create thread divergence which reduces the utilization of resources within the TTU. The performance reduction from alpha-tested geometry can be significant, and is cause for some developers choosing to turn off transparency for some use cases.

Embodiments of this disclosure attempt to eliminate or at least reduce the performance loss from the TTU having to make AHS calls for determining visibility by providing the TTU 228 access, during ray traversal, to visibility masks 244 that are associated with geometric primitives that are intersected by the ray. In some embodiments, visibility masks 244 are included in the BVH 242, but in other embodiments they may be stored separately from the BVH.

Visibility Masks (VM)

A visibility mask (VM), accessible by the TTU, is used to represent the varying visibility of respective regions within the triangle. This allows the TTU to perform visibility tests within the TTU that would otherwise happen in an AHS run in the SM. Thus, VMs can not only reduce the number of AHS calls, but can also eliminate them completely in some use cases.

FIG. 3 illustrates example VMs (bottom row) for the image of the chain link fence portion and the images of several leaves in the top row of the figure).

In some embodiments, a VM may be applied to generic triangles effectively treating them as micro-meshes. When not using displacements, the barycentric coordinate system of any triangle may be sufficient for VM use. A VM, in some embodiments, is generated using a micro-mesh. More particularly, an example VM uses a micro-mesh across a triangle. A micro-mesh is a structured representation for geometry in computer graphics, and is a grid of micro-regions. The micro-mesh tessellation pattern can be any division across the triangle (e.g., vary resolution across the triangle, have non-linear spacing, non-triangular regions etc.). According to some embodiments, a micro-mesh is composed of a $2^n \times 2^n$ uniform barycentric grid creating micro-triangles. The description of example embodiments focuses on the representation which is a mesh of power-of-two regular meshes of micro-triangles. In some embodiments, the positions of the micro-triangles are computed using interpolated base-mesh positions and displacement vectors and scalar (e.g., UNORM11) displacements. Micro-meshes are described in U.S. application Ser. No. 17/946,235 titled "Micro-Meshes, A Structured Geometry For Computer Graphics" filed Sep. 16, 2022, the entire content of which is incorporated herein by reference. The visibility of micro-triangles is specified at an independent micro-triangle resolution and can simultaneously express binary visibility as well as software resolved visibility. The highly structured representation lends itself to compact representation and efficient rendering.

Figure 4A:
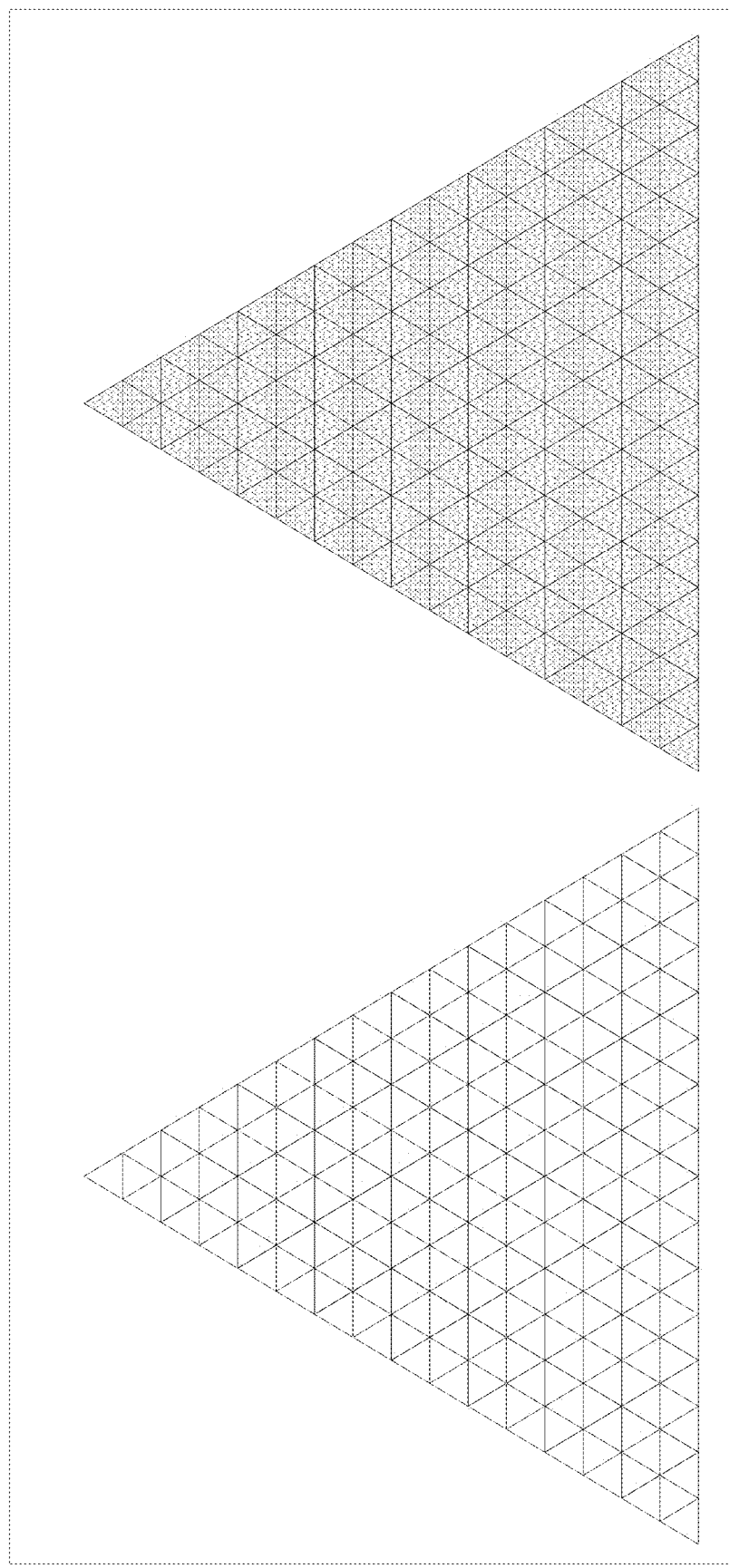
FIG. 4A illustrates two example micro-meshes according to some embodiments.

FIG. 4A shows example micro-meshes of size n=4 (256 micro-triangles) in the example on the left and of size n=5 (1024 micro-triangles) in the example on the right. In some implementations, a VM can comprises 64 million micro-triangles (n=13). The number of micro-triangles in the VM may be considered to represent the VM's resolution. The table in FIG. 23 shows the VM resolution at various levels (or orders) of subdivision.

Figure 4B:
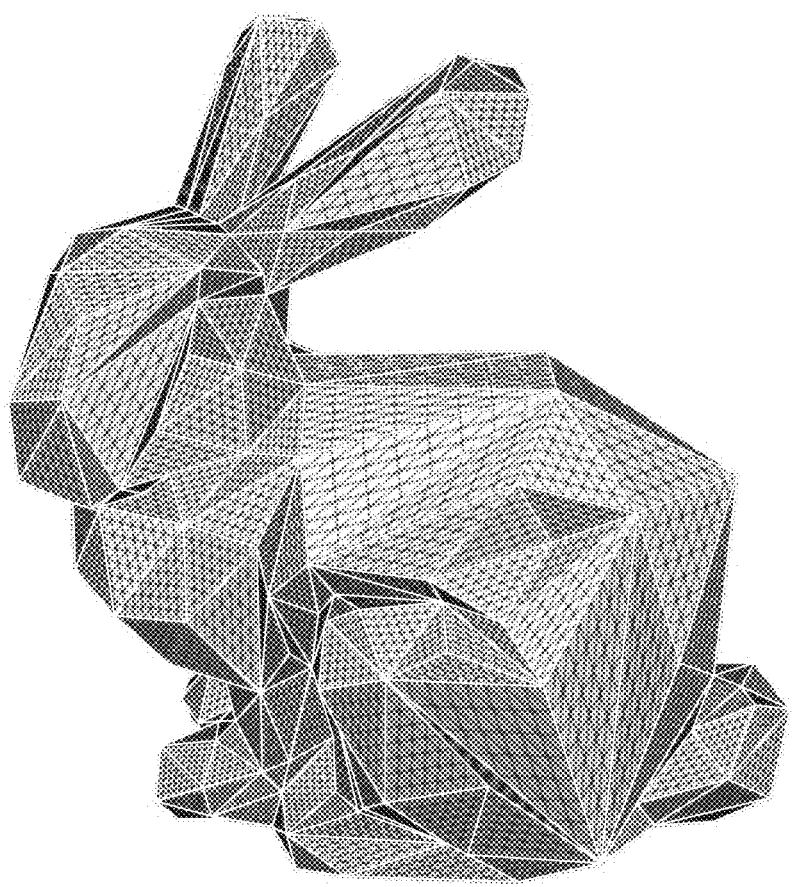
FIG. 4B illustrates an object overlaid with a grid of micro-meshes, according to some embodiments.

In order to render an object in a scene, the geometry of that object is overlaid with a VM that is generated on a grid of micro-meshes. FIG. 4B illustrates an example object of which the surface is overlaid with a grid of triangle micro-meshes where each triangle micro-mesh is subdivided to a plurality of micro-triangles. Embodiments of this disclosure are not limited to a maximum number of micro-triangles in a VM, and in some embodiments the number of micro-triangles in a VM may go even higher than the 64 million.

To generate the VM from the micro-mesh or grid of micro-meshes, each micro-triangle is assigned a visibility state. In some embodiments, each micro-triangle has an associated visibility state that classifies the micro-triangle region as either opaque, translucent, or transparent.

When, for example, during ray traversal of a BVH, a ray intersects a geometry primitive that has an associated VM, the barycentric coordinates of the intersection point (also referred to as "hit point") are used to index within the micro-mesh to lookup the visibility state for the micro-triangle region that corresponds to the intersection point. If it is opaque, then the hit is a valid hit and is committed. If it is masked as transparent, the hit is ignored. If it is translucent, then the AHS is called to determine how to handle the intersection. Prior to VMs of embodiments of this disclosure, any ray-primitive intersection (except in instances in which corresponding ray flags and/or information from previous traversals provide for the intersection to be ignored) would cause the TTU to halt traversal for the current ray and return to the SM for the AHS call. Note that the translucent state is sometimes referred to in this disclosure as "alpha", and sometimes as "unknown" since the opaque/transparency is not known.

Figure 5:
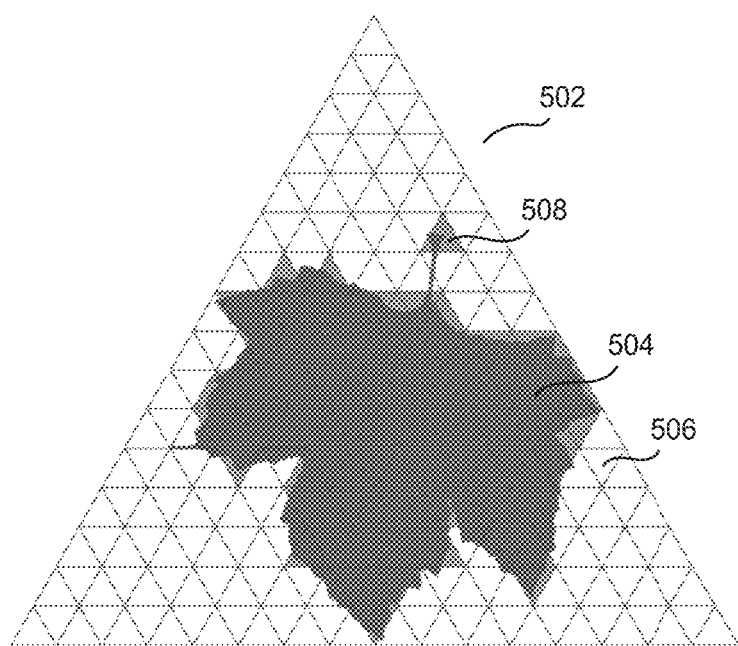
FIG. 5 illustrates a leaf cutout applied to an example visibility mask, according to some embodiments.

FIG. 5 shows a maple leaf of which the outline is approximated by a VM 502. In the illustrated embodiment, micro-triangles that are fully covered by the maple leaf are opaque (e.g., 504), micro-triangles that have no part covered by the maple leaf are transparent (e.g., 506), and micro-triangles of which a part is covered by the maple leaf are translucent (e.g., 508). In some other embodiments, the VM may classify respective micro-triangles according to a different classification of visibility states.

In an example embodiment in which micro-meshes and VMs are used in ray tracing, the area 502 may correspond to the geometric primitive that is tested in a ray-triangle intersection. The implementation would then, based on the micro-mesh overlaid on the area 502, identify the micro-triangle in which the intersection point occurs. The identified micro-triangle may then be used to lookup an index into the VM to obtain scene details of the area 502 at the intersection point. For example, the scene details may pertain to characteristics, at the identified micro-triangle, of the mask corresponding to the maple leaf as shown in FIG. 5.

In example embodiments, accessing the index requires only the intrinsic parameterization of the micro-mesh that overlays the geometric primitive 502, and does not require additional data describing the mapping between the subject triangle (e.g., geometric primitive 502) and points within the subject triangle to be stored. In example embodiments, all the information that is necessary to access the index are (1) where the point, or equivalently the small region (e.g., micro-triangle), is located in the micro-mesh and (2) how big the small region is. This is in contrast to texture mapping and the like that require texture coordinates which consume substantial storage and bandwidth. Stated differently, in contrast to approaches that require texture coordinates and the like, in example embodiments, the barycentric coordinates of the intersection point are used directly to access the VM, thereby avoiding the additional costs in storage and bandwidth associated with additional coordinates and providing for faster access to scene information.

VMs used with micro-meshes may be bit masks of one, two or some other number of bits per micro-triangle. The storage requirements for VMs correspond to the micro-triangle counts as summarized in the table shown in FIG. 23, varying with the resolution of the VM. A 1-bit per micro-triangle VM marks each corresponding micro-triangle as either opaque or transparent and does not require software intervention (e.g., AHS running on the SM) during the tracing of a ray.

Figure 6B:
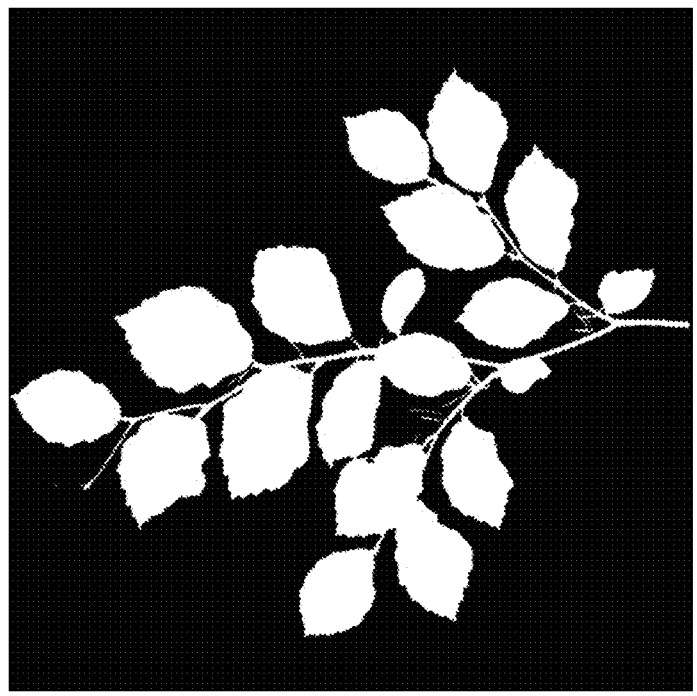
FIGS. 6A-6F illustrate a branch of leaves and a corresponding high resolution visibility texture (FIGS. 6A-B), example corresponding micro-meshes of different resolutions (FIGS. 6C-D), and examples of reducing 2-bit mappings of visibility masks, according to some example embodiments.
Figure 6A:
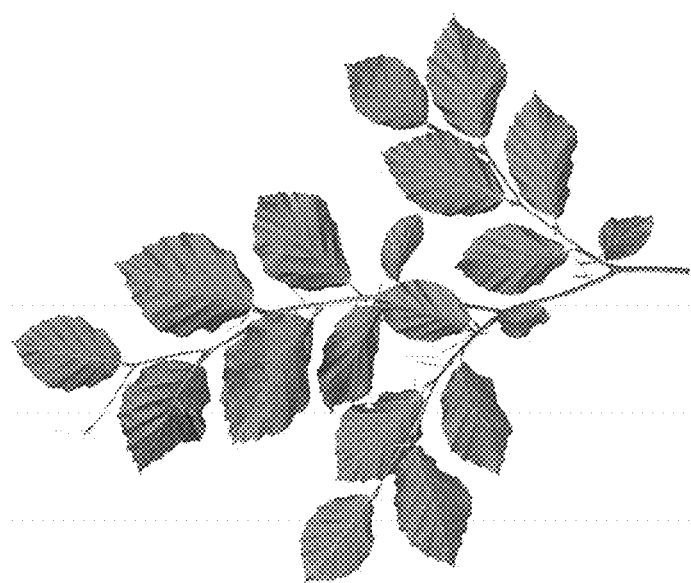
Figure 6D:
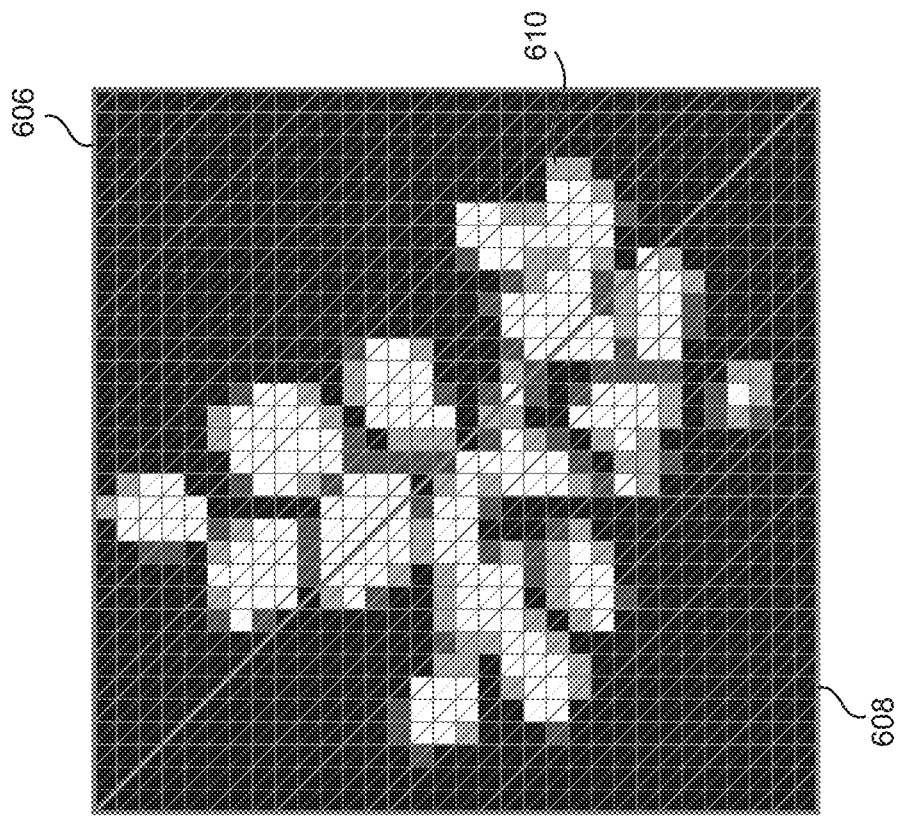
Figure 6C:
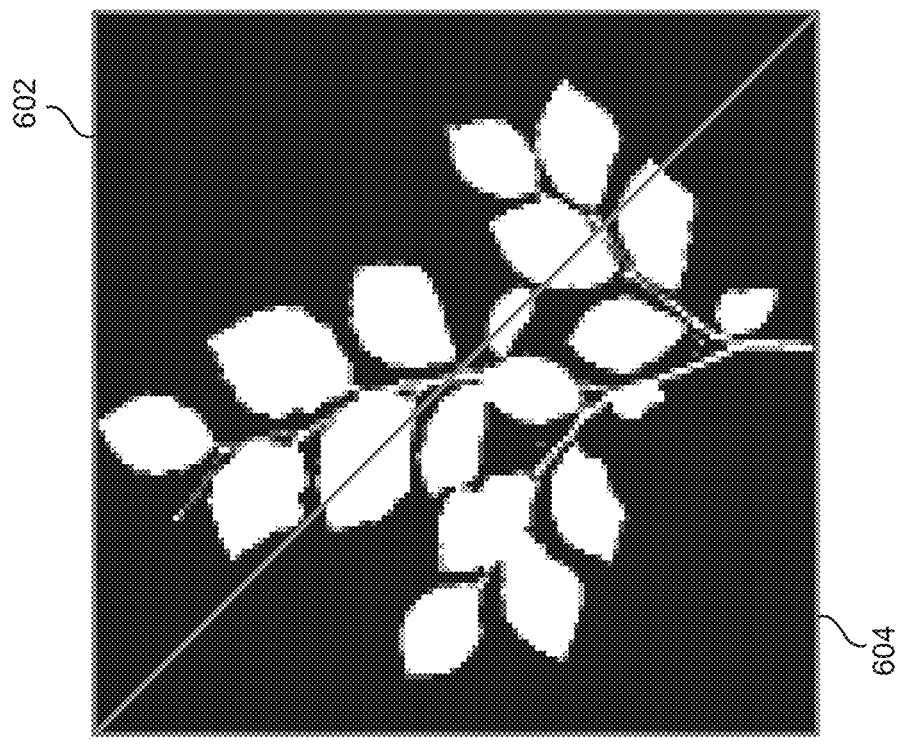

VMs may be high resolution such as shown in FIGS. 6A-6B where the branch of leaves shown on the left in FIG. 6A is represented in a VM of high resolution as shown in the right in FIG. 6B. If memory consumption is a concern for an implementation, the resolution of a VM may be reduced substantially. Resolution reduction often is the most effective form of compression. With resolution reduction, it is possible to retain full rendering fidelity because a shader will still be called for any unresolved visibility states. FIG. 6C shows two 128-bit VMs 602 and 604 providing 64:1 compression, and FIG. 6D shows two 32-bit VMs 606 and 608 providing 1024:1 compression. When 1-bit masks such as in FIG. 6B are down-sampled as shown in FIGS. 6C-6D, it can be seen that regions of the mask represent areas of the original mask that are a mix of opaque and transparent. Those areas are shown as gray (e.g., micro-triangle 610) in FIG. 6D. Note that in the lower resolution VM FIG. 6D, the micro-triangles of the mask are shown, in addition to the outline of the two VMs.

When using down-sampled VMs, the AHS may be used to resolve the visibility at the same fidelity as the original mask. For example, if a ray intersects a "gray" micro-triangle as shown in FIG. 6D for example, then the AHS is invoked to determine the visibility state outcome for that micro-triangle. In both reduced resolution examples shown, most micro-triangles are either opaque or transparent. This means that most of the time a ray intersection does not require invocation of software to resolve the intersection.

The 2-bit visibility masks encode four states, which in turn provides some flexibility of interpretation. In an example embodiment, the four states of a 2-bit VM is defined as transparent, unknown transparent, unknown opaque, and opaque.

Figure 6F:
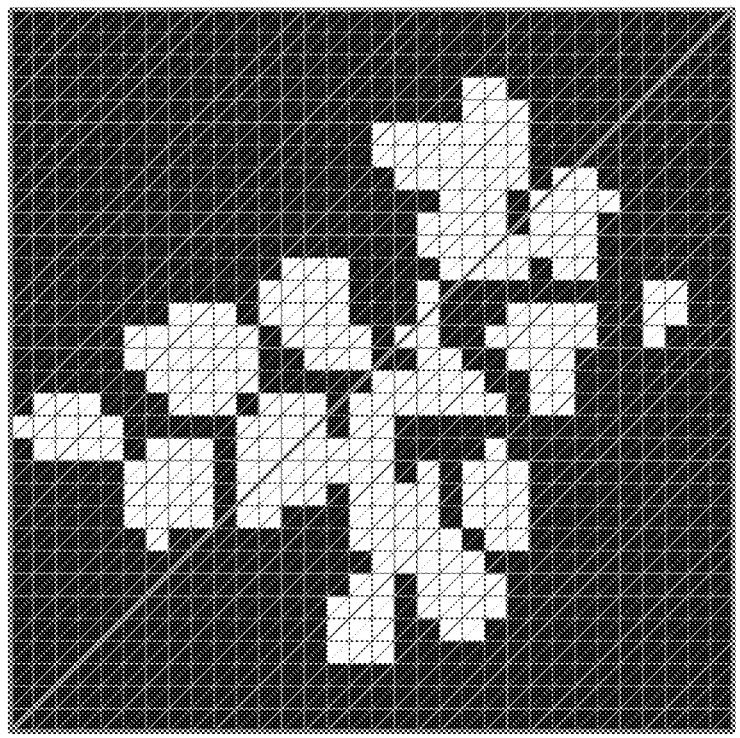
Figure 6E:
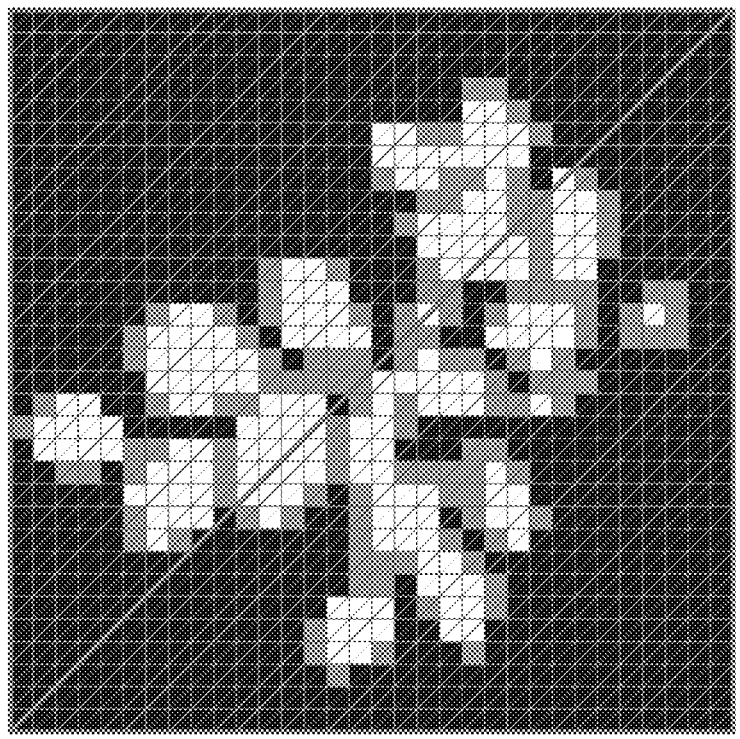

For rendering some ray-traced effects, exact resolution is not required. For example, soft shadows may be resolved using a lower resolution proxy. To facilitate use of such proxies, a four state VM can be remapped. In one remapping of these states, unknown-transparent is associated with transparent, and unknown-opaque is associated with opaque, and in doing so interprets the 2-bit per micro-triangle VM it into a 1-bit per micro-triangle map requiring no software fallback because there are no unknown states. In a second interpretation of the four states, software is invoked when the micro-triangle that is struck is categorized as either of the unknowns. In the latter setting, most rays are resolved without software assistance, but fidelity/accuracy is preserved for any so-called unknown micro-triangle that happens to be intersected. These two remappings are illustrated in FIGS. 6E-6F. FIG. 6E represents the alternative 2-bit mapping with the three visibility states transparent, unknown and opaque, and FIG. 6F shows the corresponding mapping with the two visibility states transparent and opaque. It can be seen that of the cluster of micro-triangles designated as visibility state unknown (shown in gray) towards the bottom of the VM of FIG. 6E, has been remapped to some transparent micro-triangles (shown in clear) and some opaque (shown as black).

Figure 7B:
FIGS. 7A and 7B illustrate a translucent moss texture with shadow mask and translucency map, usable in some embodiments
Figure 7A:

2-bit encodings can also be used to accelerate the ray tracing of translucent objects. These objects are a mix of transparent, opaque and translucent, where only the translucent portions require software to resolve. Such materials also lend themselves to a simplification when rendering lower frequency/fuzzy effects like shadows where no software is required for tracing. In FIGS. 7A-7B, shadow and translucency maps are illustrated with an example. FIG. 7A shows a translucent moss texture for which FIG. 7B shows the shadow mask above and translucency map below. This shows that the 2-bit 4-state implementation can force the regions of unknown visibility status to be either transparent or opaque. As described below, this can be done on a per ray basis. For example, a ray can be designated as a shadow ray (and thus not caring about translucency), and therefore force all the unknown regions using the shadow map (FIG. 7B, top) to be either opaque or transparent.

For performance efficiency and to reduce the size of memory required, it is important that the VM is efficiently encoded. In addition to reducing the size of the amount of memory occupied by the VM, it should also be efficiently accessible. In some embodiments, run-length encoding is used to code the sequences of values. A mapping is needed from a VM to a sequence, because a sequence is a list, a one-dimensional list of numbers and a VM is a triangular image of mask values. Run-length encoding is more efficient if the sequence is spatially coherent. The one-dimensional traversal of an image is more coherent if one value is spatially near the next in sequence. If square images were considered, two traversal orders corresponding to Hilbert or Morton space-filling curves yield the requisite efficiencies. The Hilbert traversal order is may be the more coherent while the Morton order is computationally less costly to compute. The cost of computation is of importance because a frequent operation takes a two-dimensional coordinate and produces the index of the corresponding mask value.

Figure 8:
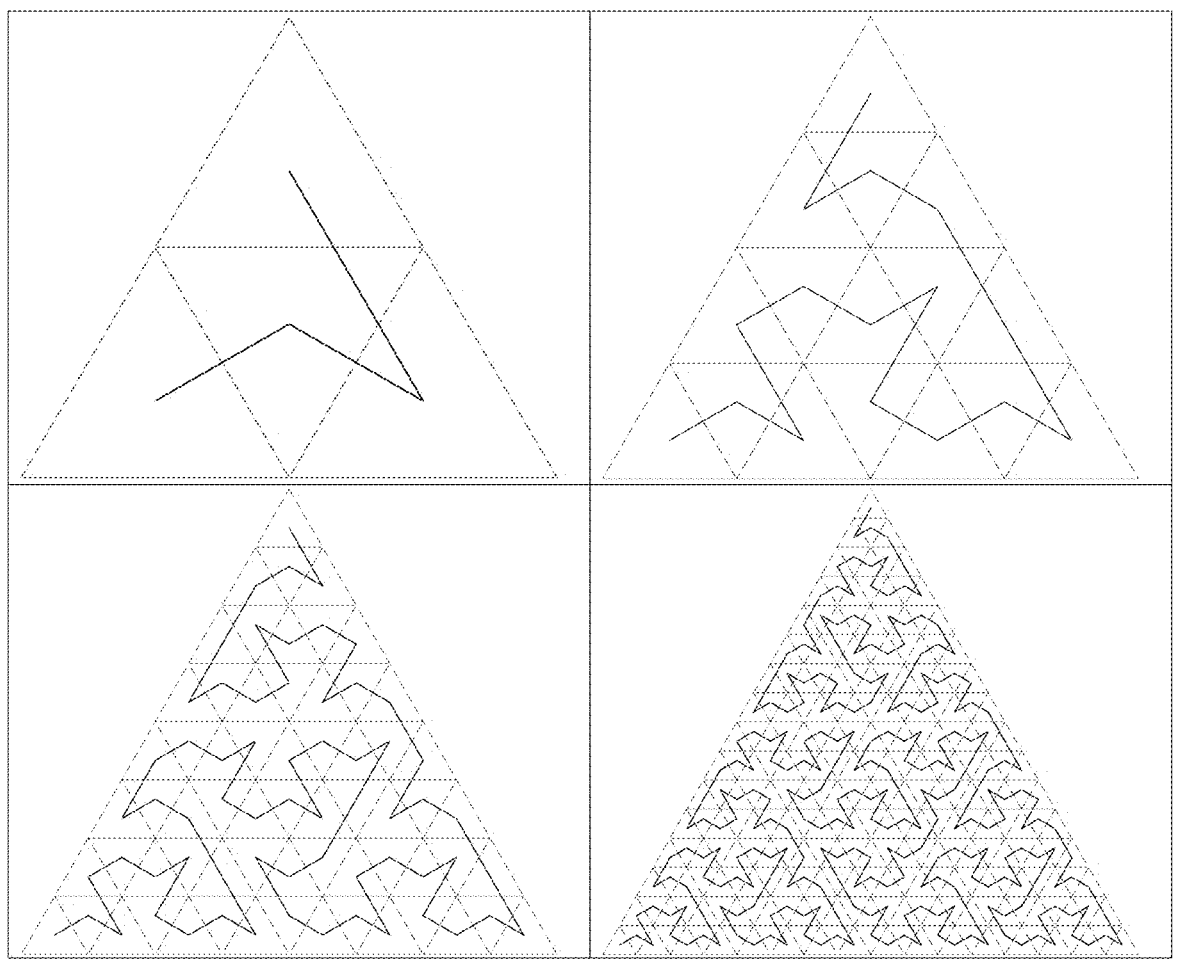
FIG. 8 illustrates example triangle micro-meshes and a space-filling curve that can be used to traverse the micro-mesh, according to embodiments.

For regular triangular regions like the micro-meshes in some example embodiments, a highly coherent traversal order may be used. The traversal shown in FIG. 8 is similar in spirit to a Hilbert curve (e.g., Hilbert curve is usually defined for rectangular grids) but is designed to be computationally simpler. The illustrated traversal path can be considered a triangular Hilbert curve. As illustrated the same traversal path can be designed for the respective levels of the hierarchy of levels of subdivision of the micro-mesh. For example, at the levels 1, 2, 3 and 4, the triangle (i.e., the outer triangle) is subdivided to 4, 16, 64 and 256 micro-triangles, respectively. The illustrated traversal path enables, in example embodiments, the computation to go from an index (in the VM) to discrete barycentric coordinates, and from barycentric coordinates to an index is inexpensive.

Figure 9A:
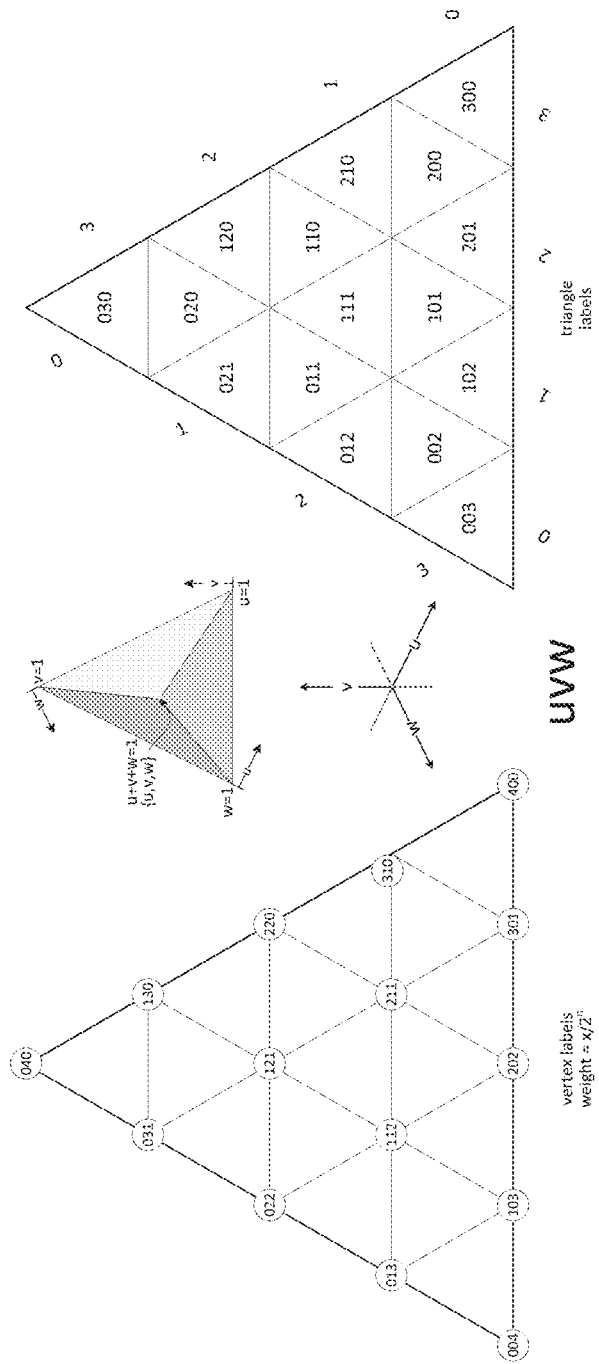
FIG. 9A illustrates example labeling corresponding to barycentric coordinates, in accordance with some embodiments.

Some labeling and terminology is first established to aid in the description. FIG. 9A illustrates barycentric coordinates and discrete barycentric coordinates. The variables u, v, w are used as the barycentric coordinates. Any position within the triangle can be located using two of the three values, because the coordinates are non-negative and sum to one. If the area of the triangle is itself 1.0 then then u, v, w are equal to the areas of the three sub-triangles formed by connecting the point being located with the three triangle vertices. If the triangle is of greater or lesser area, then u, v, w represent proportional area. The coordinates can also be interpreted as the perpendicular distance from an edge to its opposite vertex, also varying from 0 to 1.

The term discrete barycentric coordinates is used to refer to and address the individual micro-triangles in a micro-mesh. The micro-triangles are named using a <u,v,w> three-tuple where the valid values vary with the resolution. In FIG. 9A, a micro-mesh with four segments (in this example, micro-triangles) along each edge is shown, for a total of sixteen micro-triangles. Each micro-triangle has a name (label) where the members of the tuple <u,v,w> sum to two or three. Any pair of such triangles will differ by one in one of the tuple members. Also note that the mesh is made up of rows of micro-triangles of constant u, v, or w. The micro-triangle labels are shown in the triangle micro-mesh shown on the right, and corresponding vertex labels are shown in the triangle micro-mesh shown on the left.

When encoding the micro-mesh, the micro-triangles of the micro-mesh are traversed. An illustration of the first four generations of the space filling curve used for traversing the micro-mesh according to some embodiments is shown in FIG. 8. Each of the four traversal patterns shows a traversal through a different level of resolution of the same triangle. While only the first four generations (levels) of the traversal curve is shown in FIG. 8, it will be understood that a hierarchy of micro-meshes of a higher number of levels each level providing a different level of detail (or in other words, a different resolution) can be used to encode VMs for a geometry primitive such as a triangle geometry primitive. According to an embodiment, a hierarchy of micro-mesh grids may have the resolution of increase by powers of four for each level of the hierarchy. For example, FIG. 8 shows a triangle area for which the number of triangular micro-meshes for respective levels are 4, 16, 64 and 256.

FIG. 9B shows some code examples for determining an index into a data structure in a memory based on a barycentric coordinate of a hit point. The hit point coordinates are provided as input to the "bary2index( )" function which provides the index to the data structure as its output. In the example function, two of the coordinates are provided (u and v) because the third coordinate w can be calculated from the provided two coordinates. The function additionally requires a level parameter which defines the level of subdivision of the micromesh.

The bary2index( ) calls quantizeBary( ) function to determine the discrete barycentric coordinates that correspond to the hit point that is returned as floating point barycentric coordinates. Alternatively bary2index( ) calls quantizeBaryClamp( ) function which performs the floating point to discrete conversion of the barycentric coordinates and additionally also performs a clamping operation. The clamping operation provides for clamping a hit point that is slightly outside the triangle on one side to be just inside the triangle on the same side—whereas without the clamping, the calculation could wrap the hit point to the other side of the triangle.

Materials and Reuse of VMs

Computer graphics rendering systems often make use of material systems, where materials are composed of various properties grouped together. Material properties include texture maps controlling shininess, albedo color, as well as alpha and displacement. Conventional alpha textures naturally map to VMs. A triangle such as a geometric primitive that is intersected by a ray references conventional textures using texture coordinates. These auxiliary coordinates define the mapping between triangle and texture map. Creating texture coordinates is a substantial burden in the content creation pipeline of the graphics rendering system. Unlike conventional texture maps, that have complex headers etc. to be set up at a level of overhead that may be prohibitive for real-time operation, VMs use the intrinsic coordinate system of triangles—barycentric coordinates. Consequently, VMs do not require the creation of texture coordinates. A benefit of determining visibility state in accordance with example embodiments in computer graphics systems, is the substantial performance improvement that can be achieved due to the avoiding of the cost of creating texture coordinates.

In some embodiments, resources such as, for example, textures and VMs are grouped into materials. When instances of an object are rendered it is common to associate a potentially different material with each object instance. Because VMs can represent material properties that help define the visibility of an object, a mechanism is included in example embodiments to associate different materials (e.g., groups of VMs) with ray traced instances. In some example embodiments described above, a triangle directly references its associated VM. In contrast, in some other embodiments, treating VMs as material properties, each triangle references its associated resources via an index into an array of VMs. A given material has an associated array of VMs. When an instance is invoked using a material, the corresponding VM array is bound to that instance. Thus, the depiction of different materials is one example of reuse of VMs.

Another form of reuse stems from a common CAD construction technique where object components are exact mirror images of each other. Triangle meshes, representing objects, are normally oriented such that all triangles have the same vertex ordering when viewed from the outside. Vertices are organized in clockwise (or counterclockwise) order around the triangle that they define. The mirroring operation used in model construction, naturally changes vertex order, making mirrored triangles appear to face in the opposite direction. To restore consistent triangle facing, the mirrored vertex order is reversed. However, because VM addressing is derived from vertex ordering, to correct for mirroring operations, it must be known when vertex order has been modified. A VM may be reused across normal and mirrored instances because the map/mask addressing takes mirroring into account.

Operations with Displacement Maps (DMs)

In some embodiments, the VM and/or the geometry for which the VM is defined is additionally associated with a "displacement map" that enables the TTU to, in addition to determining the visibility status associated with the geometry at a hit point, also determine a relative position of that geometry at the hit point without returning the hit point information to the SM to be resolved there. Displacement maps are described in U.S. application Ser. No. 17/946,515 titled "Displaced Micro-meshes for Ray and Path Tracing" filed Sep. 16, 2022, the entire content of which is incorporated herein by reference.

Figure 10A:
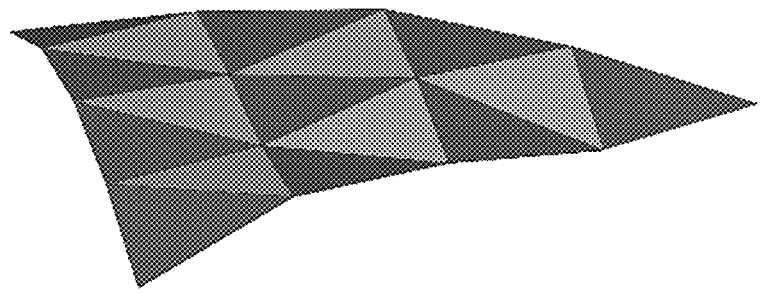
FIGS. 10A-10C illustrates the use of a visibility mask and a displacement map, according to some embodiments.
Figure 10B:
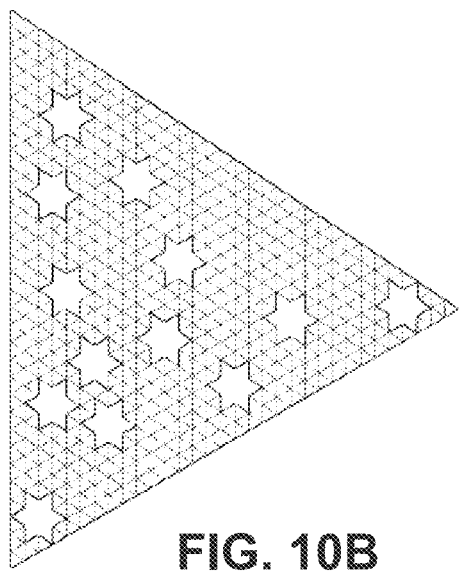
Figure 10C:
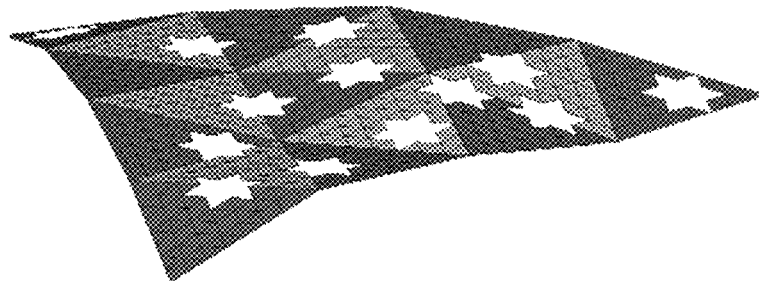

Some example embodiments, optionally, and in addition to a VM, also use a DM for rendering a geometry primitive. FIGS. 10A, 10B and 10C schematically illustrate displacement mapped micro-triangles, visibility masked micro-triangles, and a micro-mesh defined by combined DM and VM, respectively. That is, the micro-mesh shown in FIG. 10C has both the displacement shown in FIG. 10A and the visibility mask shown in FIG. 10B applied.

Compressing VMs

Some example embodiments use a space-filling curve that is stored directly as uncompressed. In these embodiments, "unknown" visibility states with varying degrees of resolution is made use of to provide compression. For regular triangular regions such as triangle micro-meshes (e.g., FIG. 4A), a highly coherent traversal order such as that described above in relation to FIG. 8 can be used. The traversal path is similar in spirit to a Hilbert curve but is simpler to compute. The computation to go from an index to discrete barycentric coordinates, and from coordinates to an index is inexpensive (see FIG. 9B). The index orders for the first four levels of subdivision are shown in FIG. 8.

In some other embodiments, run-length encoding or another coding scheme may be used to compress the VM in accordance with a space-filling traversal curve such as the shown in FIG. 8. Run-length encoding etc. as can be applied to the space-filling curve such as that in FIG. 8. U.S. patent application Ser. No. 17/946,235 titled "Micro-Meshes, A Structured Geometry For Computer Graphics" filed Sep. 16, 2022, already incorporated by reference, provides a more detailed description of run-length encoding for VMs.

Example Ray Tracing Processes

Figure 11A:
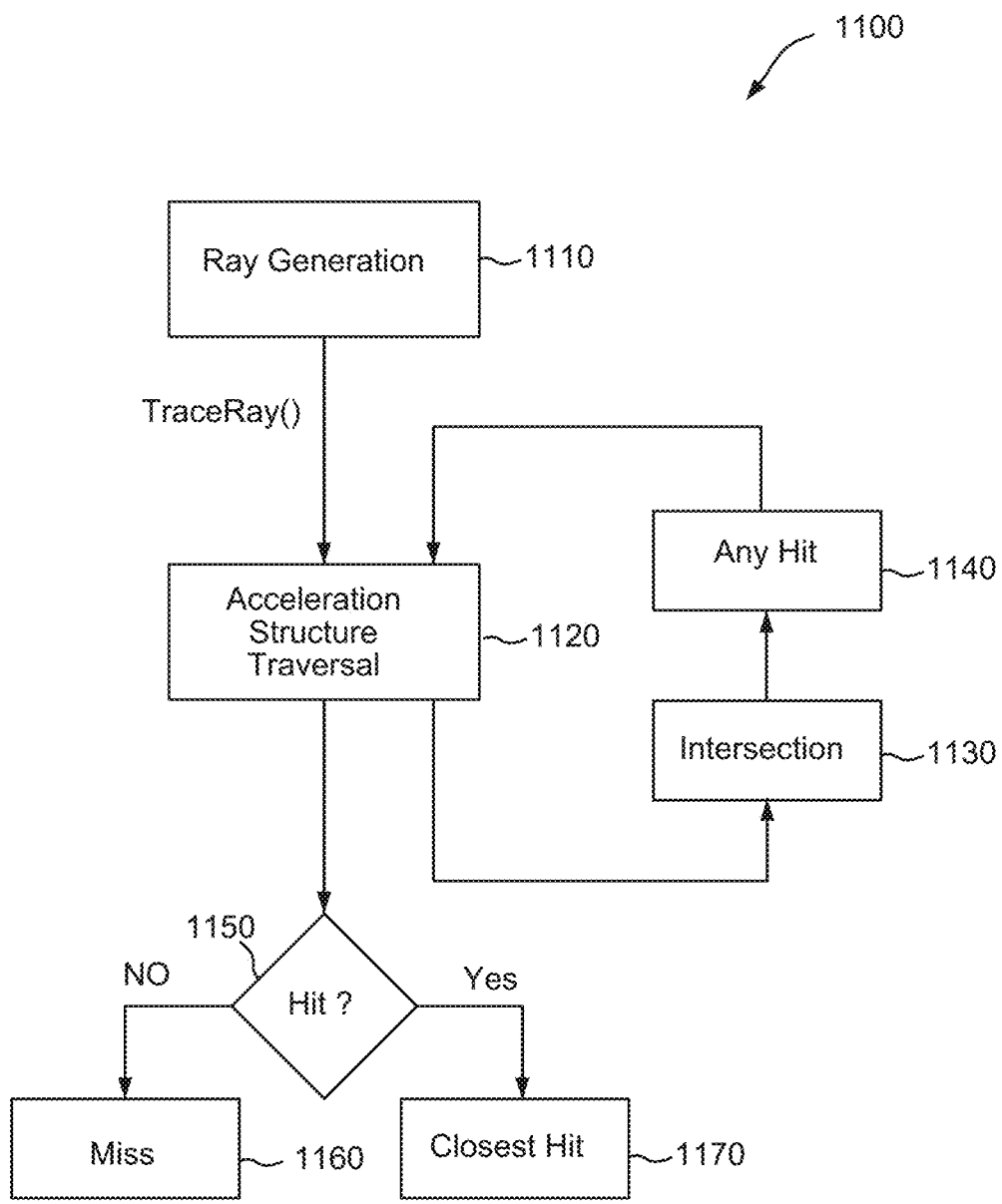
FIG. 11A is a flowchart of an example non-limiting ray tracing graphics pipeline according to some embodiments.

FIG. 11A shows an exemplary ray tracing shading pipeline 1100 that may be performed by SM 232 and accelerated by TTU 238. The ray tracing shading pipeline 1100 starts by an SM 232 invoking ray generation 1110 and issuing a corresponding ray tracing request to the TTU 238. The ray tracing request identifies a single ray cast into the scene and asks the TTU 238 to search for intersections with an acceleration data structure the SM 232 also specifies. The TTU 238 traverses (FIG. 11A block 1120) the acceleration data structure to determine intersections or potential intersections between the ray and the volumetric subdivisions and associated triangles the acceleration data structure represents. Potential intersections can be identified by finding bounding volumes in the acceleration data structure that are intersected by the ray. Descendants of non-intersected bounding volumes need not be examined.

For triangles within intersected bounding volumes, the TTU 238 ray-primitive test block 1320 (see FIG. 13) performs an intersection 1130 process to determine whether the ray intersects the primitives. In some embodiments this operation includes referring to a VM associated with the primitive. The TTU 238 returns intersection information to the SM 232, which may perform an "any hit" shading operation 1230 in response to the intersection determination. For example, the SM 232 may perform (or have other hardware perform) a texture lookup for an intersected primitive and decide based on the appropriate texel's value how to shade a pixel visualizing the ray. The SM 232 keeps track of such results since the TTU 238 may return multiple intersections with different geometry in the scene in arbitrary order.

Figure 11B:
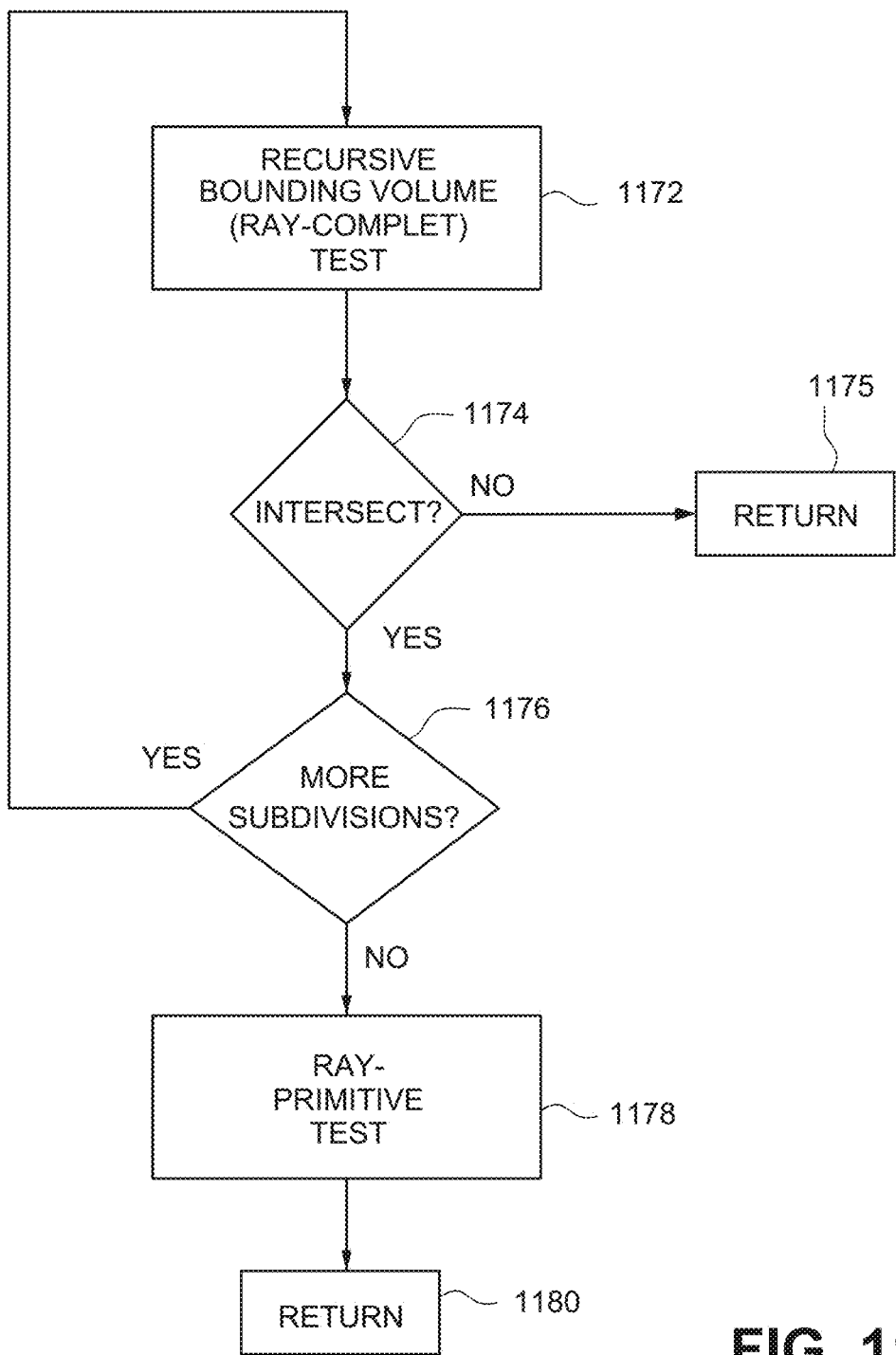
FIG. 11B is a flowchart of example non-limiting hardware based ray tracing operations, according to some embodiments.

FIG. 11B is a flowchart summarizing example ray tracing operations the TTU 238 performs as described above in cooperation with SM(s) 232. The FIG. 11B operations are performed by TTU 238 in cooperation with its interaction with an SM 232. The TTU 238 may thus receive the identification of a ray from the SM 232 and traversal state enumerating one or more nodes in one or more BVH's that the ray must traverse. The TTU 238 determines which bounding volumes of a BVH data structure the ray intersects (the "ray-complet" test 1172). The TTU 238 can also subsequently determine whether the ray intersects one or more primitives in the intersected bounding volumes and which triangles are intersected (the "ray-primitive test" 1178)—or the SM 232 can perform this test in software if it is too complicated for the TTU to perform itself In example non-limiting embodiments, complets specify root or interior nodes (i.e., volumes) of the bounding volume hierarchy with children that are other complets or leaf nodes of a single type per complet.

Figure 1A:
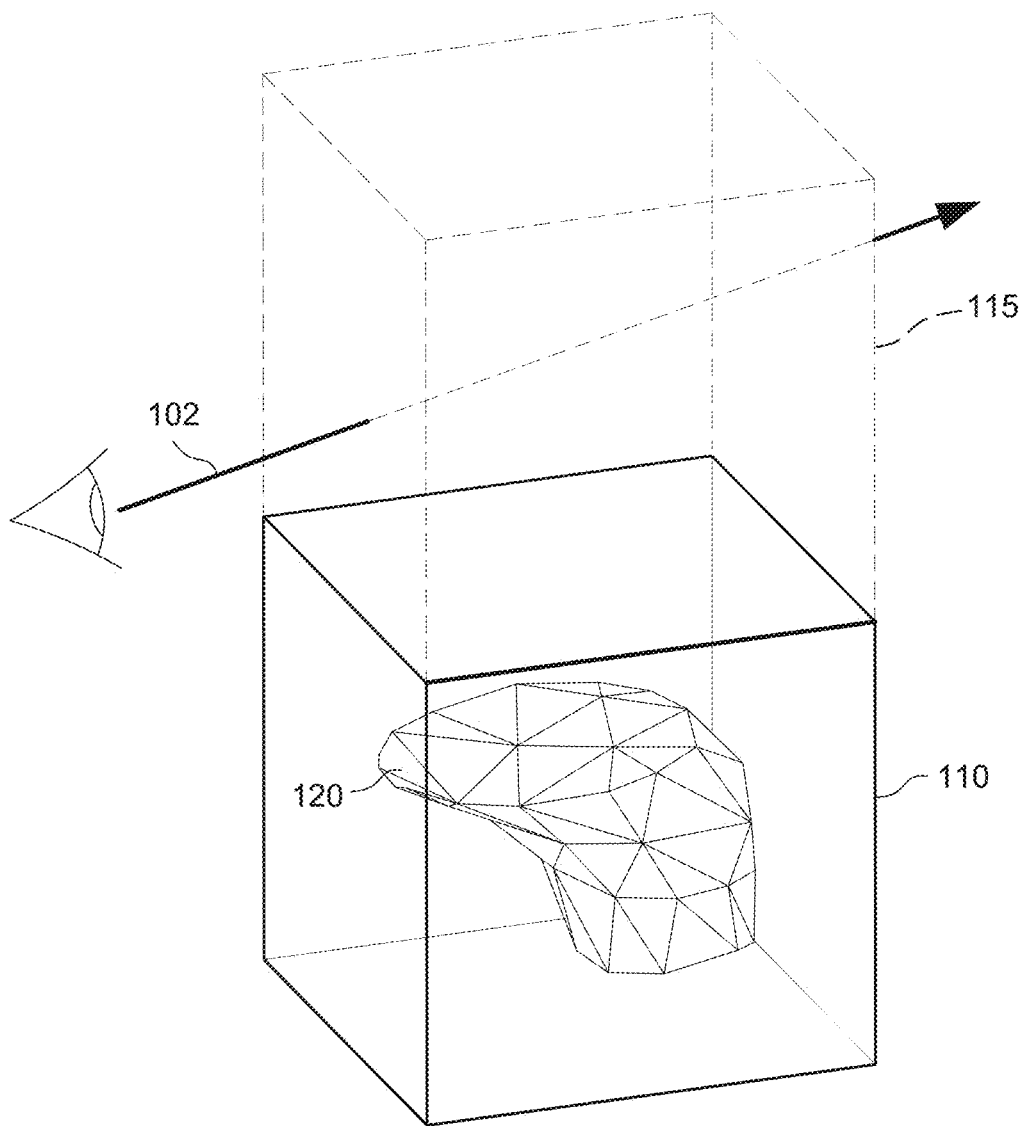
FIGS. 1A-1C show example simplified ray tracing tests to determine whether the ray passes through a bounding volume containing geometry and whether the ray intersects geometry within the bounding volume.
Figure 1B:
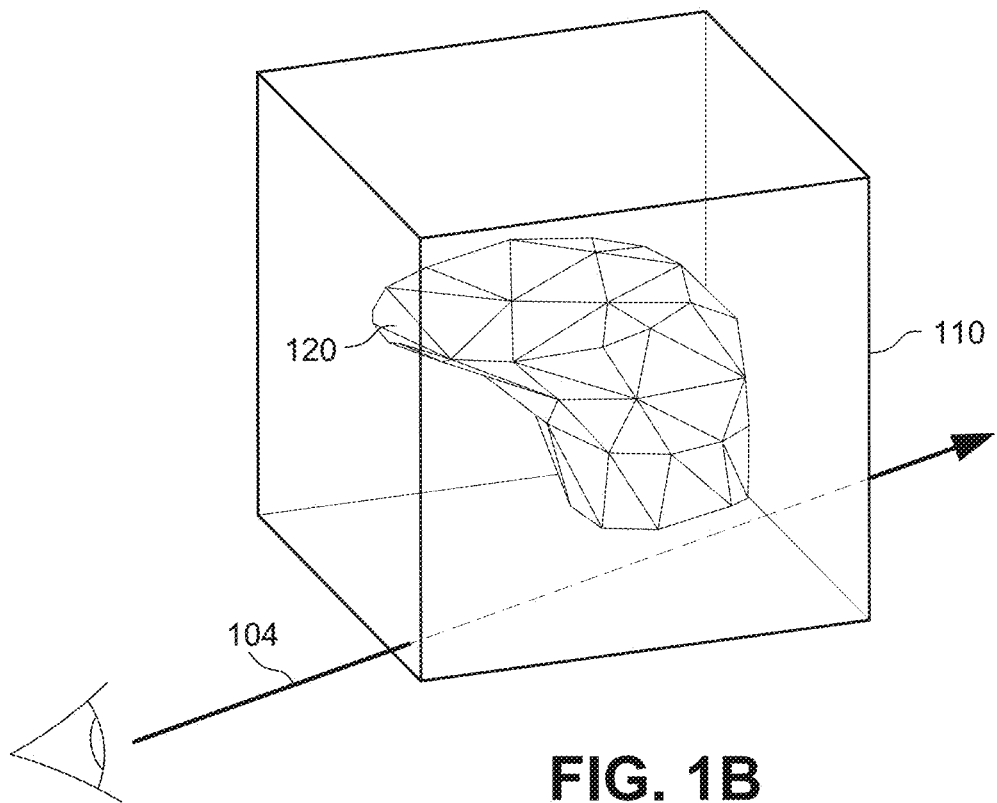
Figure 1C:
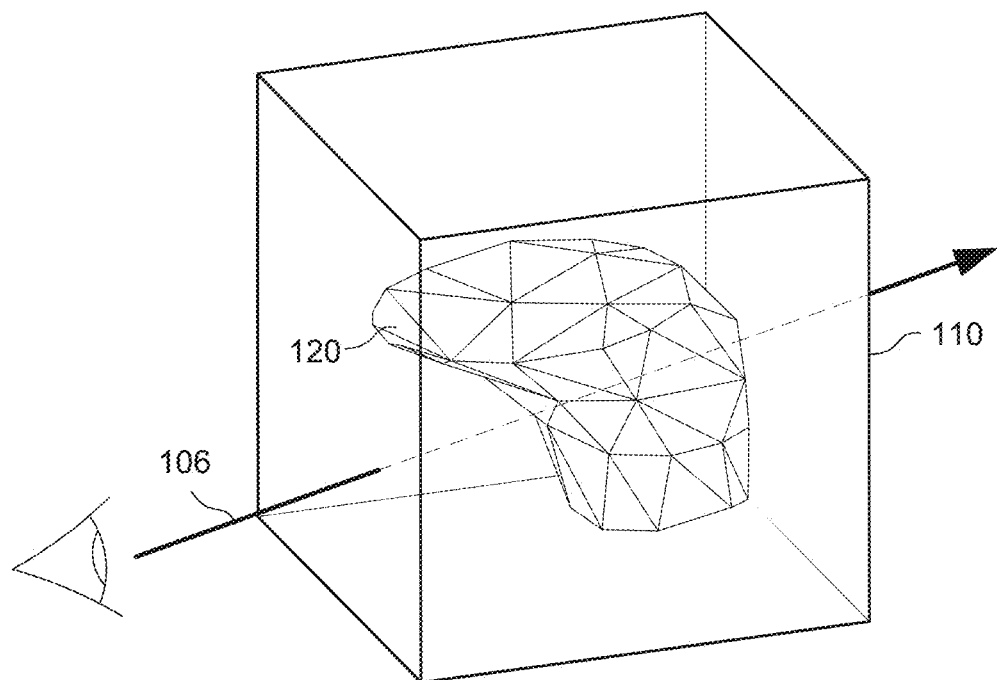

First, the TTU 238 inspects the traversal state of the ray. If a stack the TTU 238 maintains for the ray is empty, then traversal is complete. If there is an entry on the top of the stack, the traversal co-processor 238 issues a request to the memory subsystem to retrieve that node. The traversal co-processor 238 then performs a bounding box test 1172 to determine if a bounding volume of a BVH data structure is intersected by a particular ray the SM 232 specifies (step 1172, 1174). If the bounding box test determines that the bounding volume is not intersected by the ray ("No" in step 1174), then there is no need to perform any further testing for visualization and the TTU 238 can return this result to the requesting SM 232. This is because if a ray misses a bounding volume (as in FIG. 1A with respect to bounding volume 110), then the ray will miss all other smaller bounding volumes inside the bounding volume being tested and any primitives that bounding volume contains.

If the bounding box test performed by the TTU 238 reveals that the bounding volume is intersected by the ray ("Yes" in Step 1174), then the TTU determines if the bounding volume can be subdivided into smaller bounding volumes (step 1176). In one example embodiment, the TTU 238 isn't necessarily performing any subdivision itself Rather, each node in the BVH has one or more children (where each child is a leaf or a branch in the BVH). For each child, there is one or more bounding volumes and a pointer that leads to a branch or a leaf node. When a ray processes a node using TTU 238, it is testing itself against the bounding volumes of the node's children. The ray only pushes stack entries onto its stack for those branches or leaves whose representative bounding volumes were hit. When a ray fetches a node in the example embodiment, it doesn't test against the bounding volume of the node—it tests against the bounding volumes of the node's children. The TTU 238 pushes nodes whose bounding volumes are hit by a ray onto the ray's traversal stack in an order determined by ray configuration. For example, it is possible to push nodes onto the traversal stack in the order the nodes appear in memory, or in the order that they appear along the length of the ray, or in some other order. If there are further subdivisions of the bounding volume ("Yes" in step 1176), then those further subdivisions of the bounding volume are accessed and the bounding box test is performed for each of the resulting subdivided bounding volumes to determine which subdivided bounding volumes are intersected by the ray and which are not. In this recursive process, some of the bounding volumes may be eliminated by test 1174 while other bounding volumes may result in still further and further subdivisions being tested for intersection by TTU 238 recursively applying steps 1172-1176.

Once the TTU 238 determines that the bounding volumes intersected by the ray are leaf nodes ("No" in step 1176), the TTU 238 and/or SM 232 performs a primitive (e.g., triangle) intersection test 1178 to determine whether the ray intersects primitives in the intersected bounding volumes and which primitives the ray intersects. The TTU 238 thus performs a depth-first traversal of intersected descendent branch nodes until leaf nodes are reached. The TTU 238 processes the leaf nodes. If the leaf nodes are primitive ranges, the TTU 238 or the SM 232 tests them against the ray. If the leaf nodes are instance nodes, the TTU 238 or the SM 232 applies the instance transform. If the leaf nodes are item ranges, the TTU 238 returns them to the requesting SM 232. In the example non-limiting embodiments, the SM 232 can command the TTU 238 to perform different kinds of ray-primitive intersection tests and report different results depending on the operations coming from an application (or an software stack the application is running on) and relayed by the SM to the TTU. For example, the SM 232 can command the TTU 238 to report the nearest visible primitive revealed by the intersection test, or to report all primitives the ray intersects irrespective of whether they are the nearest visible primitive. The SM 232 can use these different results for different kinds of visualization. Or the SM 232 can perform the ray-primitive intersection test itself once the TTU 238 has reported the ray-complet test results. Once the TTU 238 is done processing the leaf nodes, there may be other branch nodes (pushed earlier onto the ray's stack) to test.

Example Instancing Pipeline Implementation by TTU 238 and SM 232

The following describes how TTU 238 in example embodiments performs instancing and associated transforms.

Figure 12A:
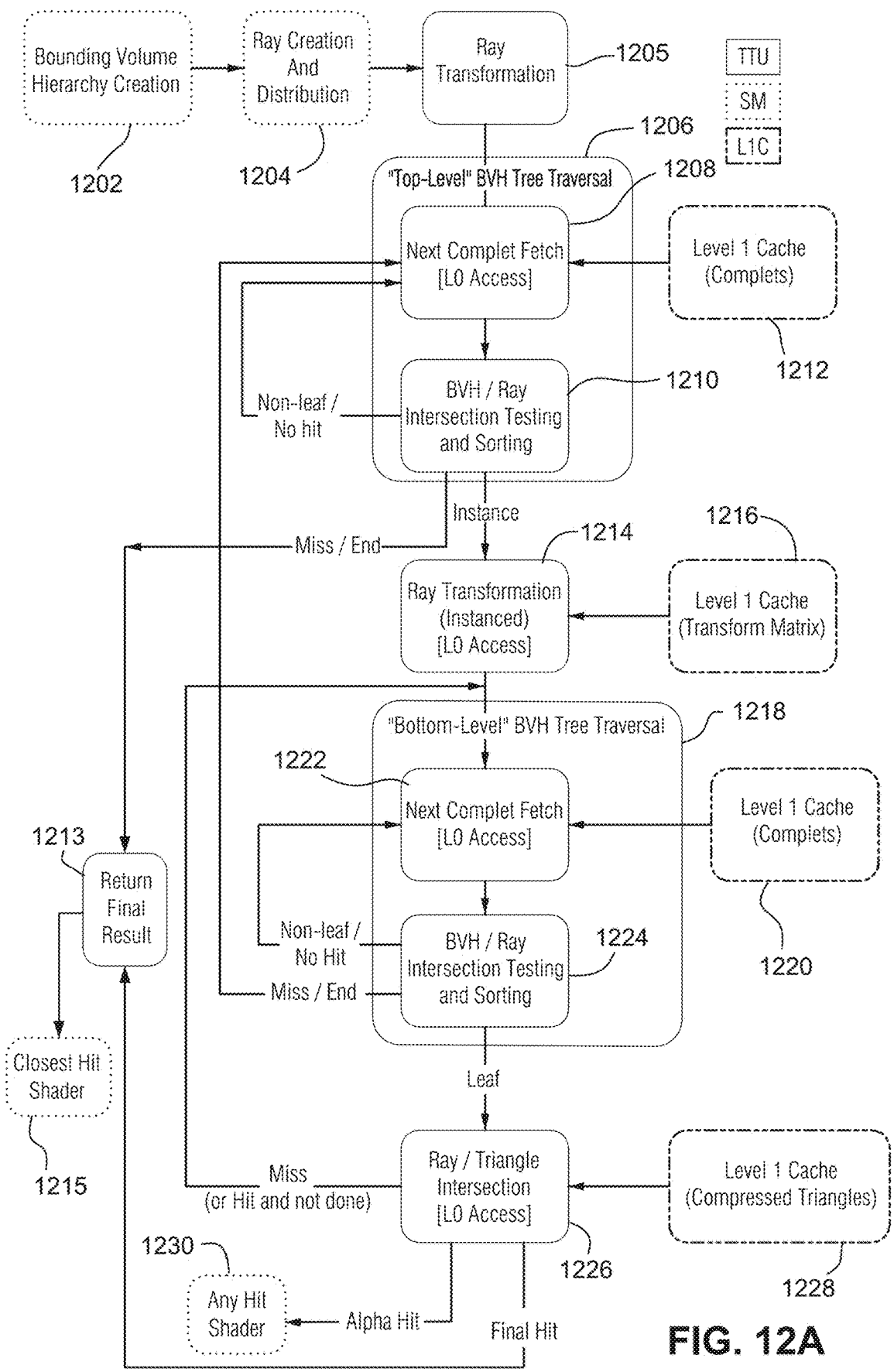
FIGS. 12A and 12B illustrate more detailed ray tracing pipelines, according to some embodiments.

The FIG. 12A more detailed diagram of a ray-tracing pipeline flowchart shows the data flow and interaction between components for a representative use case: tracing rays against a scene containing geometric primitives, with instance transformations handled in hardware. In one example non-limiting embodiment, the ray-tracing pipeline of FIG. 12A is essentially software-defined (which in example embodiments means it is determined by the SMs 232) but makes extensive use of hardware acceleration by TTU 238. Key components include the SM 232 (and the rest of the compute pipeline), the TTU 238 (which serves as a coprocessor to SM), and the L1 cache and downstream memory system, from which the TTU fetches BVH and triangle data.

The pipeline shown in FIG. 12A shows that bounding volume hierarchy creation 1202 can be performed ahead of time by a development system. It also shows that ray creation and distribution 1204 are performed or controlled by the SM 232 or other software in the example embodiment, as shading (which can include lighting and texturing). The example pipeline includes a "top level" BVH tree traversal 1206, ray transformation 1214, "bottom level" BVH tree traversal 1218, and a ray/triangle (or other primitive) intersection 1226 that are each performed by the TTU 238. These do not have to be performed in the order shown, as handshaking between the TTU 238 and the SM 232 determines what the TTU 238 does and in what order.

The SM 232 presents one or more rays to the TTU 238 at a time. Each ray the SM 232 presents to the TTU 238 for traversal may include the ray's geometric parameters, traversal state, and the ray's ray flags, mode flags and ray operations information. In an example embodiment, a ray operation (RayOp) provides or comprises an auxiliary arithmetic and/or logical test to suppress, override, and/or allow storage of an intersection. (See U.S. Pat. No. 10,867,429). The traversal stack may also be used by the SM 232 to communicate certain state information to the TTU 238 for use in the traversal. A new ray query may be started with an explicit traversal stack. For some queries, however, a small number of stack initializers may be provided for beginning the new query of a given type, such as, for example: traversal starting from a complet; intersection of a ray with a range of triangles; intersection of a ray with a range of triangles, followed by traversal starting from a complet; vertex fetch from a triangle buffer for a given triangle, etc. In some embodiments, using stack initializers instead of explicit stack initialization improves performance because stack initializers require fewer streaming processor registers and reduce the number of parameters that need to be transmitted from the streaming processor to the TTU.

In the example shown in FIG. 12A, the TTU 238 performs a top level tree traversal 1206 and a bottom level tree traversal 1218. In the example embodiment, the two level traversal of the BVH enables fast ray tracing responses to dynamic scene changes.

In some embodiments, upon entry to top level tree traversal, or in the top level tree traversal, an optional instance node 1205 specifying a top level transform is encountered in the BVH. The instance node 1205, if it exists, indicates to the TTU that the subtree rooted at the instance node 1205 is aligned to an alternate world space coordinate system for which the transform from the world space is defined in the instance node 1205. Top level instance nodes and their use are described in U.S. Pat. No. 11,282,261, titled "Ray Tracing Hardware Acceleration with Alternative World Space Transforms" which is herein incorporated by reference in its entirety.

The top level of the acceleration structure (TLAS) contains geometry in world space coordinates and the bottom level of the acceleration structure (BLAS) contains geometry in object space coordinates. The TTU maintains ray state and stack state separately for the TLAS traversal and the BLAS traversal because they are effectively independent traversals.

As described above the SM informs the TTU the location in the BVH for starting a ray traversal upon launching a new ray query or relaunching a ray query by including a stack initialization complet in the ray query transmitted to the TTU. The stack initialization complet includes a pointer to the root of the subtree that is to be traversed.

Ray transformation 1214 provides the appropriate transition from the top level tree traversal 1206 to the bottom level tree traversal 1218 by transforming the ray, which may be used in the top level traversal in a first coordinate space (e.g., world space), to a different coordinate space (e.g., object space) of the BVH of the bottom level traversal. An example BVH traversal technique using a two level traversal is described in previous literature, see, e.g., Woop, "A Ray Tracing Hardware Architecture for Dynamic Scenes", Universitat des Saarlandes, 2004, but embodiments are not limited thereto.

Example Top Level Tree Traversal

The top level tree traversal 1206 by TTU 238 receives complets from the L1 cache 1212, and provides an instance to the ray transformation 1214 for transformation, or a miss/end output 1213 to the SM 232 for closest hit shader 1215 processing by the SM (this block can also operate recursively based on non-leaf nodes/no hit conditions). In the top level tree traversal 1206, a next complet fetch step 1208 fetches the next complet to be tested for ray intersection in step 1210 from the memory and/or cache hierarchy and ray-bounding volume intersection testing is done on the bounding volumes in the fetched complet.

Figure 12B:
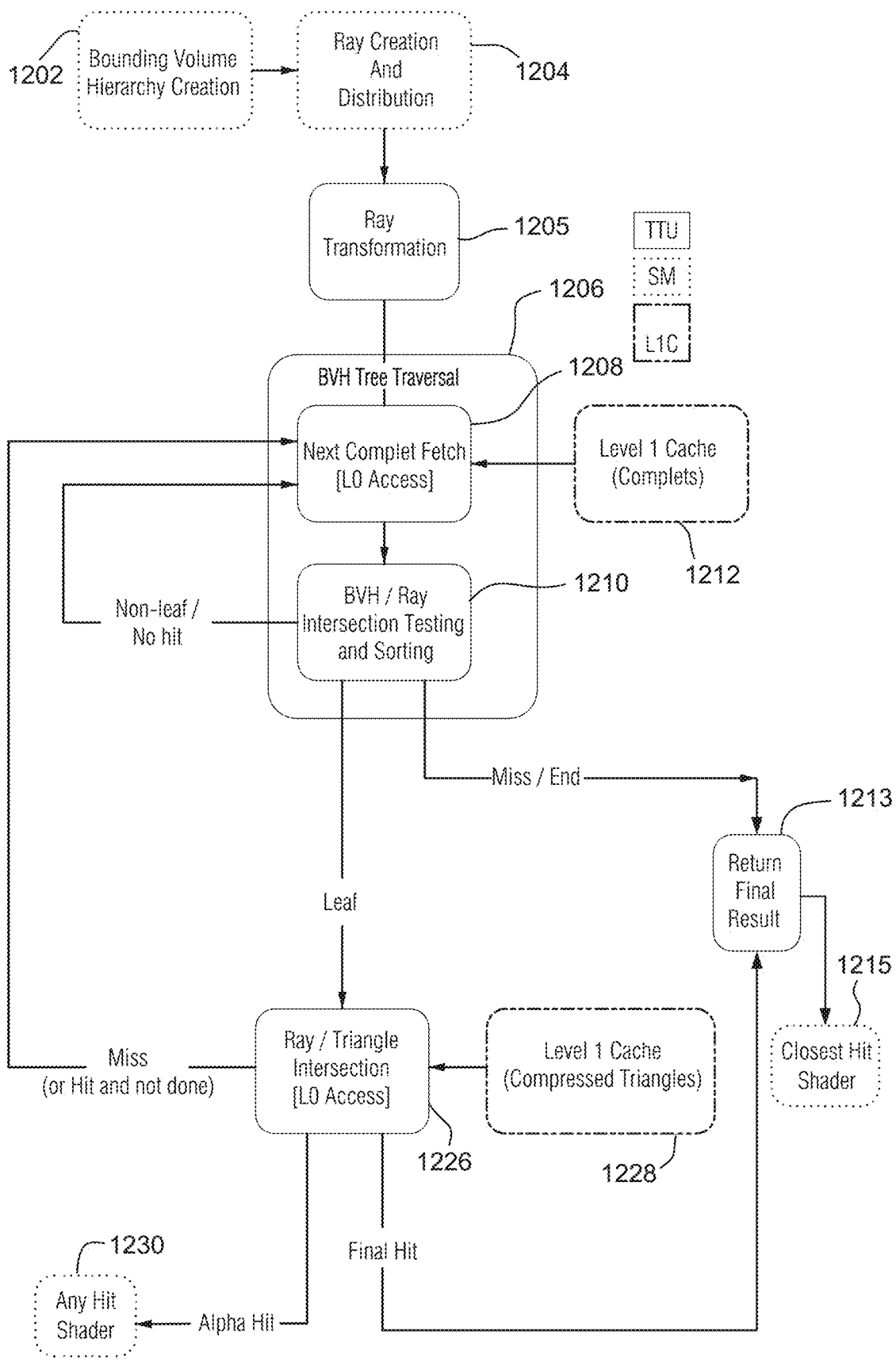

As described above, an instance node connects one BVH to another BVH which is in a different coordinate system. When a child of the intersected bounding volume is an instance node, the ray transformation 1214 is able to retrieve an appropriate transform matrix from the L1 cache 1216. The TTU 238, using the appropriate transform matrix, transforms the ray to the coordinate system of the child BVH. U.S. Pat. No. 10,025,879, which is already incorporated by reference, describes transformation nodes that connect a first set of nodes in a tree to a second set of nodes where the first and second sets of nodes are in different coordinate systems. The instance nodes in example embodiments may be similar to the transformation nodes in U.S. Pat. No. 10,025,879. In an alternative, non-instancing mode of TTU 238 shown in FIG. 12B, the TTU does not execute a "bottom" level tree traversal 1218 and noninstanced tree BVH traversals are performed by blocks 1208, 1210 e.g., using only one stack. The TTU 238 can switch between the FIG. 12A instanced operations and the FIG. 12B noninstanced operations based on what it reads from the BVH and/or query type. For example, a specific query type may restrict the TTU to use just the non-instanced operations. In such a query, any intersected instance nodes would be returned to the SM.

In some non-limiting embodiments, ray-bounding volume intersection testing in step 1210 is performed on each bounding volume in the fetched complet before the next complet is fetched. Other embodiments may use other techniques, such as, for example, traversing the top level traversal BVH in a depth-first manner U.S. Pat. No. 9,582,607, already incorporated by reference, describes one or more complet structures and contents that may be used in example embodiments. U.S. Pat. No. 9,582,607 also describes an example traversal of complets.

When a bounding volume is determined to be intersected by the ray, the child bounding volumes (or references to them) of the intersected bounding volume are kept track of for subsequent testing for intersection with the ray and for traversal. In example embodiments, one or more stack data structures is used for keeping track of child bounding volumes to be subsequently tested for intersection with the ray. In some example embodiments, a traversal stack of a small size may be used to keep track of complets to be traversed by operation of the top level tree traversal 1206, and primitives to be tested for intersection, and a larger local stack data structure can be used to keep track of the traversal state in the bottom level tree traversal 1218.

Example Bottom Level Tree Traversal

In the bottom level tree traversal 1218, a next complet fetch step 1222 fetches the next complet to be tested for ray intersection in step 1224 from the memory and/or cache hierarchy 1220 and ray-bounding volume intersection testing is done on the bounding volumes in the fetched complet. The bottom level tree traversal, as noted above, may include complets with bounding volumes in a different coordinate system than the bounding volumes traversed in the upper level tree traversal. The bottom level tree traversal also receives complets from the L1 cache and can operate recursively or iteratively within itself based on non-leaf/no-hit conditions and also with the top level tree traversal 1206 based on miss/end detection. Intersections of the ray with the bounding volumes in the lower level BVH may be determined with the ray transformed to the coordinate system of the lower level complet retrieved. The leaf bounding volumes found to be intersected by the ray in the lower level tree traversal are then provided to the ray/triangle intersection 1226.

The leaf outputs of the bottom level tree traversal 1218 are provided to the ray/triangle intersection 1226 (which has L0 cache access as well as ability to retrieve triangles via the L1 cache 1228). The L0 complet and triangle caches may be small read-only caches internal to the TTU 238. The ray/triangle intersection 1226 may also receive leaf outputs from the top level tree traversal 1206 when certain leaf nodes are reached without traversing an instanced BVH.

After all the primitives in the primitive range have been processed, the Intersection Management Unit inspects the state of the result queue and crafts packets to send to the Stack Management Unit and/or Ray Management Unit to update the ray's attributes and traversal state, set up the ray's next traversal step, and/or return the ray to the SM 232 (if necessary). If the result queue contains opaque or alpha intersections found during the processing of the primitive range then the Intersection Management Unit signals the parametric length (t) of the nearest opaque intersection in the result queue to the ray management unit to record as the ray's tmax to shorten the ray. To update the traversal state to set up the ray's next traversal step the Intersection Management Unit signals to the Stack Management Unit whether an opaque intersection from the primitive range is present in the result queue, whether one or more alpha intersections are present in the result queue, whether the result queue is full, whether additional alpha intersections were found in the primitive range that have not been returned to the SM and which are not present in the result queue, and the index of the next alpha primitive in the primitive range for the ray to test after the SM consumes the contents of the result queue (the index of the next primitive in the range after the alpha primitive with the highest memory-order from the current primitive range in the result queue).

When the Stack Management Unit 1340 receives the packet from Intersection Management Unit 1322, the Stack Management Unit 1340 inspects the packet to determine the next action required to complete the traversal step and start the next one. If the packet from Intersection Management Unit 1322 indicates an opaque intersection has been found in the primitive range and the ray mode bits indicate the ray is to finish traversal once any intersection has been found the Stack Management Unit 1340 returns the ray and its results queue to the SM with traversal state indicating that traversal is complete (a done flag set and/or an empty top level and bottom level stack). If the packet from Intersection Management Unit 1322 indicates that there are opaque or alpha intersection in the result queue and that there are remaining alpha intersections in the primitive range not present in the result queue that were encountered by the ray during the processing of the primitive range that have not already been returned to the SM, the Stack Management Unit 1340 returns the ray and the result queue to the SM with traversal state modified to set the cull opaque bit to prevent further processing of opaque primitives in the primitive range and the primitive range starting index advanced to the first alpha primitive after the highest alpha primitive intersection from the primitive range returned to the SM in the ray's result queue. If the packet from Intersection Management Unit 1322 indicates that no opaque or alpha intersections were found when the ray processed the primitive range the Stack Management Unit 1340 pops the top of stack entry (corresponding to the finished primitive range) off the active traversal stack. If the packet from Stack Management Unit 1340 indicates or that either there are opaque intersections in the result queue and the ray mode bits do not indicate that the ray is to finish traversal once any intersection has been found and/or there are alpha intersections in the result queue, but there were no remaining alpha intersections found in the primitive range not present in the result queue that have not already been returned to the SM the Stack Management Unit 1340 pops the top of stack entry (corresponding to the finished primitive range) off the active traversal stack and modifies the contents of the result queue to indicate that all intersections present in the result queue come from a primitive range whose processing was completed.

If the active stack is the bottom stack, and the bottom stack is empty the Stack Management Unit 1340 sets the active stack to the top stack. If the top stack is the active stack, and the active stack is empty, then the Stack Management Unit 1340 returns the ray and its result queue to the SM with traversal state indicating that traversal is complete (a done flag set and/or an empty top level and bottom level stack). If the active stack contains one or more stack entries, then the Stack Management Unit 1340 inspects the top stack entry and starts the next traversal step. Testing of primitive and/or primitive ranges for intersections with a ray and returning results to the SM 232 are described in U.S. Pat. No. 10,825,230 entitled "Conservative Watertight Ray Triangle Intersection" and U.S. Pat. No. 10,740,952 entitled "Method for Handling Out-of-Order Opaque and Alpha Ray/Primitive Intersections", which are hereby incorporated by reference in their entireties.

Example Non-Limiting TTU 238 Hardware Implementation

FIG. 13 shows an example simplified block diagram of TTU 238 including hardware configured to perform accelerated traversal operations as described above. In some embodiments, the TTU 238 may perform a depth-first traversal of a bounding volume hierarchy using a short stack traversal with intersection testing of supported leaf node primitives and mid-traversal return of alpha primitives and unsupported leaf node primitives (items). The TTU 238 includes dedicated hardware to determine whether a ray intersects bounding volumes and dedicated hardware to determine whether a ray intersects primitives of the tree data structure.

In more detail, TTU 238 includes an intersection management block 1322, a ray management block 1330 and a stack management block 1340. Each of these blocks (and all of the other blocks in FIG. 13) may constitute dedicated hardware implemented by logic gates, registers, hardware-embedded lookup tables or other combinatorial logic, etc.

The ray management block 1330 is responsible for managing information about and performing operations concerning a ray specified by an SM 232 to the ray management block. The stack management block 1340 works in conjunction with traversal logic 1312 to manage information about and perform operations related to traversal of a BVH acceleration data structure. Traversal logic 1312 is directed by results of a ray-complet test block 1310 that tests intersections between the ray indicated by the ray management block 1330 and volumetric subdivisions represented by the BVH, using instance transforms as needed. The ray-complet test block 1310 retrieves additional information concerning the BVH from memory 240 via an L0 complet cache 1352 that is part of the TTU 238. The results of the ray-complet test block 1310 informs the traversal logic 1312 as to whether further recursive traversals are needed. The stack management block 1340 maintains stacks to keep track of state information as the traversal logic 1312 traverses from one level of the BVH to another, with the stack management block 1340 pushing items onto the stack as the traversal logic traverses deeper into the BVH and popping items from the stack as the traversal logic traverses upwards in the BVH. The stack management block 1340 is able to provide state information (e.g., intermediate or final results) to the requesting SM 232 at any time the SM requests.

The intersection management block 1322 manages information about and performs operations concerning intersections between rays and primitives, using instance transforms as needed. The ray-primitive test block 1320 retrieves information concerning geometry from memory 240 on an as-needed basis via an L0 primitive cache 1354 that is part of TTU 238. The intersection management block 1322 is informed by results of intersection tests the ray-primitive test and transform block 1320 performs. Thus, the ray-primitive test and transform block 1320 provides intersection results to the intersection management block 1322, which reports geometry hits and intersections to the requesting SM 232. In some embodiments, the ray-primitive test and transform block 1320 and the intersection management block 1322 cooperate to determine the visibility of an intersected primitive when a VM is associated with that primitive.

A Stack Management Unit 1340 inspects the traversal state to determine what type of data needs to be retrieved and which data path (complet or primitive) will consume it. The intersections for the bounding volumes are determined in the ray-complet test path of the TTU 238 including one or more ray-complet test blocks 1310 and one or more traversal logic blocks 1312. A complet specifies root or interior nodes of a bounding volume. Thus, a complet may define one or more bounding volumes for the ray-complet test. In example embodiments herein, a complet may define a plurality of "child" bounding volumes that (whether or not they represent leaf nodes) that don't necessarily each have descendants but which the TTU will test in parallel for ray-bounding volume intersection to determine whether geometric primitives associated with the plurality of bounding volumes need to be tested for intersection.

The ray-complet test path of the TTU 238 identifies which bounding volumes are intersected by the ray. Bounding volumes intersected by the ray need to be further processed to determine if the primitives associated with the intersected bounding volumes are intersected. The intersections for the primitives are determined in the ray-primitive test path including one or more ray-primitive test and transform blocks 1320 and one or more intersection management blocks 1322.

The TTU 238 receives queries from one or more SMs 232 to perform tree traversal operations. The query may request whether a ray intersects bounding volumes and/or primitives in a BVH data structure. The query may identify a ray (e.g., origin, direction, and length of the ray) and a BVH data structure and traversal state (short stack) which includes one or more entries referencing nodes in one or more Bounding Volume Hierarchies that the ray is to visit. The query may also include information for how the ray is to handle specific types of intersections during traversal. The ray information may be stored in the ray management block 230. The stored ray information (e.g., ray length) may be updated based on the results of the ray-primitive test.

The TTU 238 may request the BVH data structure identified in the query to be retrieved from memory outside of the TTU 238. Retrieved portions of the BVH data structure may be cached in the level-zero (L0) cache 1350 within the TTU 238 so the information is available for other time-coherent TTU operations, thereby reducing memory 1340 accesses. Portions of the BVH data structure needed for the ray-complet test may be stored in a L0 complet cache 1352 and portions of the BVH data structure needed for the ray-primitive test may be stored in an L0 primitive cache 1354. In embodiments in which VMs are associated with at least some primitives, the VMs for the portions of the BVH retrieved from memory may also made available to the TTU 238.

After the complet information needed for a requested traversal step is available in the complet cache 1352, the ray-complet test block 1310 determines bounding volumes intersected by the ray. In performing this test, the ray may be transformed from the coordinate space of the bounding volume hierarchy to a coordinate space defined relative to a complet. The ray is tested against the bounding boxes associated with the child nodes of the complet. In the example non-limiting embodiment, the ray is not tested against the complet's own bounding box because (1) the TTU 238 previously tested the ray against a similar bounding box when it tested the parent bounding box child that referenced this complet, and (2) a purpose of the complet bounding box is to define a local coordinate system within which the child bounding boxes can be expressed in compressed form. If the ray intersects any of the child bounding boxes, the results are pushed to the traversal logic to determine the order that the corresponding child pointers will be pushed onto the traversal stack (further testing will likely require the traversal logic 1312 to traverse down to the next level of the BVH). These steps are repeated recursively until intersected leaf nodes of the BVH are encountered The ray-complet test block 1310 may provide ray-complet intersections to the traversal logic 1312. Using the results of the ray-complet test, the traversal logic 1312 creates stack entries to be pushed to the stack management block 1340. The stack entries may indicate internal nodes (i.e., a node that includes one or more child nodes) that need to be further tested for ray intersections by the ray-complet test block 1310 and/or triangles identified in an intersected leaf node that need to be tested for ray intersections by the ray-primitive test and transform block 1320. The ray-complet test block 1310 may repeat the traversal on internal nodes identified in the stack to determine all leaf nodes in the BVH that the ray intersects. The precise tests the ray-complet test block 1310 performs will in the example non-limiting embodiment be determined by mode bits, ray operations (see below) and culling of hits, and the TTU 238 may return intermediate as well as final results to the SM 232.

Ray-Primitive Intersection Testing

Referring again to FIG. 13, the TTU 238 also has the ability to accelerate intersection tests that determine whether a ray intersects particular geometry or primitives. For some cases, the geometry is sufficiently complex (e.g., defined by curves or other abstract constructs as opposed to e.g., vertices) that TTU 238 in some embodiments may not be able to help with the ray-primitive intersection testing. In such cases, the TTU 238 simply reports the ray-complet intersection test results to the SM 232, and the SM 232 performs the ray-primitive intersection test itself In other cases (e.g., triangles), the TTU 232 can perform the ray-triangle intersection test itself, thereby further increasing performance of the overall ray tracing process. For sake of completeness, the following describes how the TTU 238 can perform or accelerate the ray-primitive intersection testing.

As explained above, leaf nodes found to be intersected by the ray identify (enclose) primitives that may or may not be intersected by the ray. One option is for the TTU 238 to provide e.g., a range of geometry identified in the intersected leaf nodes to the SM 232 for further processing. For example, the SM 232 may itself determine whether the identified primitives are intersected by the ray based on the information the TTU 238 provides as a result of the TTU traversing the BVH. To offload this processing from the SM 232 and thereby accelerate it using the hardware of the TTU 238, the stack management (SMU) block 1340 may issue requests for the ray-primitive and transform (RTT) block 1320 to perform a ray-primitive test for the primitives within intersected leaf nodes the TTU's ray-complet test (RCT) block 1310 identified. In some embodiments, the SM 732 may issue a request for the ray-primitive test to test a specific range of primitives to RTT block 1320 irrespective of how that geometry range was identified.

After making sure the primitive data needed for a requested ray-primitive test is available in the primitive cache 1354, the RTT block 1320 may determine primitives that are intersected by the ray using the ray information stored in the ray management (RMU) block 1330. The RTT block 1320 provides the identification of primitives determined to be intersected by the ray to the IMU block 1322.

The IMU block 1322 can return the results of the ray-primitive test to the SM 232. The results of the ray-primitive test may include identifiers of intersected primitives, the distance of intersections from the ray origin and other information concerning properties of the intersected primitives. In some embodiments, the IMU block 1322 may modify an existing ray-primitive test (e.g., by modifying the length of the ray) based on previous intersection results from the RTT block 1320.

The IMU block 1322 may also keep track of different types of primitives. For example, the different types of triangles include opaque triangles that will block a ray when intersected and alpha triangles that may or may not block the ray when intersected or may require additional handling by the SM. Whether a ray is blocked or not by a transparent triangle may for example depend on texture(s) mapped onto the triangle, area of the triangle occupied by the texture and the way the texture modifies the triangle. For example, transparency (e.g., stained glass) in some embodiments requires the SM 232 to keep track of transparent object hits so they can be sorted and shaded in ray-parametric order, and typically don't actually block the ray. Meanwhile, alpha "trimming" allows the shape of the primitive to be trimmed based on the shape of a texture mapped onto the primitive— for example, cutting a leaf shape out of a triangle. (Note that in raster graphics, transparency is often called "alpha blending" and trimming is called "alpha test"). In some embodiments, the visibility of a transparent triangle or an alpha triangle that is hit is attempted to be determined using a VM above and below in this disclosure. In other embodiments, the TTU 238 can push transparent hits to queues in memory for later handling by the SM 232 and directly handle trimmed triangles by sending requests to the texture unit. Each triangle may include a designator to indicate the triangle type. The IMU block 1322 is configured to maintain a result queue for tracking the different types of intersected triangles. For example, the result queue may store one or more intersected opaque triangle identifiers in one queue and one or more transparent triangle identifiers in another queue.

For opaque triangles, the ray intersection for less complex geometry can be fully determined in the TTU 238 because the area of the opaque triangle blocks the ray from going past the surface of the triangle. Some embodiments provide for the use of a VM for resolving the visibility of transparent triangles and alpha triangles as described above and also below. VMs enables the visibility of transparent and alpha triangles on the TTU 238 For transparent triangles which either have no associated VMs or have the use of VMs disabled, ray intersections cannot in some embodiments be fully determined in the TTU 238 because TTU 238 performs the intersection test based on the geometry of the triangle and may not have access to the texture of the triangle and/or area of the triangle occupied by the texture (in other embodiments, the TTU may be provided with texture information by the texture mapping block of the graphics pipeline). For triangles for which VMs are not used, in order to fully determine whether the triangle is intersected, information about transparent triangles the ray-primitive and transform block 1320 determines are intersected may be sent to the SM 232, for the SM to make the full determination as to whether the triangle affects visibility along the ray.

The SM 232 can resolve whether or not the ray intersects a texture associated with the transparent triangle and/or whether the ray will be blocked by the texture. The SM 232 may in some cases send a modified query to the TTU 238 (e.g., shortening the ray if the ray is blocked by the texture) based on this determination. In one embodiment, the TTU 238 may be configured to return all triangles determined to intersect the ray to the SM 232 for further processing. Because returning every triangle intersection to the SM 232 for further processing is costly in terms of interface and thread synchronization, the TTU 238 may be configured to hide triangles which are intersected but are provably capable of being hidden without a functional impact on the resulting scene. For example, because the TTU 238 is provided with triangle type information (e.g., whether a triangle is opaque or transparent), the TTU 238 may use the triangle type information to determine intersected triangles that are occluded along the ray by another intersecting opaque triangle and which thus need not be included in the results because they will not affect the visibility along the ray. If the TTU 238 knows that a triangle is occluded along the ray by an opaque triangle, the occluded triangle can be hidden from the results without impact on visualization of the resulting scene.

The intersection management block 1322 may include a result queue for storing hits that associate a triangle ID and information about the point where the ray hit the triangle. When a ray is determined to intersect an opaque triangle, the identity of the triangle and the distance of the intersection from the ray origin can be stored in the result queue. If the ray is determined to intersect another opaque triangle, the other intersected opaque triangle can be omitted from the result if the distance of the intersection from the ray origin is greater than the distance of the intersected opaque triangle already stored in the result queue. If the distance of the intersection from the ray origin is less than the distance of the intersected opaque triangle already stored in the result queue, the other intersected opaque triangle can replace the opaque triangle stored in the result queue. After all of the triangles of a query have been tested, the opaque triangle information stored in the result queue and the intersection information may be sent to the SM 232.

In some embodiments, once an opaque triangle intersection is identified, the intersection management block 1322 may shorten the ray stored in the ray management block 1330 so that bounding volumes (which may include triangles) behind the intersected opaque triangle (along the ray) will not be identified as intersecting the ray.

For triangles that either have no associated VMs or have the use of VMs disabled, the intersection management block 1322 may store information about intersected transparent triangles in a separate queue. The stored information about intersected transparent triangles may be sent to the SM 232 for the SM to resolve whether or not the ray intersects a texture associated with the triangle and/or whether the texture blocks the ray. The SM may return the results of this determination to the TTU 238 and/or modify the query (e.g., shorten the ray if the ray is blocked by the texture) based on this determination.

VM Information in the BVH

In order to enable the use of VMs by the TTU 238, in some embodiments, the BVH includes the VM information that is provided to the TTU 238. The VM information included in the BVH includes visibility mask blocks, triangle blocks with VM information, and instance nodes with VM information.

In some embodiments, a visibility mask block 1400 as shown in FIG. 14 is a 128 B cache-line sized block of memory 1402. The VM itself is encoded as a sequence of 1 or 2-bit visibility states ordered by the space-filling curve (e.g., such as the traversal path shown in FIG. 8) within one or more visibility blocks. A VM for a geometric primitive or object may have millions of 1 or 2-bit visibility states and thus may occupy multiple cache lines. All the state is laid out in the buffer, so that knowing the start of the buffer, the size of each visibility state, and an index, the visibility state applicable to a hit point or the like can be accessed. FIG. 14 illustrates an uncompressed VM block. In some embodiments, there may be no alignment requirement for arranging the VMs, and multiple smaller VMs may share the same block. No information about accessing the VM is stored in the VM block. Rather, a triangle block (described below) contains all the information necessary to access and if necessary decode the bits within the visibility block. For example, a VM Type field 1516 in the triangle block (described below) specifies whether the VM is encoded in 1-bit or 2-bit visibility states. In that sense, the VM blocks are simply a bucket of bits or visibility states that must be properly indexed.

Example embodiments include a triangle block compression mode that is available to support triangle geometric primitives for which VMs are defines ("VM triangles"). In some embodiments, another triangle block compression mode may be available to support VM triangles with motion. The VM-related content stored in triangle blocks for the non-motion and motion cases may be the same. The format of the compressed triangle 1500 associated with a VM is shown in FIG. 15.

Since the VM is stored separately from the triangles in a triangle block, a pointer is provided to find the start of the VM within the VM block storage. The last row of data in triangle block format 1500 specifies where the visibility mask buffer for the triangles in the block start, and also the starting points for the other triangles are specified as offsets from the first triangle in the block. The start for the first triangle in the triangle block is encoded in the base VM offset field 1502 in the triangle block 1500. Other triangles in the block use a potentially lower-precision offset that is a logical delta encoding from that base. By logical, what is meant are placement of the lower N bits of the base VM offset 1502 with the per-triangle VM offset. The precision of those per-triangle offsets is encoded by a per-block precision field 1506 which is located in the VM information section 1504. The per-triangle offsets are encoded in a per-triangle VM offset field 1512 in the variable length visibility masks array 1510.

The VM offset itself can be either 52-bits or 43-bits in size, which is encoded. Which it is, is encoded by a per-block VM alignment bit 1508. If 52-bits, the offset is a bit-addressed pointer (in a 49-bit address space). If 43-bits, it is a 64-byte aligned pointer. The 64-byte aligned pointer may be used for improved compression with larger VMs that are naturally 64-byte aligned. Smaller VMs that take up less than 64 B of storage (e.g., level 0 to 4 for 1-bit, or level 0 to 3 for 2-bit), can be tightly packed into single visibility mask blocks and use the 52-bit bit-addressable pointer to know the start position (see table in FIG. 23). The ability to switch between bit-addressable and 64-byte aligned addressable provides for the use of VMs of any size, and for arranging multiple VMs on the same cache line when using small VMs. Note that although some VMs can have visibility state for millions of regions, some may have only a small number (e.g., even as low as one—when considering a level 0 visibility mask with 1-bit or 2-bit encoding).

An alternative design to having separate visibility masks is to encode the bits within the triangle block, or as an extension of the triangle block. Such assignments are easier for the lower levels where there may only need to be 64 bits of information. Even so, a primary disadvantage of that is that there can be no reuse of that VM outside of the triangle block within which it is encoded. Reuse of VMs is an effective way to reduce the amount of storage used by VMs.

To be able to take a barycentric hit point on the triangle and lookup into a VM, information about the VM is needed. The level of the VM is stored in a per-triangle VM level field 1514. The level field 1514 enables a level between 0 and a maximum to be specified. In some embodiments, the same VM level field 1514 is used to specify the disabling of VMs for the triangle by using a first predetermined value. In some embodiments the VM level field 1514 can also be used with a second predetermined value to specify that the VM is a directly encoded VM state equivalent to a level 0 VM. For example, in some embodiments, the VM level field 1514 is a 4-bit field, and any value 0-13 is interpreted as a level while the value 15 (i.e. all 1s) is interpreted as disabling VMs for the triangle and the value 14 is interpreted as indicating a directly encoded VM state equivalent to a level 0 VM.

When the VM is directly encoded and is indicated as such in the VM level field 1514, the bits for the VM type field 1516 and VM aperture field 1518 (described below) can be used to directly encode a 2-bit visibility state. The directly encoded VM is used for non-palette/material VMs that do not change per instance. The VM offset is not used for directly encoded VMs as there is no indirection for lookup of state.

Using the level of the VM, the barycentric hit point can be converted to a specific region (e.g., micro-triangle) at that level, whose index along the space-filling curve is also the index to a visibility state within the VM. The per-triangle VM type field 1516 encodes whether the VM is a 1-bit VM or a 2-bit VM. That not only affects the bit-index within the VM, but also the number of bits obtained from the VM when the VM is accessed.

The VM aperture field 1518 encodes whether the VM uses a global/absolute address or a local/instance-relative address. For the instance-relative addresses, the VM offset is added to a per-instance VM base pointer (described below). This allows implementing the material or palette style of VMs. FIG. 16 shows an example memory layout illustrating how VMs can be stored for reuse globally and with the palette style using the VM base pointer and the per-triangle VM aperture field 1518.

Figure 17:
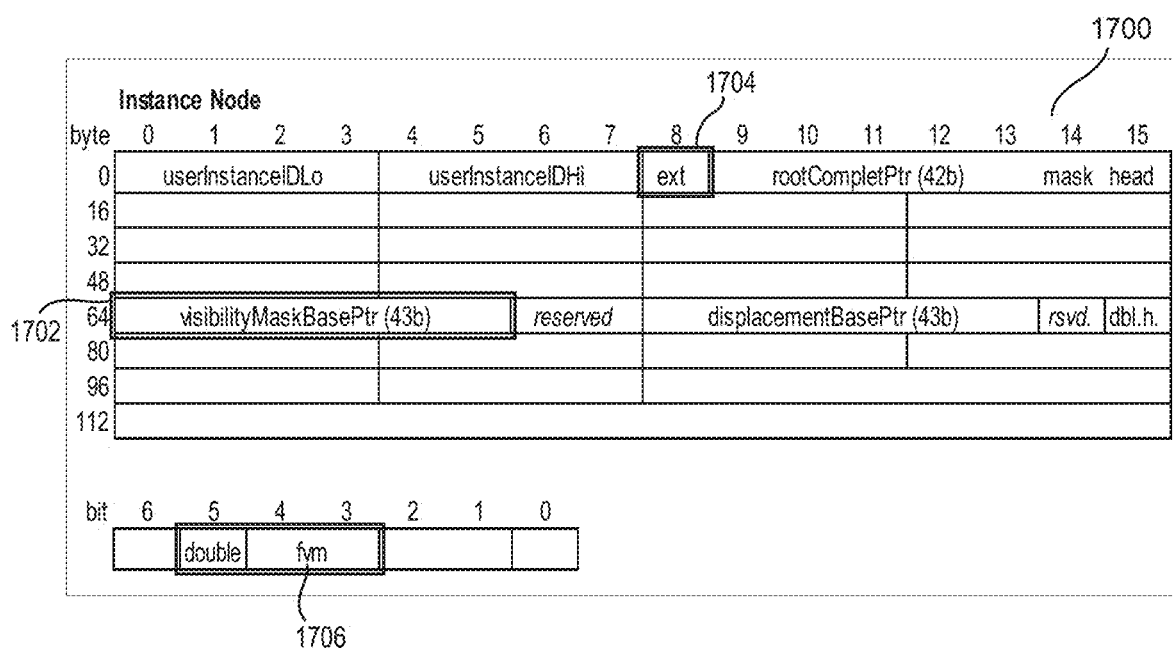
FIG. 17 illustrates a format for instance nodes according to some embodiments.

Instance nodes 1700 are modified and extended to support VM processing, as shown in FIG. 17. In the instance node 1700, fields 1702 and 1704 provide support for VMs.

In some embodiments, the instance nodes store a base pointer that indicates the starting location of local (i.e. per-instance) visibility masks, in the local aperture described above in relation to FIG. 16), and whether such exists. Some embodiments may support multiple types of instance nodes, some which support VMs and other which do not support VMs. In some embodiments, for example, within the extended header of the instance node, a 'double' field indicates that the instance node is 128B instead of the default 64B. If the instance node is a 128B double instance node, it can include a VM base pointer 1702, which is optionally added to the VM offset in the triangle block when the aperture for the VM triangle is set to local (as described above).

The force-VM (fvm) field 1706 (specified as part of an ext field 1704 in the instance node 1700, and also referred to as "VM mode field" below) is used on a per-instance basis to modify the processing of VM triangles within the BLAS referenced by this instance. If non-zero, the force-VM field 1706 forces the VM ray flags of the bottom ray (i.e. ray traversing the BLAS of the BVH) to the value of the force-VM field 1706. A description of ray flags in relation to VM is provided below. Note that the placement of the force-VM field 1706 within the lower 64B allows the field 1706 to be used regardless of whether the type of instance node allows for defining the VM base pointer field 1702.

The per instance capability to specify a VM enables different VMs for the respective instances to be stored and accessed in memory. This enables the application of different kinds of material or palette styles to the same triangle by changing its visibility state. In other words, this per-instance capability enables swap in of different VMs for the same geometry triangle. This is useful, for example, when reusing the geometry for different visibilities states. Consider, for example, a tree having a geometry stored for a foliage to which, in one instance, a first type of leaf (e.g., maple) is applied using a first VM. Example embodiments can apply a second type of leaf (e.g., aspen) using a second visibility mask to the same foliage in a different instance.

Traversal Ray Flags for VMs

Figure 18:
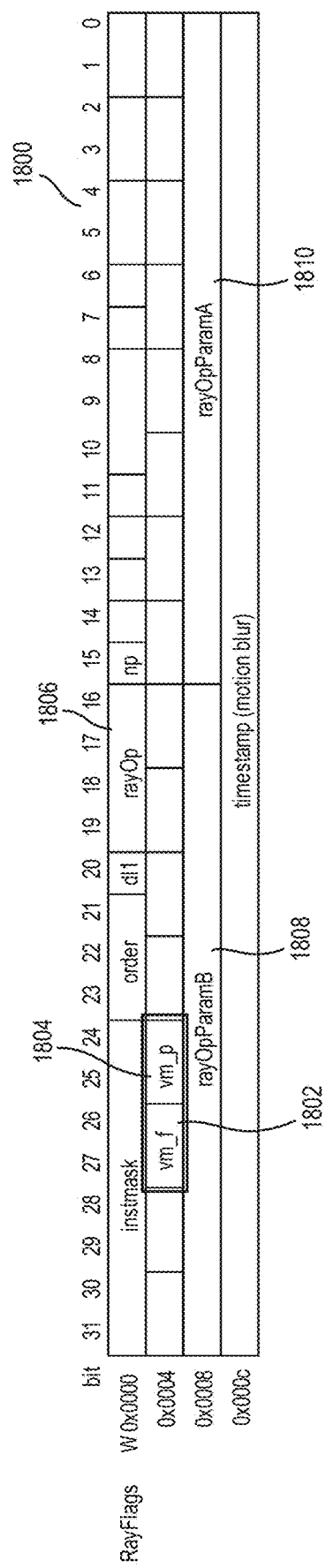
FIG. 18 illustrates a format for specifying ray flags for visibility masks according to some embodiments.

Ray flags in a ray data structure 1800 as shown in FIG. 18, for example, are used to control traversal for an individual ray. This allows for programmable behavior as described in U.S. Pat. No. 10,867,429 titled "Query-Specific Behavioral Modification of Tree Traversal", the contents of which is incorporated by reference in its entirety. Ray flags in general enables performing an operation based upon values passed in with the ray and values stored with the child bounding boxes that determines a pass or fail result, where those operations can be logical or numerical. The idea is that some programmable behavior is provided that can change not only per ray, but per bounding box, and, when the flags 1808-1810 are present, per VM triangle.

The ray-operation, or rayOp, field 1806 along with rayOp parameter fields 1808 and 1810 and one or more ray flags provide the programmable behavior. The two VM-related ray flags ("VM ray flags" or "ray VM mode flags"), "vm_f" 1802 and "vm_p" 1804, have been specified to alter how VM triangles are processed in example embodiments. The behavior of the ray's traversal can be made programmable depending on the outcome of a rayOp test done in the ray-complet test (RCT) unit 1310. If the rayOp test produces a "pass" result, then the "vm_p" field 1804 is used. If the rayOp test produces a "fail" result, then the "vm_f" field 1802 is used.

Each flag 1802-1804 in some embodiments is 2-bits and encodes the following behavior: 0=default: unknown-opaque or unknown-transparent are treated as alpha; 1=force-2-state: unknown-transparent is treated as transparent and unknown-opaque as opaque; 2=ignore-vm; 3=reserved. The default value gives the "default" behavior where 2-bit VMs encode 3-state behavior (opaque, translucent, transparent). The force-2-state value allows for a choice of never returning to the SM for AHS calls even for 3-state VMs.

Ray flags allow for behavior to be specified per-ray. The instance node force-VM field 1706 described above allows for per-instance behavior overrides of these flags. For example, for some instance of a tree geometry that the developer knows to be sufficiently distant from the camera, the VM can be configured to only use the 2-state behavior since the 3-state behavior, which requires potentially expensive transfer of control to the SM, may not provide any perceivable image fidelity improvements that justify the potential performance loss.

Ray flags may enable, for example, the traversal behavior of shadow rays to differ from the traversal behavior of primary rays. For example, referring to the translucent moss geometry with associated shadow mask and translucency mask shown in FIG. 7A-7B, for shadow rays a two-state behavior may be more performant but for primary rays or reflection rays the full three- or four-state behavior may be required for image fidelity. The shadow rays get to stay on the TTU without potentially expensive round-trips to the SM for more complex traversal testing, since the two-state behavior approximates all ambiguous mask regions by classifying them as either fully opaque or fully transparent for the shadow rays.

Note that the force VM flag 1706 provides for overriding the ray mode flags (e.g. flags 1804 and 1806 referred to above) with a directive stored in the instance node. An instance can force VM interpretation to only two states or four states, or to ignore VM altogether (by setting the appropriate preset value in force VM flag 1706), regardless of ray flags 1802-1804. This may allow the developer to specify such things as, for this instance of the translucent moss that is far in the distance, do not use translucency information. By setting the force VM flag 1706 to interpret the VM as two-states instead of the more detailed four-states stored in memory for this distant object, the developer can vary the traversal behavior for rays encountering the distant object while reusing without duplication the more detailed VM already in memory and potentially simultaneously in use as a four-state representation for closer instances of the object.

The force VM flag 1706 setting to ignore VM may be used for visualization effects. For example, if the VM is approximate but good enough (in the developer's opinion) at a distance, then the developer may provide for anything that is more than a predetermined distance (e.g., 10 feet) away to use the VM because is good enough. But if a view from very near is required with details of foliage etc. better than the VM provides, for that instance, the VM can be ignored and a return to the SM may be provided to perform an alpha test on the intersection point.

It should be noted that rayOps can have a distance qualification to them as well. The distance qualification enables such behaviors as, for example, a distant object can be hidden and a near object to be visible, and that can be dynamic based upon the ray, as opposed to at build time determining this is where the camera is supposed to be (e.g., at build time determine a particular instance is far from where the camera is presumed to be).

Figure 21:
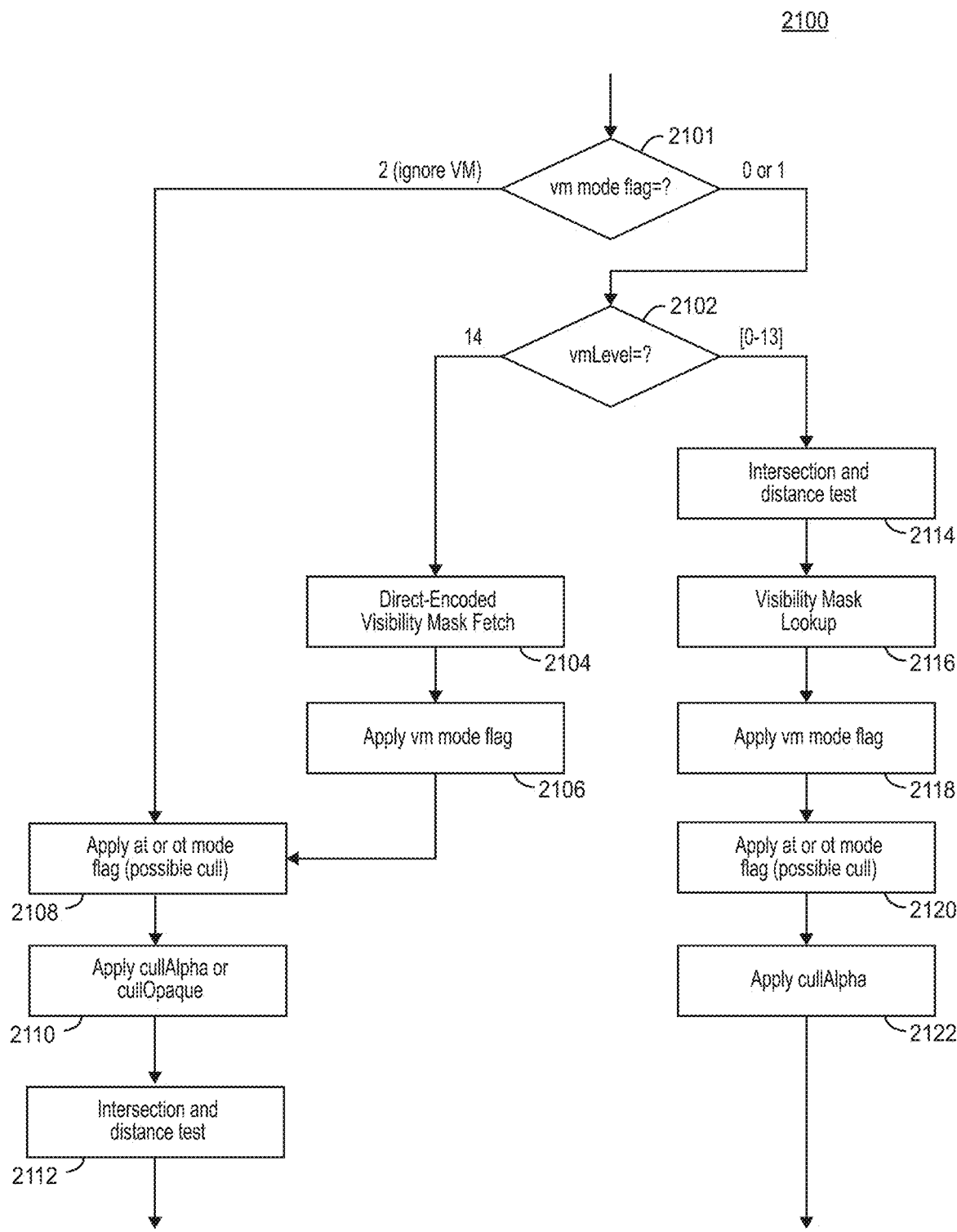
FIG. 21 illustrates example flow diagram for a process for resolving ray flags in relation to a visibility mask, in accordance with some embodiments.

FIG. 21 illustrates an example process 2100 for applying the fvm flag 1706 and ray flags 1804-1806, according to some embodiments. If at operation 2101 it is determined that the fvm flag 1706 is set to ignore VM (e.g., value 2), then at operation 2108 one or more other mode flags are applied (with possible culling), followed by the application of cullAlpha and/or cullOpaque 2110, before performing the ray-primitive intersection test 2112.

If at operation 2101 it is determined that the fvm flag 1706 is not set to ignore VM, then at operation 2102 the VM level is determined. If the VM level field is set to a predetermined value indicating as such (e.g. value=14), then at operation 2104 a corresponding direct encoded VM is fetched, and the VM mode flag (1804 or 1806) is applied before proceeding to operations 2108. If the VM level field 1702 has a valid level value, then the RTT intersection test is performed at operation 2114, followed by the corresponding VM lookup at operation 2116 and applying the VM mode flag 1804 or 1806 at operation 2118. Following operation 2118, the at and of mode flag (modeAlphaPass/Fail and modeOpaquePass/Fail) which may include a possible cull at operation 2120 and cullAlpha at operation 2122 are applied. The application of ray flags, including the modeAlphaPass/Fail and modeOpaquePass/Fail flags, are described in U.S. Pat. No. 10,867,429 titled "Query-Specific Behavioral Modification of Tree Traversal".

High-Level Traversal Behavior for Primitives with VMs

In general, during traversal of a BVH, a VM triangle (i.e., a primitive/triangle for which a VM is defined) behaves as a standard triangle primitive until a ray hit on the triangle is detected—that is, the ray intersects the triangle within its t-range. For an opaque triangle, that hit would be stored if it was the closest so far and traversal would continue. For an alpha triangle, that hit would be returned to the SM for calling an AHS if it was the closest to the ray origin so far. For a VM triangle, that hit causes an indexed lookup into the VM to determine whether it should be opaque, transparent, or translucent and then either commits/stores it if opaque, returns it if alpha/translucent/unknown, or ignores/drops it if transparent.

In some embodiments, the VM lookup is done as a second pass through the ray-triangle test (RTT) unit 1320. RTT 1320 handles triangle tests, instance transforms, and also VM lookups.

The first pass through the RTT determines whether the ray hits the triangle and records the VM information related to that triangle. That information is passed through a the Stack Management Unit (SMU) 1340 that triggers the fetch of the VM block. In some embodiments, the information is passed through a side stack entry, not through the main stack, in the SMU 1340.

The first pass through the RTT 1320 performs the ray-triangle test using the ray and the triangle and obtains a barycentric hit point when the triangle is intersected. The IMU 1322 determines whether the hit should be stored as the closest hit or not. Some information from the first pass is stored so that in the second pass that information can be accessed and replayed for that triangle in IMU 1322.

This information from the first pass can be stored in a VM potential hit RAM in the TTU, an example structure and content of which is shown in FIG. 20. During the first pass, when it is determined that the intersected triangle is a VM triangle, after any VM mode flags (that might indicate ignore the VM or treat it as VM or force it to two state and if it's not directly encoded VM) included in the intersecting ray are applied, the VM related information from the first pass hit is stored in the potential hit RAM.

In some embodiments, all the information that is needed to be stored if it were a closest hit is stored. The triangle ID, that the distance t at which the hit is, the barycentric hit point, whether the triangle is backfacing, whether it's being treated as alpha, the address of the triangle block in which it was hit, etc., are some of the information. Additionally, some mode flags that may be used in the second pass to potentially change the behavior can also be stored. Thus, the hit RAM (e.g., in the RTT 1320) stores the information that is to be used in the second pass.

The first pass also computes the barycentric hit point, and then converts that via a quantization and index mapping (see example code shown in FIG. 9B) to the visibility state where that is stored within the VM.

Instance Transform Pass for VM Primitives

The instance transform pass is not necessary for all VM triangle testing. It does, however, allow different behavior to occur on a per-instance basis. By providing a VM base pointer 1702 within an instance node 1700, different instances can use the same triangle memory with different visibility masks. By providing a non-zero force-VM (fvm) field 1706, VM ray flags 1802 and 1804 can be set on a per-instance basis.

When an instance node 1700 is processed with a valid non-zero fvm field 1706, the VM ray flags (vm_p, vm_f) 1802-1804 of the bottom ray are both set to the value of the FVM field 1706 and stored in the Ray Management Unit (RMU) 1330. When an instance node has a valid VM base pointer field 1702, it is stored in the Intersection Management Unit (IMU) 1322.

Intersection Pass for VM Primitives

The purpose of this pass through RTT 1320 and IMU 1322 is to select the earliest VM triangle in memory within the triangle range that is a candidate potential hit. All hit information, VM meta information, and query fields necessary to perform a visibility test and process the result of the visibility test are stored during the intersection pass.

When a VM triangle is hit, RTT 1320 applies the appropriate VM ray flag—either vm_p 1804 or vm_f 1806. If this ray flag has a value of "ignore VM," then this triangle's VM content is ignored. Its visibility is either alpha or opaque, based on the alpha field specified within the triangle block. See FIG. 21 that shows a flow diagram on how, in some embodiments, mode flags and VM level values are applied for VM triangles (e.g., when VM level value is not the value for ignore VM).

If the applied ray flag 1804 or 1806 does not have a value of "ignore VM," the barycentric hit coordinates are converted into the index of the hit micro-triangle within the visibility mask. See FIG. 9B for example code to determine the barycentric coordinates. The bary2index conversion first discretizes the barycentrics (see FIG. 9A), and then converts from the discrete barycentrics into an index. Two versions of the discrete quantization of the barycentric can be implemented. The first, quantizeBary, works for ray-triangle intersection implementations in which the barycentrics are guaranteed to not exceed the bounds of the triangle (i.e., u+v<=1.0f). The second, quantizeBaryClamp, works for ray-triangle intersection implementations in which the barycentrics may exceed the bounds of the triangle (i.e., u+v>1.0f) even by a small amount like 1 ULP.

RTT 1320 calculates a local memory offset for the lookup using that barycentric-derived index and the VM type (e.g., field 1516; 1-bit or 2-bit encoding). Later, in IMU 1322, depending on the VM aperture, this local offset is either combined with the VM base pointer to provide a global address, or used as is if it is already a global address.

RTT 1320 sends to IMU 1322 the hit information along with the VM type 1516, the VM aperture 1518, the ray flags (alpha, opaque, and VM mode flags), and the cullAlpha bit.

Note that this feature is orthogonal to motion triangles. The first motion pass to create the motion-interpolated triangle from the two key points proceeds as normal and in the second pass through the intersection pipe the behavior here for VM is applied.

Within IMU 1322, a Primary Intersection Status RAM (PISR) holds the hit information of the current closest hit encountered during traversal. Because the visibility of a VM triangle is not known when the ray-triangle intersection test is performed though, a VM triangle that is hit cannot be stored in the PISR without potentially overwriting a hit of known visibility. An additional RAM—the VM Potential Hit RAM (VM PHR) See FIG. 20—is added in some embodiments to store the necessary VM meta information, the standard hit information of the VM triangle, and necessary ray flags. Following a subsequent visibility test, the information about the hit is read from the VM PHR and played through IMU 1322 as if it were a normal opaque hit, alpha hit, or miss.

When hit information for a VM triangle reaches IMU 1322, the IMU stores this information within the VM PHR and sends the VM lookup address to SMU 1340 to be stored in an extra stack entry that is implemented apart from the main stack. If the triangle has a local aperture, the stored VM base pointer is added to the address provided by RTT 1320 before sending to SMU 1340.

If a VM triangle is hit that is earlier in memory order than a currently stored VM hit, the new VM hit information overwrites the existing stored hit. If an alpha triangle is hit that is earlier in memory order than a currently stored VM hit, then the alpha triangle takes priority. In this case, IMU 1322 sends a signal to SMU 1340 indicating that the extra stack entry should be invalidated.

After a triangle range has been completely processed, IMU 1322 sends a stack-update packet to SMU 1340. If there is a valid VM hit within the VM PHR, that packet is crafted with all fields empty or zero to indicate that the existing stack entry should not be updated, and the traversal should not terminate. Upon receiving an update packet from IMU 1322, if SMU 1340 has an extra stack with valid VM information, it sends an activation to the triangle scheduler to start the VM lookup pass.

Intersection Pass for Direct-Encoded VMs

Direct-encoded VMs are treated differently. Like a non-direct-encoded VM triangle, if the VM ray flag has a value of "ignoreVM," the triangle's VM content is ignored, and the triangle's alpha bit is used. Otherwise, the visibility state is fetched directly from the triangle block.

VM ray flags are applied at this time. If the VM ray flag has a value of "force-two-state," RTT 1320 will treat all unknown-opaque and unknown-transparent visibility states as opaque and transparent, respectively. With the visibility known, RTT will treat this triangle like a non-VM triangle having a visibility of alpha, opaque, or transparent. No VM information is forwarded to IMU 1322 in this case and a second pass is not required. IMU only sees an opaque hit, an alpha hit, or a miss if the state were transparent.

VM Visibility Test Pass

During this pass (the second pass referred to above) through RTT 1320 and IMU 1322, the visibility state of the hit micro-triangle is read from memory and applied to the triangle stored in the VM PHR. The VM triangle—now with known visibility—is processed again by the IMU 1322 to determine if it should be stored as a potential closest hit (opaque), discarded (transparent), or if an AHS invocation is needed from the SM (alpha/unknown/translucent).

Upon receiving an activation from SMU 1340, triangle scheduler (in the IMU or SMU) queries SMU 1340 to read its top stack entry. When SMU 1340 has an extra stack with valid VM information, that VM information is treated as the effective top stack entry. The triangle scheduler uses the address within the extra stack to craft a request to the L0 cache 1350. When the VM information is read by triangle scheduler, the extra stack is marked as invalid.

When the memory is ready within cache 1350, the request containing the visibility block and the micro-triangle index is forwarded to RTT 1320. Unlike triangle tests, this request does not read from the RAM within RMU 1330.

Figure 19:
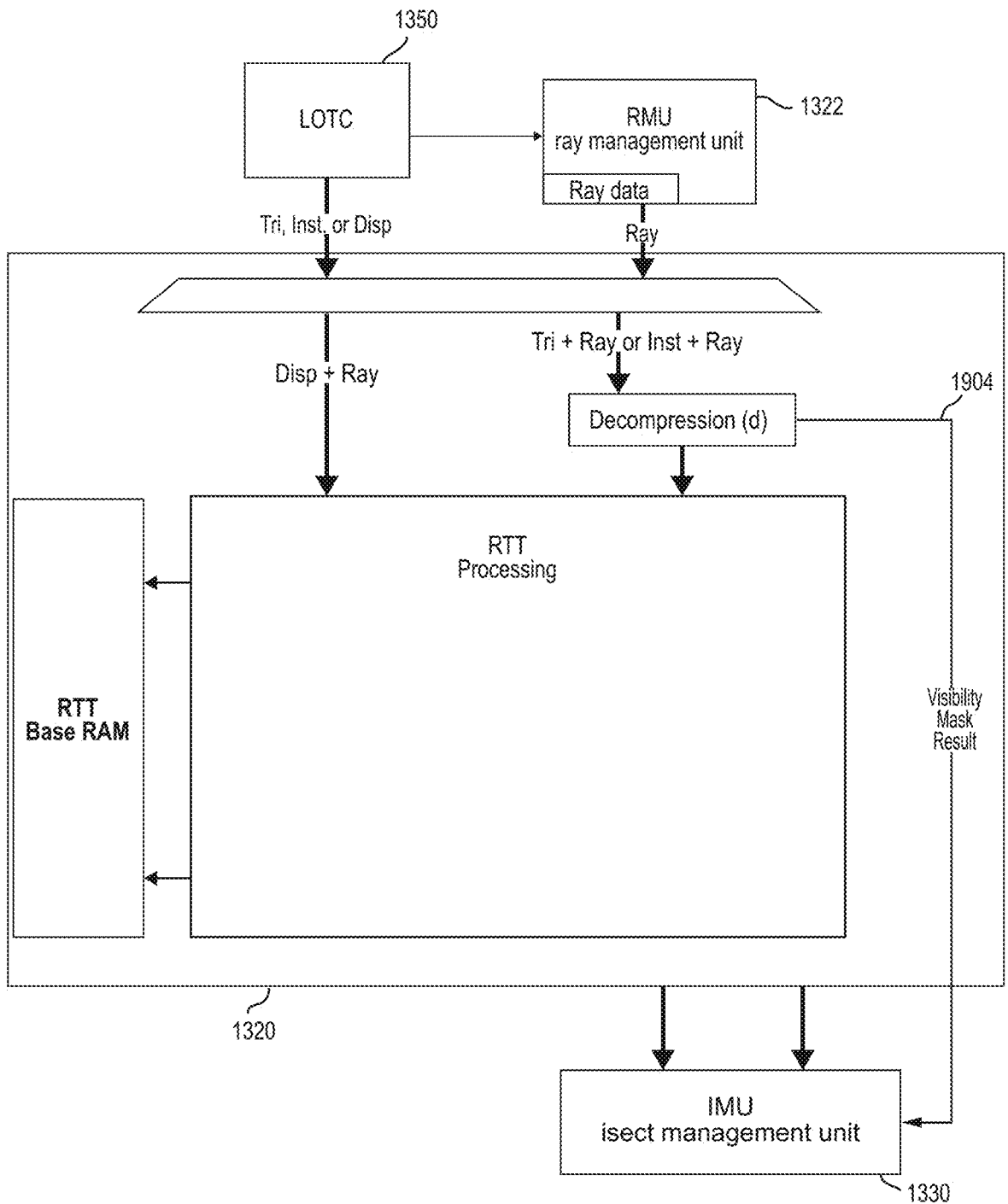
FIG. 19 schematically illustrates a side interface between some components in the tree traversal unit shown in FIG. 2, according to some embodiments.

RTT 1320 looks up the visibility state within the visibility block and forwards that information to IMU 1322 using a separate side interface 1904 (see FIG. 19) to IMU 1322 to avoid conflicts and allow for lower latency. See the "Visibility Mask Result" line 1904 in FIG. 19.

Upon receiving a visibility state from RTT 1320, IMU 1322 uses the stored query information to appropriately transform the visibility state into the correct visibility. First, VM ray flags (e.g., flags 1804-1806) are applied. At this point, VM ray flags are either default (visibility states Unknown-Opaque and Unknown-Transparent both map to alpha visibility) or force-two-state (visibility states Unknown-Opaque and Unknown-Transparent map to Opaque and Transparent, respectively).

After the VM ray flags are applied, the triangle's visibility is known. For example, it is alpha, opaque, or transparent. If alpha or opaque, the appropriate alpha triangle or opaque triangle ray flags are applied (operation 2108), which may change the visibility of the triangle. After triangle ray flags are applied, if the resulting visibility is alpha and the stack entry indicated that alpha triangles are to be culled, the triangle is culled.

At this point, the visibility of the triangle at the hit point is known, and the triangle is processed by IMU 1322 as if it had that visibility to begin with. As a result, IMU 1322 may store this hit within the PISR or discard it as not a potential closest hit.

If it is a miss or a transparent point, the triangle hit is ignored. If it is an opaque hit point, the triangle may be committed. If it is an alpha/translucent/unknown hit point, then it is returned to the SM. If there is an opaque hit already stored in the PISR, then that opaque hit is returned first and the alpha-by-visibility triangle is rematerialized on relaunch of the query. If there isn't already an opaque hit stored, then the alpha triangle may be returned immediately.

If there are remaining alpha or VM triangles in the range, then the update packet to SMU is set to advance the start of triangle range stack entry to be after the current triangle. This operation may also set the cull-opaque field in the triangle range stack entry because, by definition, all opaque triangles within a range must be processed before any visibility test is done, and so do not need to be tested again. This is to prevent infinite loops from happening where an opaque triangle is hit and it has to be returned before storing an alpha triangle as determined by visibility state.

If there are no remaining alpha or VM triangles in the range, then the update packet to SMU 1340 is set to pop the stack entry.

Upon receiving the stack update packet from IMU 1322, SMU 1340 updates the stack.

Triangle range stack entries had two visibility-based culling bits. The cullOpaque bit indicates that all opaque triangles within the triangle range were to be immediately culled, while the cullAlpha bit indicates the same for alpha triangles. The reason for the cull opaque behavior was described above: to avoid infinite loops when processing triangle ranges with both opaque and alpha triangles. The reason for the cull alpha behavior is an optimization with stack entry creation that allows for auto-pop entries that are guaranteed to not consume a stack entry on return to SM. That guarantee only holds if there are only opaque triangles. A bit in the complet may exist to indicate that a range has no alpha triangles and the cull-alpha bit enforces that behavior.

When a VM is not used, if both the cullOpaque and cullAlpha bits were set, then all triangles within the range may be culled. The TTU used the simultaneous setting of the cullOpaque and cullAlpha bits to indicate that the triangle range should be returned to the SM.

With VM triangles, it is possible for both cull bits to be simultaneously set without the intent to return the triangle range to the SM. If a triangle range is to be processed with both cull bits set, all opaque and alpha triangles are culled, but the visibility of any hit VM triangles must be evaluated. If a VM triangle is hit in this scenario, it will only be culled if the resulting visibility is alpha.

To allow triangle ranges to have both bits set and still be processed within the TTU 238, a mechanism referred to as the no-return mechanism is implemented as described below.

To save bits on the stack, both implicit and explicit state are used to indicate that each triangle range processed is designated as either a no-return or a return-enabled triangle range. A return-enabled range functions as follows: the triangle range is returned to the SM as a triangle range if both cull bits are set. A no-return triangle range is not returned to the SM as a triangle range even if both cull bits are set.

Figure 22:
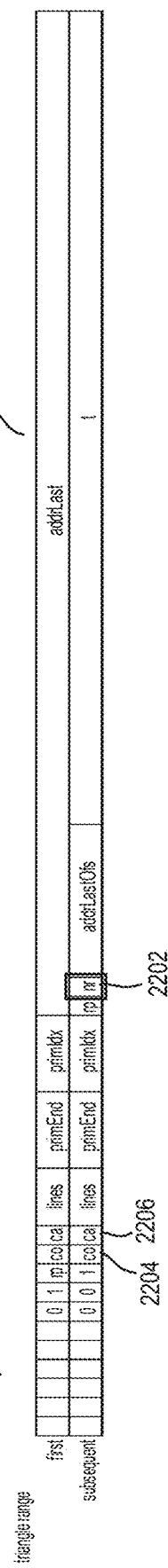
FIG. 22 illustrates example triangle range stack entries according to some embodiments.

Triangle range stack entries 2200 may be provided in two types: "first" and "subsequent". See FIG. 22. The subsequent entry type directly encodes a no-return bit 2202 that can be set by the Traversal Logic (TL) unit 1312 when crafting a stack. The first entry type could include an explicit bit. If an explicit bit is not used, an implicit bit is set whenever a triangle range is sent to be processed from SMU 1340 to the triangle scheduler. It is also set whenever a ray is activated to begin traversal and the top of the stack is a "first" entry that is set to be returned. Because "first" entries are always returned immediately if being returned, they will not naturally appear as the top stack entry on a just-launched ray.

Example GPU Architecture

An example illustrative architecture in which the efficient ray traversal with reduced false positives disclosed in this application is incorporated will now be described. The following information is set forth for illustrative purposes and should not be construed as limiting in any manner. Any of the following features may be optionally incorporated with or without the exclusion of other features described.

Figure 24:
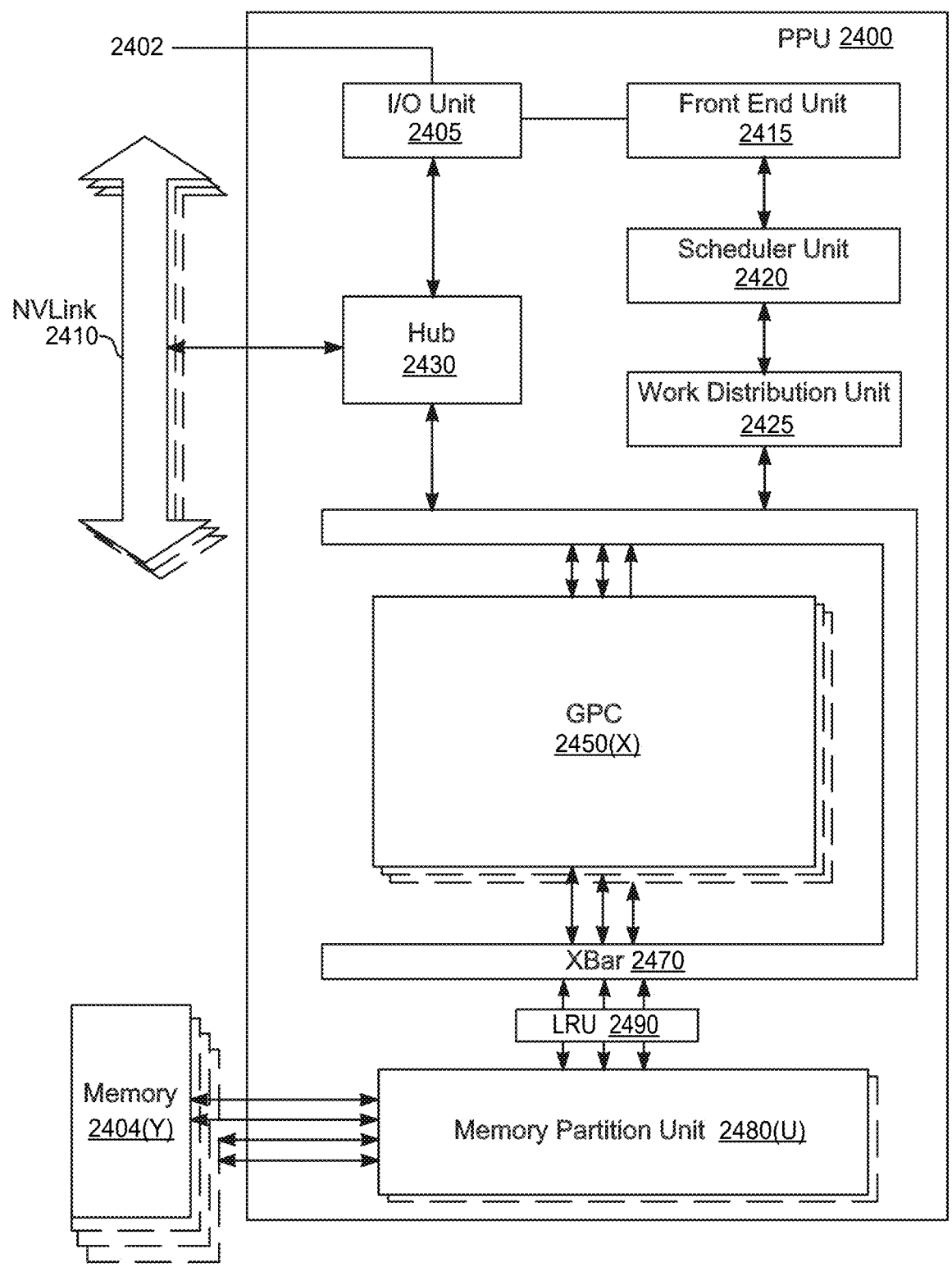
FIG. 24 illustrates an example parallel processing unit of a GPU, according to some embodiments.

FIG. 24 illustrates a parallel processing unit (PPU) 2400, in accordance with an embodiment. In an embodiment, the PPU 2400 is a multi-threaded processor that is implemented on one or more integrated circuit devices. The PPU 2400 is a latency hiding architecture designed to process many threads in parallel. A thread (e.g., a thread of execution) is an instantiation of a set of instructions configured to be executed by the PPU 2400. In an embodiment, the PPU 2400 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 2400 may be utilized for performing general-purpose computations. In some other embodiments, PPU 2400 configured to implement large neural networks in deep learning applications or other high performance computing applications.

One or more PPUs 2400 may be configured to accelerate thousands of High Performance Computing (HPC), data center, and machine learning applications. The PPU 2400 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 24, the PPU 2400 includes an Input/Output (I/O) unit 2405, a front end unit 2415, a scheduler unit 2420, a work distribution unit 2425, a hub 2430, a crossbar (Xbar) 2470, one or more general processing clusters (GPCs) 2450, and one or more partition units 2480. The PPU 2400 may be connected to a host processor or other PPUs 2400 via one or more high-speed NVLink 2410 interconnect. The PPU 2400 may be connected to a host processor or other peripheral devices via an interconnect 2402. The PPU 2400 may also be connected to a memory comprising a number of memory devices 2404. In an embodiment, the memory 2404 may comprise a number of dynamic random access memory (DRAM) devices. The DRAM devices may be configured as a high-bandwidth memory (HBM) subsystem, with multiple DRAM dies stacked within each device.

The NVLink 2410 interconnect enables systems to scale and include one or more PPUs 2400 combined with one or more CPUs, supports cache coherence between the PPUs 2400 and CPUs, and CPU mastering. Data and/or commands may be transmitted by the NVLink 2410 through the hub 2430 to/from other units of the PPU 2400 such as one or more copy engines, a video encoder, a video decoder, a power management unit, etc. (not explicitly shown). The NVLink 2410 is described in more detail in conjunction with FIG. 27A and FIG. 27B.

The I/O unit 2405 is configured to transmit and receive communications (e.g., commands, data, etc.) from a host processor (not shown) over the interconnect 2402. The I/O unit 2405 may communicate with the host processor directly via the interconnect 2402 or through one or more intermediate devices such as a memory bridge. In an embodiment, the I/O unit 2405 may communicate with one or more other processors, such as one or more of the PPUs 2400 via the interconnect 2402. In an embodiment, the I/O unit 1005 implements a Peripheral Component Interconnect Express (PCIe) interface for communications over a PCIe bus and the interconnect 2402 is a PCIe bus. In alternative embodiments, the I/O unit 2405 may implement other types of well-known interfaces for communicating with external devices.

The I/O unit 2405 decodes packets received via the interconnect 2402. In an embodiment, the packets represent commands configured to cause the PPU 2400 to perform various operations. The I/O unit 2405 transmits the decoded commands to various other units of the PPU 2400 as the commands may specify. For example, some commands may be transmitted to the front end unit 2415. Other commands may be transmitted to the hub 2430 or other units of the PPU 2400 such as one or more copy engines, a video encoder, a video decoder, a power management unit, etc. (not explicitly shown). In other words, the I/O unit 2405 is configured to route communications between and among the various logical units of the PPU 2400.

In an embodiment, a program executed by the host processor encodes a command stream in a buffer that provides workloads to the PPU 2400 for processing. A workload may comprise several instructions and data to be processed by those instructions. The buffer is a region in a memory that is accessible (e.g., read/write) by both the host processor and the PPU 2400. For example, the I/O unit 2405 may be configured to access the buffer in a system memory connected to the interconnect 2402 via memory requests transmitted over the interconnect 2402. In an embodiment, the host processor writes the command stream to the buffer and then transmits a pointer to the start of the command stream to the PPU 2400. The front end unit 2415 receives pointers to one or more command streams. The front end unit 2415 manages the one or more streams, reading commands from the streams and forwarding commands to the various units of the PPU 2400.

The front end unit 2415 is coupled to a scheduler unit 2420 that configures the various GPCs 2450 to process tasks defined by the one or more streams. The scheduler unit 2420 is configured to track state information related to the various tasks managed by the scheduler unit 2420. The state may indicate which GPC 2450 a task is assigned to, whether the task is active or inactive, a priority level associated with the task, and so forth. The scheduler unit 2420 manages the execution of a plurality of tasks on the one or more GPCs 2450.

The scheduler unit 2420 is coupled to a work distribution unit 2425 that is configured to dispatch tasks for execution on the GPCs 2450. The work distribution unit 2425 may track a number of scheduled tasks received from the scheduler unit 2420. In an embodiment, the work distribution unit 2425 manages a pending task pool and an active task pool for each of the GPCs 2450. The pending task pool may comprise a number of slots (e.g., 32 slots) that contain tasks assigned to be processed by a particular GPC 2450. The active task pool may comprise a number of slots (e.g., 4 slots) for tasks that are actively being processed by the GPCs 2450. As a GPC 2450 finishes the execution of a task, that task is evicted from the active task pool for the GPC 2450 and one of the other tasks from the pending task pool is selected and scheduled for execution on the GPC 2450. If an active task has been idle on the GPC 2450, such as while waiting for a data dependency to be resolved, then the active task may be evicted from the GPC 2450 and returned to the pending task pool while another task in the pending task pool is selected and scheduled for execution on the GPC 2450.

The work distribution unit 2425 communicates with the one or more GPCs 2450 via XBar 2470. The XBar 2470 is an interconnect network that couples many of the units of the PPU 2400 to other units of the PPU 2400. For example, the XBar 2470 may be configured to couple the work distribution unit 2425 to a particular GPC 2450. Although not shown explicitly, one or more other units of the PPU 2400 may also be connected to the XBar 2470 via the hub 2430.

The tasks are managed by the scheduler unit 2420 and dispatched to a GPC 2450 by the work distribution unit 2425. The GPC 2450 is configured to process the task and generate results. The results may be consumed by other tasks within the GPC 2450, routed to a different GPC 2450 via the XBar 2470, or stored in the memory 2404. The results can be written to the memory 2404 via the partition units 2480, which implement a memory interface for reading and writing data to/from the memory 2404. The results can be transmitted to another PPU 2404 or CPU via the NVLink 2410. In an embodiment, the PPU 2400 includes a number U of partition units 2480 that is equal to the number of separate and distinct memory devices 2404 coupled to the PPU 2400. A partition unit 2480 will be described in more detail below in conjunction with FIG. 27B.

In an embodiment, a host processor executes a driver kernel that implements an application programming interface (API) that enables one or more applications executing on the host processor to schedule operations for execution on the PPU 2400. In an embodiment, multiple compute applications are simultaneously executed by the PPU 2400 and the PPU 2400 provides isolation, quality of service (QoS), and independent address spaces for the multiple compute applications. An application may generate instructions (e.g., API calls) that cause the driver kernel to generate one or more tasks for execution by the PPU 2400. The driver kernel outputs tasks to one or more streams being processed by the PPU 2400. Each task may comprise one or more groups of related threads, referred to herein as a warp. In an embodiment, a warp comprises 32 related threads that may be executed in parallel.

Figure 25A:
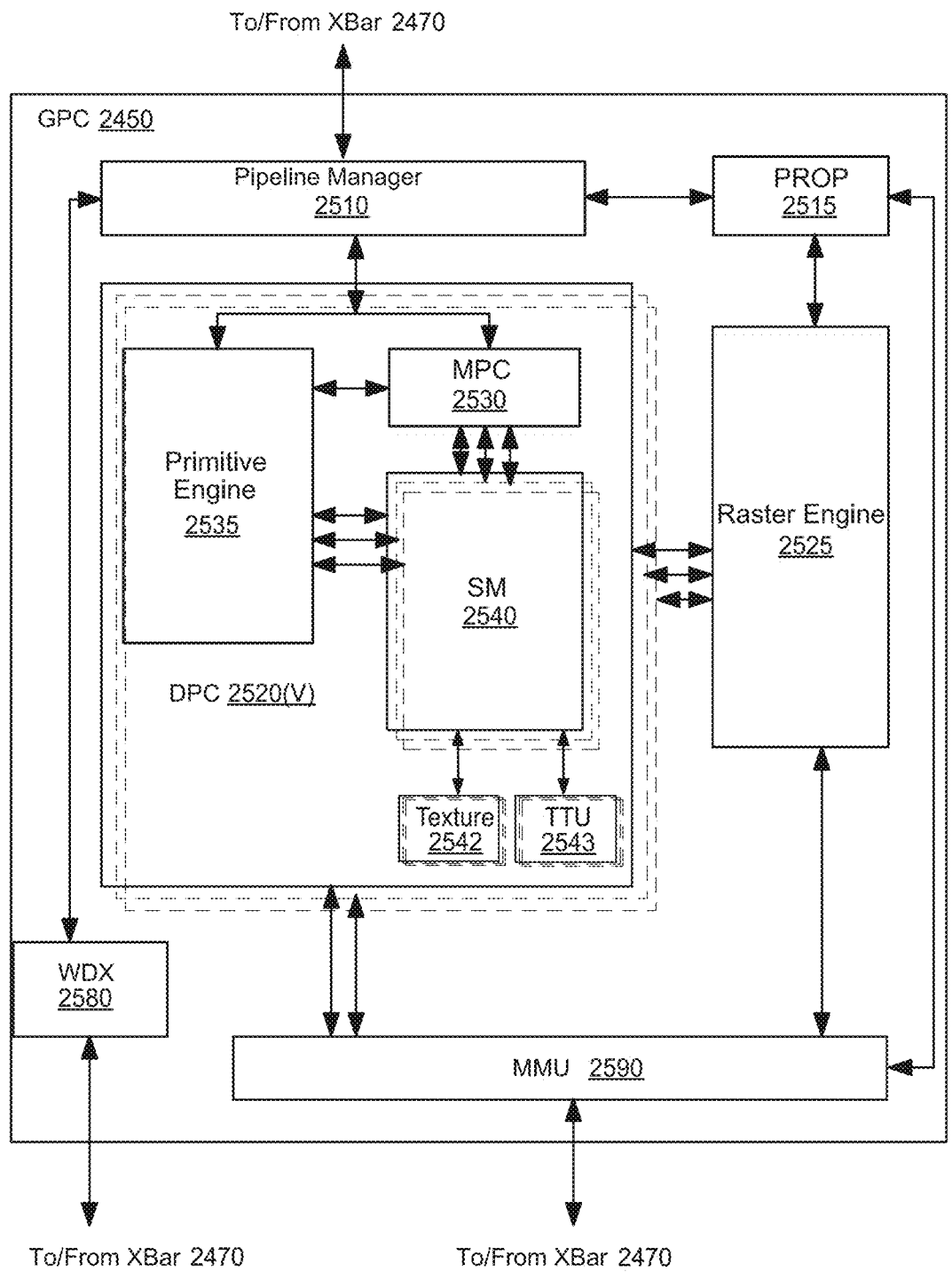
FIG. 25A illustrates an example general processing cluster (GPC) within the parallel processing unit of FIG. 24 with each streaming multiprocessor in the general processing cluster being coupled to a hardware ray tracing acceleration device, according to some embodiments.

FIG. 25A illustrates a GPC 2450 of the PPU 2400 of FIG. 24, in accordance with an embodiment. As shown in FIG. 25A, each GPC 2450 includes a number of hardware units for processing tasks. In an embodiment, each GPC 2450 includes a pipeline manager 2510, a pre-raster operations unit (PROP) 2515, a raster engine 2525, a work distribution crossbar (WDX) 2580, a memory management unit (MMU) 2590, and one or more Data Processing Clusters (DPCs) 2520. It will be appreciated that the GPC 2450 of FIG. 25A may include other hardware units in lieu of or in addition to the units shown in FIG. 25A.

In an embodiment, the operation of the GPC 2450 is controlled by the pipeline manager 2510. The pipeline manager 2510 manages the configuration of the one or more DPCs 2520 for processing tasks allocated to the GPC 2450. In an embodiment, the pipeline manager 2510 may configure at least one of the one or more DPCs 2520 to implement at least a portion of a graphics rendering pipeline, a neural network, and/or a compute pipeline. For example, with respect to a graphics rendering pipeline, a DPC 2520 may be configured to execute a vertex shader program on the programmable streaming multiprocessor (SM) 2540. The pipeline manager 2510 may also be configured to route packets received from the work distribution unit 2425 to the appropriate logical units within the GPC 2450. For example, some packets may be routed to fixed function hardware units in the PROP 2515 and/or raster engine 2525 while other packets may be routed to the DPCs 2520 for processing by the primitive engine 2535 or the SM 2540.

Figure 25B:
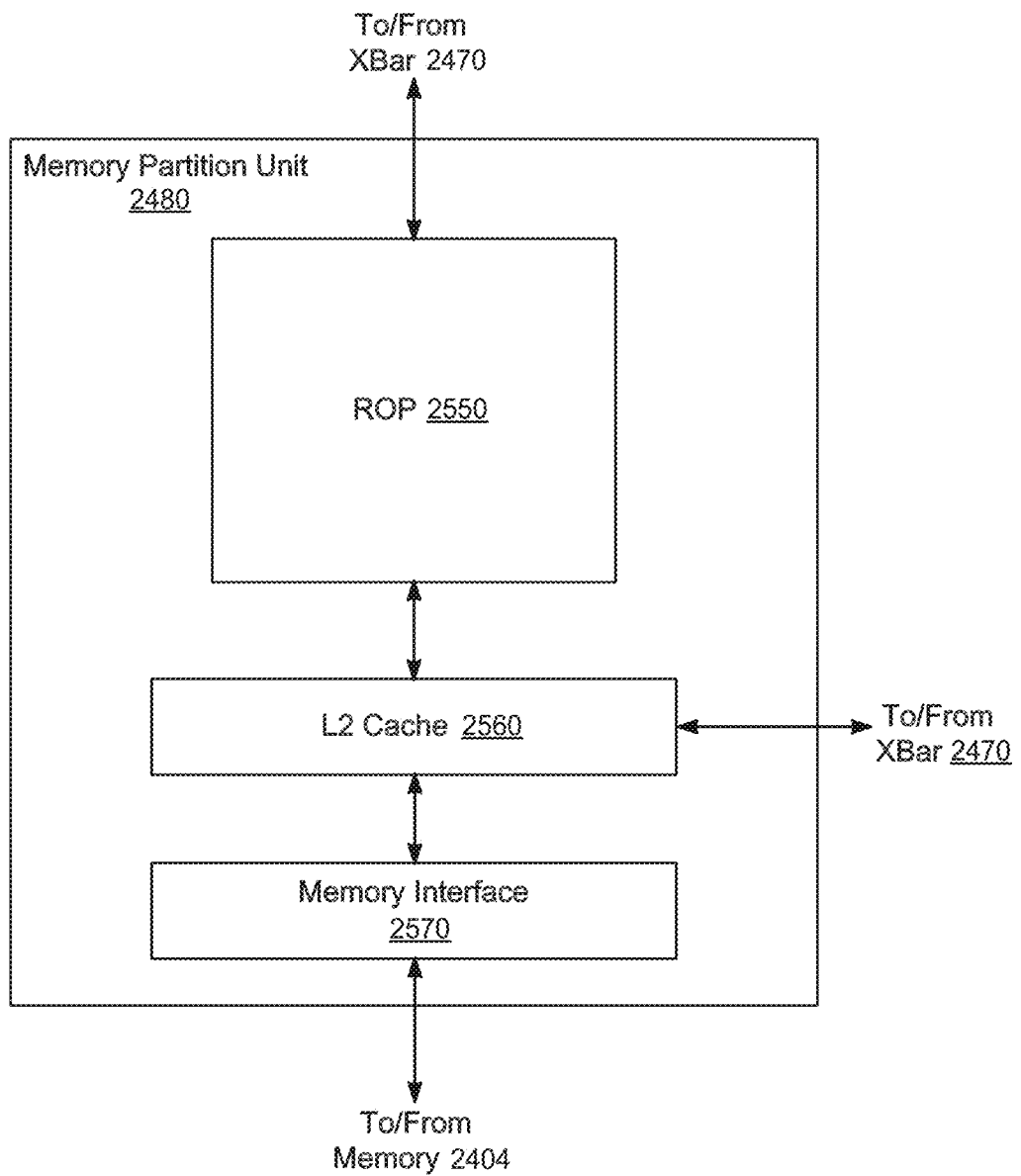
FIG. 25B illustrates an example memory partition unit of the parallel processing unit of FIG. 24.

The PROP unit 2515 is configured to route data generated by the raster engine 2525 and the DPCs 2520 to a Raster Operations (ROP) unit, described in more detail in conjunction with FIG. 25B. The PROP unit 2515 may also be configured to perform optimizations for color blending, organize pixel data, perform address translations, and the like.

Each DPC 2520 included in the GPC 2450 includes an M-Pipe Controller (MPC) 2530, a primitive engine 2535, and one or more SMs 2540. The MPC 2530 controls the operation of the DPC 2520, routing packets received from the pipeline manager 2510 to the appropriate units in the DPC 2520. For example, packets associated with a vertex may be routed to the primitive engine 2535, which is configured to fetch vertex attributes associated with the vertex from the memory 2404. In contrast, packets associated with a shader program may be transmitted to the SM 2540.

Figure 26:
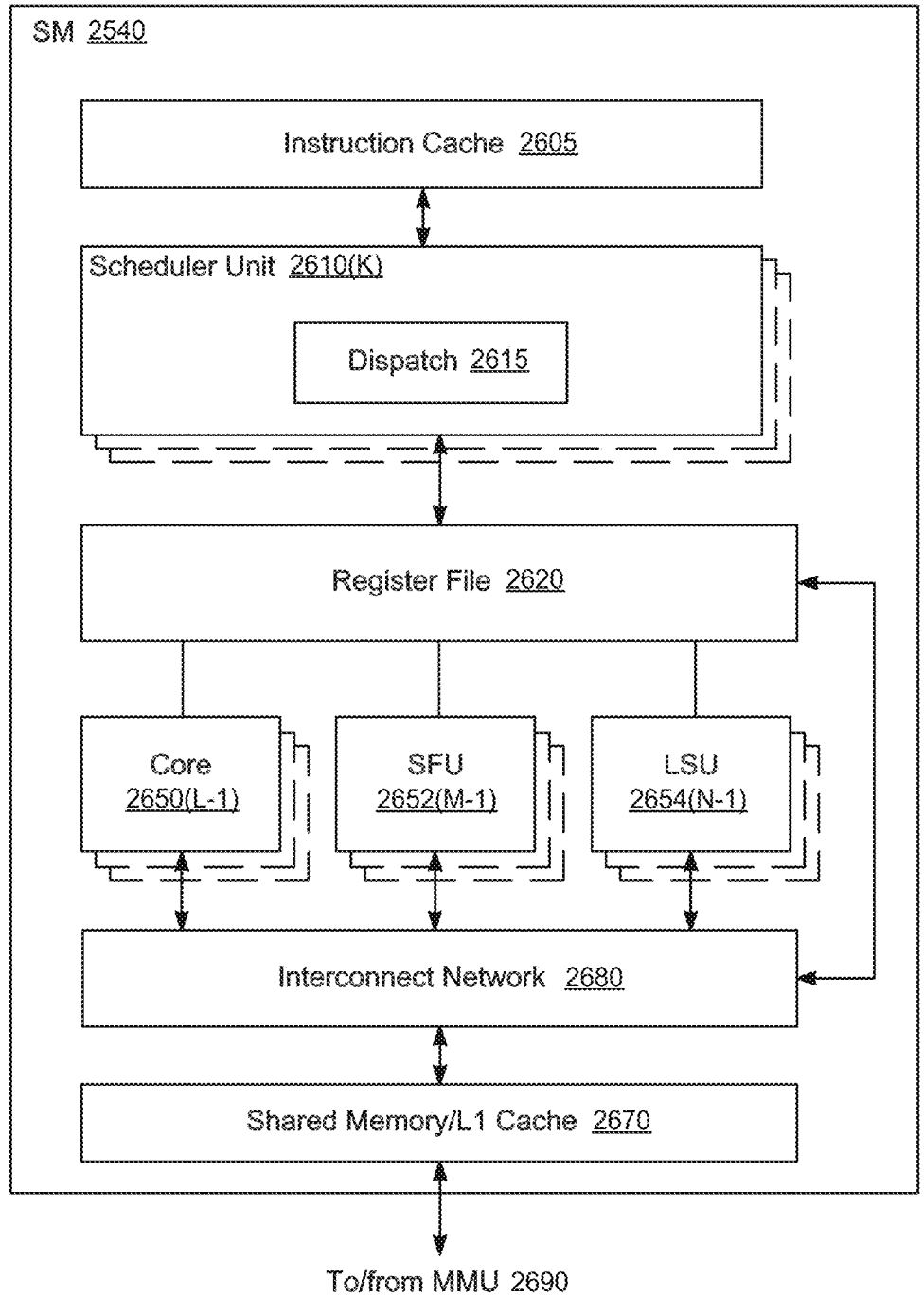
FIG. 26 illustrates an example streaming multiprocessor of FIG. 25A.

The SM 2540 comprises a programmable streaming processor that is configured to process tasks represented by a number of threads. Each SM 2540 is multi-threaded and configured to execute a plurality of threads (e.g., 32 threads) from a particular group of threads concurrently. In an embodiment, the SM 2540 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 2540 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 2540 is described in more detail below in conjunction with FIG. 26.

The MMU 2590 provides an interface between the GPC 2450 and the partition unit 2480. The MMU 2590 may provide translation of virtual addresses into physical addresses, memory protection, and arbitration of memory requests. In an embodiment, the MMU 2590 provides one or more translation lookaside buffers (TLBs) for performing translation of virtual addresses into physical addresses in the memory 2404.

FIG. 25B illustrates a memory partition unit 2480 of the PPU 2400 of FIG. 24 in accordance with an embodiment. As shown in FIG. 25B, the memory partition unit 2480 includes a Raster Operations (ROP) unit 2550, a level two (L2) cache 2560, and a memory interface 2570. The memory interface 2570 is coupled to the memory 2404. Memory interface 2570 may implement 32, 64, 128, 1024-bit data buses, or the like, for high-speed data transfer. In an embodiment, the PPU 2400 incorporates U memory interfaces 2570, one memory interface 2570 per pair of partition units 2480, where each pair of partition units 2480 is connected to a corresponding memory device 2404. For example, PPU 2400 may be connected to up to Y memory devices 2404, such as high bandwidth memory stacks or graphics double-data-rate, version 5, synchronous dynamic random access memory, or other types of persistent storage.

In an embodiment, the memory interface 2570 implements an HBM2 memory interface and Y equals half U. In an embodiment, the HBM2 memory stacks are located on the same physical package as the PPU 2500, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 2404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 2400 process very large datasets and/or run applications for extended periods.

In an embodiment, the PPU 2400 implements a multi-level memory hierarchy. In an embodiment, the memory partition unit 2480 supports a unified memory to provide a single unified virtual address space for CPU and PPU 2400 memory, enabling data sharing between virtual memory systems. In an embodiment the frequency of accesses by a PPU 2400 to memory located on other processors is traced to ensure that memory pages are moved to the physical memory of the PPU 2400 that is accessing the pages more frequently. In an embodiment, the NVLink 2410 supports address translation services allowing the PPU 2400 to directly access a CPU's page tables and providing full access to CPU memory by the PPU 2400.

In an embodiment, copy engines transfer data between multiple PPUs 1000 or between PPUs 2400 and CPUs. The copy engines can generate page faults for addresses that are not mapped into the page tables. The memory partition unit 2480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 2404 or other system memory may be fetched by the memory partition unit 2480 and stored in the L2 cache 2560, which is located on-chip and is shared between the various GPCs 2450. As shown, each memory partition unit 2480 includes a portion of the L2 cache 2560 associated with a corresponding memory device 2404. Lower level caches may then be implemented in various units within the GPCs 2450. For example, each of the SMs 2540 may implement a level one (L1) cache. The L1 cache is private memory that is dedicated to a particular SM 2540. Data from the L2 cache 2560 may be fetched and stored in each of the L1 caches for processing in the functional units of the SMs 2540. The L2 cache 2560 is coupled to the memory interface 2570 and the XBar 2470.

The ROP unit 2550 performs graphics raster operations related to pixel color, such as color compression, pixel blending, and the like. The ROP unit 2550 also implements depth testing in conjunction with the raster engine 2525, receiving a depth for a sample location associated with a pixel fragment from the culling engine of the raster engine 2525. The depth is tested against a corresponding depth in a depth buffer for a sample location associated with the fragment. If the fragment passes the depth test for the sample location, then the ROP unit 2550 updates the depth buffer and transmits a result of the depth test to the raster engine 2525. It will be appreciated that the number of partition units 2480 may be different than the number of GPCs 2450 and, therefore, each ROP unit 2550 may be coupled to each of the GPCs 2450. The ROP unit 2550 tracks packets received from the different GPCs 2450 and determines which GPC 2450 that a result generated by the ROP unit 2550 is routed to through the Xbar 2470. Although the ROP unit 2550 is included within the memory partition unit 2480 in FIG. 25B, in other embodiment, the ROP unit 2550 may be outside of the memory partition unit 2480. For example, the ROP unit 2550 may reside in the GPC 2450 or another unit.

FIG. 26A illustrates the streaming multiprocessor 2540 of FIG. 25A, in accordance with an embodiment. As shown in FIG. 26A, the SM 2540 includes an instruction cache 2605, one or more scheduler units 2610, a register file 2620, one or more processing cores 2650, one or more special function units (SFUs) 2652, one or more load/store units (LSUs) 2654, an interconnect network 2680, a shared memory/L1 cache 2670.

As described above, the work distribution unit 2425 dispatches tasks for execution on the GPCs 2450 of the PPU 2400. The tasks are allocated to a particular DPC 2520 within a GPC 2450 and, if the task is associated with a shader program, the task may be allocated to an SM 2540. The scheduler unit 2610 receives the tasks from the work distribution unit 2425 and manages instruction scheduling for one or more thread blocks assigned to the SM 2540. The scheduler unit 2610 schedules thread blocks for execution as warps of parallel threads, where each thread block consists of at least one warp. In an embodiment, each warp comprises 32 threads. The scheduler unit 2610 may manage a plurality of different thread blocks, allocating the different thread blocks to different warps and then dispatching instructions from the plurality of different cooperative groups to the various functional units (e.g., cores 2650, SFUs 2652, and LSUs 2654) during each clock cycle.

A dispatch unit 2615 is configured to transmit instructions to one or more of the functional units. In the embodiment, the scheduler unit 2610 includes two dispatch units 2615 that enable two different instructions from the same warp to be dispatched during each clock cycle. In alternative embodiments, each scheduler unit 2610 may include a single dispatch unit 2615 or additional dispatch units 2615.

Each SM 2540 includes a register file 2620 that provides a set of registers for the functional units of the SM 2540. In an embodiment, the register file 2620 is divided between each of the functional units such that each functional unit is allocated a dedicated portion of the register file 2620. In another embodiment, the register file 2620 is divided between the different warps being executed by the SM 2540. The register file 2620 provides temporary storage for operands connected to the data paths of the functional units.

Each SM 2540 comprises multiple processing cores 2650. In an embodiment, the SM 2540 includes a large number (e.g., 128, etc.) of distinct processing cores 2650. Each core 2650 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic.

Tensor cores are configured to perform matrix operations, and, in an embodiment, one or more tensor cores are included in the cores 2650. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor cores are used to perform much larger two-dimensional or higher dimensional matrix operations, built up from these smaller elements. An API, such as CUDA C++ API, exposes specialized matrix load, matrix multiply and accumulate, and matrix store operations to efficiently use Tensor cores from a CUDA-C++ program. At the CUDA level, the warp-level interface assumes 16×16 size matrices spanning all 32 threads of the warp.

In some embodiments, transposition hardware is included in the processing cores 2650 or another functional unit (e.g., SFUs 2652 or LSUs 2654) and is configured to generate matrix data stored by diagonals and/or generate the original matrix and/or transposed matrix from the matrix data stored by diagonals. The transposition hardware may be provide inside of the shared memory 2670 to register file 2620 load path of the SM 2540.

In one example, the matrix data stored by diagonals may be fetched from DRAM and stored in the shared memory 2670. As the instruction to perform processing using the matrix data stored by diagonals is processed, transposition hardware disposed in the path of the shared memory 2670 and the register file 2620 may provide the original matrix, transposed matrix, compacted original matrix, and/or compacted transposed matrix. Up until the very last storage prior to instruction, the single matrix data stored by diagonals may be maintained, and the matrix type designated by the instruction is generated as needed in the register file 2620.

Each SM 2540 also comprises multiple SFUs 2652 that perform special functions (e.g., attribute evaluation, reciprocal square root, and the like). In an embodiment, the SFUs 2652 may include a tree traversal unit (e.g., TTU 2543) configured to traverse a hierarchical tree data structure. In an embodiment, the SFUs 2652 may include texture unit (e.g., Texture Unit 2542) configured to perform texture map filtering operations. In an embodiment, the texture units are configured to load texture maps (e.g., a 2D array of texels) from the memory 2404 and sample the texture maps to produce sampled texture values for use in shader programs executed by the SM 2540. In an embodiment, the texture maps are stored in the shared memory/L1 cache 2570. The texture units implement texture operations such as filtering operations using mip-maps (e.g., texture maps of varying levels of detail). In an embodiment, each SM 2540 includes two texture units.

Each SM 2540 also comprises multiple LSUs 2654 that implement load and store operations between the shared memory/L1 cache 2670 and the register file 2620. Each SM 2540 includes an interconnect network 2680 that connects each of the functional units to the register file 2620 and the LSU 2654 to the register file 2620, shared memory/L1 cache 2670. In an embodiment, the interconnect network 2680 is a crossbar that can be configured to connect any of the functional units to any of the registers in the register file 2620 and connect the LSUs 2654 to the register file 2620 and memory locations in shared memory/L1 cache 2670.

The shared memory/L1 cache 2670 is an array of on-chip memory that allows for data storage and communication between the SM 2540 and the primitive engine 2535 and between threads in the SM 2540. In an embodiment, the shared memory/L1 cache 2670 comprises 128 KB of storage capacity and is in the path from the SM 2540 to the partition unit 2480. The shared memory/L1 cache 2670 can be used to cache reads and writes. One or more of the shared memory/L1 cache 2670, L2 cache 2560, and memory 2404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 2670 enables the shared memory/L1 cache 2670 to function as a high-throughput conduit for streaming data while simultaneously providing high-bandwidth and low-latency access to frequently reused data.

In the context of this disclosure, an SM or "streaming multiprocessor" means a processor architected as described in U.S. Pat. No. 7,447,873 to Nordquist including improvements thereto and advancements thereof, and as implemented for example in many generations of NVIDIA GPUs. For example, an SM may comprise a plurality of processing engines or cores configured to concurrently execute a plurality of threads arranged in a plurality of single-instruction, multiple-data (SIMD) groups (e.g., warps), wherein each of the threads in a same one of the SIMD groups executes a same data processing program comprising a sequence of instructions on a different input object, and different threads in the same one of the SIMD group are executed using different ones of the processing engines or cores. An SM may typically also provide (a) a local register file having plural lanes, wherein each processing engine or core is configured to access a different subset of the lanes; and instruction issue logic configured to select one of the SIMD groups and to issue one of the instructions of the same data processing program to each of the plurality of processing engines in parallel, wherein each processing engine executes the same instruction in parallel with each other processing engine using the subset of the local register file lanes accessible thereto. An SM typically further includes core interface logic configured to initiate execution of one or more SIMD groups. As shown in the figures, such SMs have been constructed to provide fast local shared memory enabling data sharing/reuse and synchronization between all threads of a CTA executing on the SM.

When configured for general purpose parallel computation, a simpler configuration can be used compared with graphics processing. Specifically, the fixed function graphics processing units shown in FIG. 25A, are bypassed, creating a much simpler programming model. In the general purpose parallel computation configuration, the work distribution unit 2425 assigns and distributes blocks of threads directly to the DPCs 2520. The threads in a block execute the same program, using a unique thread ID in the calculation to ensure each thread generates unique results, using the SM 2540 to execute the program and perform calculations, shared memory/L1 cache 2670 to communicate between threads, and the LSU 2654 to read and write global memory through the shared memory/L1 cache 2670 and the memory partition unit 2480. When configured for general purpose parallel computation, the SM 2540 can also write commands that the scheduler unit 2420 can use to launch new work on the DPCs 2520.

The PPU 2400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 2400 is embodied on a single semiconductor substrate. In another embodiment, the PPU 2400 is included in a system-on-a-chip (SoC) along with one or more other devices such as additional PPUs 2400, the memory 2404, a reduced instruction set computer (RISC) CPU, a memory management unit (MMU), a digital-to-analog converter (DAC), and the like.

In an embodiment, the PPU 2400 may be included on a graphics card that includes one or more memory devices 2404. The graphics card may be configured to interface with a PCIe slot on a motherboard of a desktop computer. In yet another embodiment, the PPU 2400 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 27A:
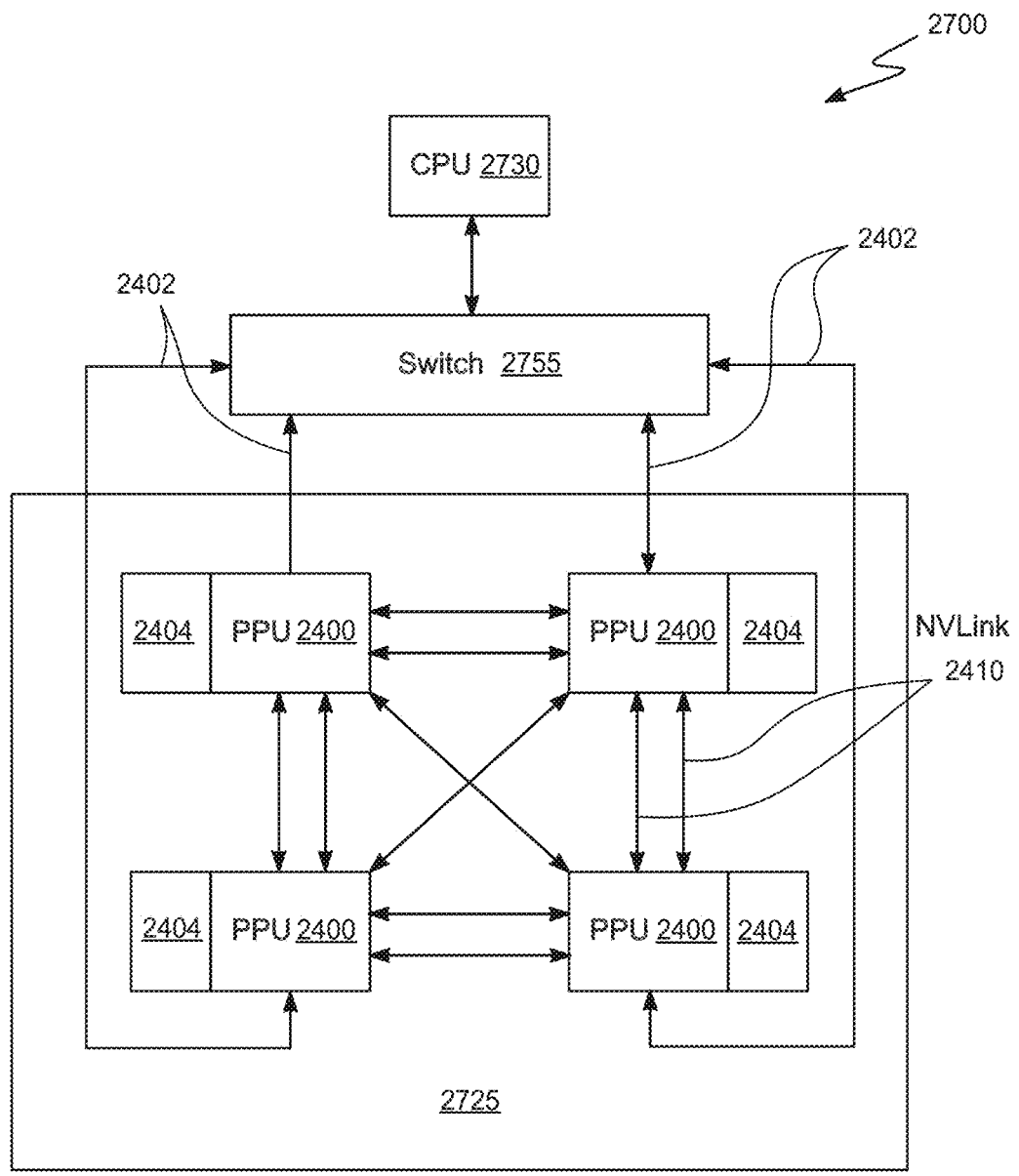
FIG. 27A is an example conceptual diagram of a processing system implemented using the parallel processing unit (PPU) of FIG. 24.

FIG. 27A is a conceptual diagram of a processing system 2700 implemented using the PPU 2400 of FIG. 24, in accordance with an embodiment. The exemplary system 2700 may be configured to implement the methods disclosed in this application. The processing system 2700 includes a CPU 2730, switch 2755, and multiple PPUs 2400 each and respective memories 2404. The NVLink 2410 provides high-speed communication links between each of the PPUs 2400. Although a particular number of NVLink 2410 and interconnect 2402 connections are illustrated in FIG. 27A, the number of connections to each PPU 2400 and the CPU 2730 may vary. The switch 2755 interfaces between the interconnect 2402 and the CPU 2730. The PPUs 2400, memories 2404, and NVLinks 2410 may be situated on a single semiconductor platform to form a parallel processing module 2725. In an embodiment, the switch 2755 supports two or more protocols to interface between various different connections and/or links.

In another embodiment (not shown), the NVLink 2410 provides one or more high-speed communication links between each of the PPUs 1000 and the CPU 2730 and the switch 2755 interfaces between the interconnect 2402 and each of the PPUs 2400. The PPUs 2400, memories 2404, and interconnect 2402 may be situated on a single semiconductor platform to form a parallel processing module 2725. In yet another embodiment (not shown), the interconnect 2402 provides one or more communication links between each of the PPUs 2400 and the CPU 2730 and the switch 2755 interfaces between each of the PPUs 1000 using the NVLink 2410 to provide one or more high-speed communication links between the PPUs 2400. In another embodiment (not shown), the NVLink 2410 provides one or more high-speed communication links between the PPUs 2400 and the CPU 2730 through the switch 2755. In yet another embodiment (not shown), the interconnect 2402 provides one or more communication links between each of the PPUs 2400 directly. One or more of the NVLink 2410 high-speed communication links may be implemented as a physical NVLink interconnect or either an on-chip or on-die interconnect using the same protocol as the NVLink 2410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 2725 may be implemented as a circuit board substrate and each of the PPUs 2400 and/or memories 2404 may be packaged devices. In an embodiment, the CPU 2730, switch 2755, and the parallel processing module 2725 are situated on a single semiconductor platform.

In an embodiment, the signaling rate of each NVLink 2410 is 20 to 25 Gigabits/second and each PPU 2400 includes six NVLink 2410 interfaces (as shown in FIG. 27A, five NVLink 2410 interfaces are included for each PPU 2400). Each NVLink 2410 provides a data transfer rate of 25 Gigabytes/second in each direction, with six links providing 2400 Gigabytes/second. The NVLinks 2410 can be used exclusively for PPU-to-PPU communication as shown in FIG. 27A, or some combination of PPU-to-PPU and PPU-to-CPU, when the CPU 2730 also includes one or more NVLink 2410 interfaces.

In an embodiment, the NVLink 2410 allows direct load/store/atomic access from the CPU 2730 to each PPU's 2400 memory 2404. In an embodiment, the NVLink 2410 supports coherency operations, allowing data read from the memories 2404 to be stored in the cache hierarchy of the CPU 2730, reducing cache access latency for the CPU 2730. In an embodiment, the NVLink 2410 includes support for Address Translation Services (ATS), allowing the PPU 2400 to directly access page tables within the CPU 2730. One or more of the NVLinks 2410 may also be configured to operate in a low-power mode.

Figure 27B:
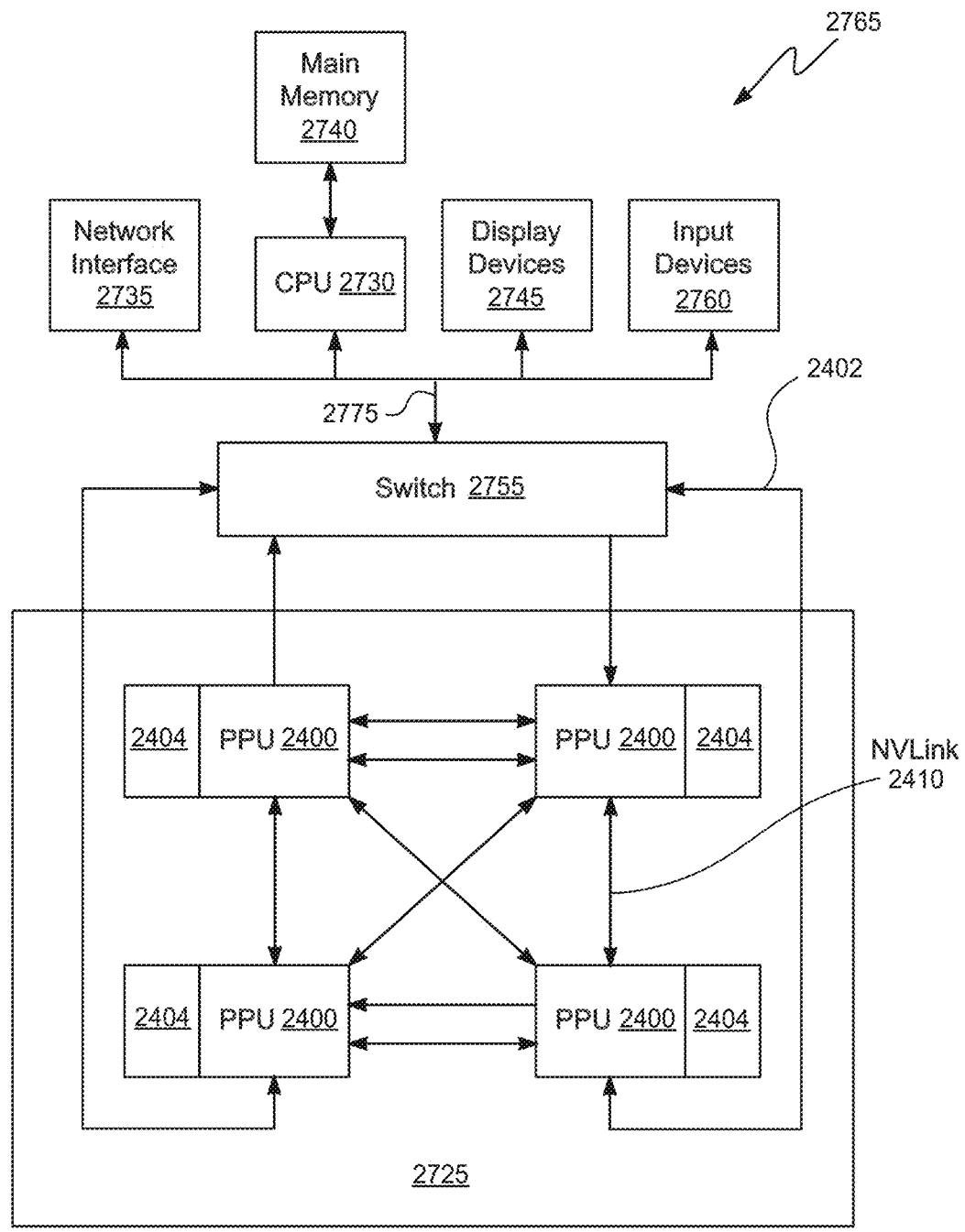
FIG. 27B is a block diagram of an exemplary system in which the various architecture and/or functionality of the various previous embodiments may be implemented.

FIG. 27B illustrates an exemplary system 2765 in which the various architecture and/or functionality of the various previous embodiments may be implemented. The exemplary system 2765 may be configured to implement the methods disclosed in this application.

As shown, a system 2765 is provided including at least one central processing unit 2730 that is connected to a communication bus 2775. The communication bus 2775 may be implemented using any suitable protocol, such as PCI (Peripheral Component Interconnect), PCI-Express, AGP (Accelerated Graphics Port), HyperTransport, or any other bus or point-to-point communication protocol(s). The system 2765 also includes a main memory 2740. Control logic (software) and data are stored in the main memory 2740 which may take the form of random access memory (RAM).

The system 2765 also includes input devices 2760, the parallel processing system 2725, and display devices 2745, e.g. a conventional CRT (cathode ray tube), LCD (liquid crystal display), LED (light emitting diode), plasma display or the like. User input may be received from the input devices 2760, e.g., keyboard, mouse, touchpad, microphone, and the like. Each of the foregoing modules and/or devices may even be situated on a single semiconductor platform to form the system 2765. Alternately, the various modules may also be situated separately or in various combinations of semiconductor platforms per the desires of the user.

Further, the system 2765 may be coupled to a network (e.g., a telecommunications network, local area network (LAN), wireless network, wide area network (WAN) such as the Internet, peer-to-peer network, cable network, or the like) through a network interface 2735 for communication purposes.

The system 2765 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 2740 and/or the secondary storage. Such computer programs, when executed, enable the system 2765 to perform various functions. The memory 2740, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 2765 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

An application program may be implemented via an application executed by a host processor, such as a CPU. In an embodiment, a device driver may implement an application programming interface (API) that defines various functions that can be utilized by the application program in order to generate graphical data for display. The device driver is a software program that includes a plurality of instructions that control the operation of the PPU 2400. The API provides an abstraction for a programmer that lets a programmer utilize specialized graphics hardware, such as the PPU 2400, to generate the graphical data without requiring the programmer to utilize the specific instruction set for the PPU 2400. The application may include an API call that is routed to the device driver for the PPU 2400. The device driver interprets the API call and performs various operations to respond to the API call. In some instances, the device driver may perform operations by executing instructions on the CPU. In other instances, the device driver may perform operations, at least in part, by launching operations on the PPU 2400 utilizing an input/output interface between the CPU and the PPU 2400. In an embodiment, the device driver is configured to implement a graphics processing pipeline utilizing the hardware of the PPU 2400.

Various programs may be executed within the PPU 2400 in order to implement the various stages of the processing for the application program. For example, the device driver may launch a kernel on the PPU 2400 to perform one stage of processing on one SM 2540 (or multiple SMs 2540). The device driver (or the initial kernel executed by the PPU 2400) may also launch other kernels on the PPU 2400 to perform other stages of the processing. If the application program processing includes a graphics processing pipeline, then some of the stages of the graphics processing pipeline may be implemented on fixed unit hardware such as a rasterizer or a data assembler implemented within the PPU 2400. It will be appreciated that results from one kernel may be processed by one or more intervening fixed function hardware units before being processed by a subsequent kernel on an SM 2540.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Furthermore, images generated applying one or more of the techniques disclosed herein may be used to train, test, or certify deep neural networks (DNNs) used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Furthermore, images generated applying one or more of the techniques disclosed herein may be used to display or convey information about a virtual environment such as the metaverse, Omniverse, or a digital twin of a real environment. Furthermore, Images generated applying one or more of the techniques disclosed herein may be used to display or convey information on a variety of devices including a personal computer (e.g., a laptop), an Internet of Things (IoT) device, a handheld device (e.g., smartphone), a vehicle, a robot, or any device that includes a display.

All patents, patent applications and publications cited herein are incorporated by reference for all purposes as if expressly set forth.

All patents & publications cited above are incorporated by reference as if expressly set forth. While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A ray tracing acceleration hardware device, comprising:
a memory access circuit configured to read a plurality of nodes of an acceleration structure (AS) including a node comprising a polygon mesh primitive defining plural regions in the node, and a visibility mask (VM) corresponding to the node, wherein the VM comprises a respective visibility state for each of the plural regions of the polygon mesh;
ray storage configured to store data representing a ray; and
acceleration circuitry configured to perform operations comprising:
detecting an intersection of the node by the ray at an intersection point;
obtaining, from the VM, a visibility state of a region corresponding to the intersection point, wherein the region is one of the plural regions in the mesh; and
determining, based on the visibility state, how to process the intersection,
wherein the obtaining, from the VM, a visibility state of a region in the polygon mesh, comprises:
determining, based on the intersection point, an index into the VM; and
obtaining, by accessing the VM using the index, the visibility state of the region,
wherein the polygon mesh is a mesh of micro-triangles overlaid on a triangle geometric primitive, and where the determining an index into the VM comprises:
calculating, based on coordinates of the intersection point, a barycentric coordinate of the region; and
calculating the index based on the barycentric coordinate.

2. The ray tracing acceleration hardware device according to claim 1, wherein visibility states of respective regions in the VM include at least an opaque visibility state and a transparent visibility state.

3. The ray tracing acceleration hardware device according to claim 2, wherein the operations further comprise:
when the visibility state is the transparent visibility state, ignoring the intersection; and
when the visibility state is the opaque visibility state, committing the intersection;
wherein the determining is performed without requiring processing of the intersection external of the ray tracing acceleration hardware device.

4. The ray tracing acceleration hardware device according to claim 2, wherein the visibility states of respective regions in the VM further include at least an unknown visibility state.

5. The ray tracing acceleration hardware device according to claim 4, wherein the operations further comprise:
when the visibility state is the transparent visibility state, ignoring the intersection;
when the visibility state is an unknown visibility state, providing data associated with the intersection for processing external of the ray tracing acceleration hardware device; and
when the visibility state is the opaque visibility state, committing the intersection;
wherein, when the visibility state is either the transparent visibility state or the opaque visibility state, the determining is performed without requiring processing of the intersection external of the ray tracing acceleration hardware device.

6. The ray tracing acceleration hardware device according to claim 2, wherein the visibility states of respective regions in the VM further include at least an unknown-opaque visibility state and an unknown-transparent visibility state.

7. The ray tracing acceleration hardware device according to claim 6, further comprising:
when the visibility state corresponds to the unknown-opaque visibility state or the unknown-transparent visibility state, remapping the visibility state to the opaque visibility state or the transparent visibility state;
when the visibility state is the transparent visibility state, ignoring the intersection; and
when the visibility state is the opaque visibility state, committing the intersection;
wherein the determining is performed without external processing of data associated with the intersection.

8. The ray tracing acceleration hardware device according to claim 1, wherein the calculating the index is based on the barycentric coordinate and a predetermined traversal order of the polygon mesh.

9. The ray tracing acceleration hardware device according to claim 1, wherein the VM is one of a plurality of VMs associated in the AS with the node, and wherein the VM is selected using information stored in an instance node associated with the node in the AS.

10. The ray tracing acceleration hardware device according to claim 1, wherein a memory accessed by the memory access circuit comprises a plurality of VMs, wherein at least one first VM of the plurality of VMs is associated with more instance nodes in the AS.

11. The ray tracing acceleration hardware device according to claim 1, wherein the determining, based on the visibility state, how to process the intersection comprises determining, based on the visibility state, whether to ignore the intersection or to commit the intersection.

12. The ray tracing acceleration hardware device according to claim 1, wherein the operations further comprises, before the determining, based on the visibility state, how to process the intersection, determining the visibility state based on one or more flags in the data representing the ray and the obtained visibility status.

13. The ray tracing acceleration hardware device according to claim 1, wherein the operations further comprises, before the determining, based on the visibility state, how to process the intersection, determining the visibility state based on a value stored in an instance node associated with the first node in the AS.

14. The ray tracing acceleration hardware device according to claim 1, wherein the operations further comprise overriding the visibility state obtained from the VM, wherein the overriding is based upon a value stored in an instance node associated with the first node in the AS or in a flag included in the ray.

15. The ray tracing acceleration hardware device according to claim 14, wherein the overriding comprises mapping four visibility states in the VM to three or two visibility states, or ignoring the VM.

16. A method for ray tracing, comprising:
traversing, with a ray tracing acceleration hardware device, an acceleration structure (AS) comprising a geometric primitive defining a mesh of regions within the geometric primitive;
receiving, with the ray tracing acceleration hardware device, data representing a ray;
detecting an intersection of the geometric primitive by the ray at an intersection point;
obtaining, from a visibility mask (VM), a pre-stored visibility state of a region that corresponds to the intersection point, the region being one region in the mesh of regions; and
determining, based on the visibility state, how to process the detected intersection,
wherein the obtaining, from the VM, a visibility state of a region in the polygon mesh, comprises:
determining, based on the intersection point, an index into the VM; and
obtaining, by accessing the VM using the index, the visibility state of the region,
wherein the polygon mesh is a mesh of micro-triangles overlaid on a triangle geometric primitive, and where the determining an index into the VM comprises:
calculating, based on coordinates of the intersection point, a barycentric coordinate of the region; and
calculating the index based on the barycentric coordinate.

17. A system comprising:
a first memory storing an acceleration structure (AS) and a collection of visibility masks (VMs), wherein each VM comprises a respective visibility state for each region in a mesh of regions overlaid on a node in the AS;
a processor; and
ray tracing acceleration hardware device configured to receive instructions from the processor, and comprising:
a second memory configured to store a plurality of nodes of the AS, and a VM corresponding to a first node in the plurality of nodes, wherein the VM comprises a respective visibility state for each region in the mesh of regions overlaid on the first node;
ray storage configured to store data representing a ray to traverse the AS; and
circuitry configured to perform operations comprising:
detecting an intersection of the first node by the ray at an intersection point;
obtaining, from the VM, a visibility state of a region in the mesh of regions, wherein the region corresponds to the intersection point; and
determining, based on the visibility state, whether to ignore the intersection or to commit the intersection,
wherein the obtaining, from the VM, a visibility state of a region in the polygon mesh, comprises:
determining, based on the intersection point, an index into the VM; and
obtaining, by accessing the VM using the index, the visibility state of the region,
wherein the polygon mesh is a mesh of micro-triangles overlaid on a triangle geometric primitive, and where the determining an index into the VM comprises:
calculating, based on coordinates of the intersection point, a barycentric coordinate of the region; and
calculating the index based on the barycentric coordinate.

18. A ray tracing acceleration hardware device, comprising:
a memory access circuit configured to read a plurality of nodes of an acceleration structure (AS) including a node comprising a polygon mesh primitive defining plural regions in the node, and a visibility mask (VM) corresponding to the node, wherein the VM comprises a respective visibility state for each of the plural regions of the polygon mesh, wherein visibility states in the VM include at least an opaque visibility state, a transparent visibility state, an unknown-opaque visibility state, and an unknown-transparent visibility state;
ray storage configured to store data representing a ray; and
acceleration circuitry configured to perform operations comprising:
detecting an intersection of the node by the ray at an intersection point;
obtaining, from the VM, a visibility state of a region corresponding to the intersection point, wherein the region is one of the plural regions in the mesh;
determining, based on the visibility state and without external processing of data associated with the detected intersection, how to process the intersection;
when the visibility state corresponds to the unknown-opaque visibility state or the unknown-transparent visibility state, remapping the visibility state to the opaque visibility state or the transparent visibility state;
when the visibility state is the transparent visibility state, ignoring the intersection; and
when the visibility state is the opaque visibility state, committing the intersection.

19. A method for ray tracing, comprising:
traversing, with a ray tracing acceleration hardware device, an acceleration structure (AS) comprising a geometric primitive defining a mesh of regions within the geometric primitive;
receiving, with the ray tracing acceleration hardware device, data representing a ray;
detecting an intersection of the geometric primitive by the ray at an intersection point;

obtaining, from a visibility mask (VM), a pre-stored visibility state of a region that corresponds to the intersection point, the region being one region in the mesh of regions;

determining, based on the visibility state and without external processing of data associated with the detected intersection, how to process the detected intersection;

when the visibility state corresponds to the unknown-opaque visibility state or the unknown-transparent visibility state, remapping the visibility state to the opaque visibility state or the transparent visibility state;

when the visibility state is the transparent visibility state, ignoring the intersection; and when the visibility state is the opaque visibility state, committing the intersection.

20. A system comprising:

a first memory storing an acceleration structure (AS) and a collection of visibility masks (VMs), wherein each VM comprises a respective visibility state for each region in a mesh of regions overlaid on a node in the AS;

a processor; and ray tracing acceleration hardware device configured to receive instructions from the processor, and comprising:

a second memory configured to store a plurality of nodes of the AS, and a VM corresponding to a first node in the plurality of nodes, wherein the VM comprises a respective visibility state for each region in the mesh of regions overlaid on the first node;

ray storage configured to store data representing a ray to traverse the AS; and circuitry configured to perform operations comprising:

detecting an intersection of the first node by the ray at an intersection point;

obtaining, from the VM, a visibility state of a region in the mesh of regions, wherein the region corresponds to the intersection point; and determining, based on the visibility state and without external processing of data associated with the detected intersection, whether to ignore the intersection or to commit the intersection, when the visibility state corresponds to the unknown-opaque visibility state or the unknown-transparent visibility state, remapping the visibility state to the opaque visibility state or the transparent visibility state;

when the visibility state is the transparent visibility state, ignoring the intersection; and when the visibility state is the opaque visibility state, committing the intersection.

* * * * *